(12) United States Patent
Murata et al.

(10) Patent No.: US 12,518,409 B2
(45) Date of Patent: Jan. 6, 2026

(54) INFORMATION PROCESSING DEVICE FOR IDENTIFYING INDIVIDUAL ANIMALS AND ACTIVITIES IN USING OUTLINE DETECTION

(71) Applicants: REVAMP CORPORATION, Tokyo (JP); THE UNIVERSITY OF TOKYO, Tokyo (JP)

(72) Inventors: Takahisa Murata, Tokyo (JP); Koji Kobayashi, Tokyo (JP); Seiji Matsushita, Tokyo (JP); Naoyuki Shimizu, Tokyo (JP); Tomoyuki Yuasa, Tokyo (JP); Takashi Minato, Tokyo (JP)

(73) Assignees: REVAMP CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 337 days.

(21) Appl. No.: 18/258,627

(22) PCT Filed: Dec. 20, 2021

(86) PCT No.: PCT/JP2021/047076
§ 371 (c)(1),
(2) Date: Jun. 21, 2023

(87) PCT Pub. No.: WO2022/138585
PCT Pub. Date: Jun. 30, 2022

(65) Prior Publication Data
US 2024/0046493 A1 Feb. 8, 2024

(30) Foreign Application Priority Data

Dec. 21, 2020 (JP) .................................. 2020-211852
Dec. 21, 2020 (JP) .................................. 2020-211853

(51) Int. Cl.
*G06T 7/50* (2017.01)
*G06T 7/20* (2017.01)
(Continued)

(52) U.S. Cl.
CPC .................. *G06T 7/50* (2017.01); *G06T 7/20* (2013.01); *G06T 7/70* (2017.01); *G06V 10/40* (2022.01);
(Continued)

(58) Field of Classification Search
None
See application file for complete search history.

(56) References Cited

U.S. PATENT DOCUMENTS

2010/0002908 A1   1/2010  Miyamoto et al.
2011/0007946 A1*  1/2011  Liang ................... A01K 29/005
                                                                  382/110
(Continued)

FOREIGN PATENT DOCUMENTS

CA       2969762 C    7/2019
CN    104937635 A   9/2015
(Continued)

OTHER PUBLICATIONS

Extended Search Report issued on Apr. 25, 2024, in corresponding European Application No. 21910728.1, 11 pages.
(Continued)

*Primary Examiner* — SJ Park
*Assistant Examiner* — Caroline E. Depalma
(74) *Attorney, Agent, or Firm* — Maier & Maier, PLLC

(57) ABSTRACT

A challenge is to provide an art to identify mice as individuals from captured images of one or more mice that are doing activity in a predetermined activity range. An image processing device includes an image acquisition unit, a part extraction unit, and an individual identification unit. The
(Continued)

image acquisition unit acquires a captured video of a state in which one or more animals are doing activity in a predetermined activity range. An outline detection unit extracts the outlines of the bodies of the one or more animals from each of multiple unit images included in the video. The individual identification unit analyzes the multiple outlines detected from each of the multiple unit images by the outline detection unit, in a time-series manner and identifies the one or more animals as individuals in each of the unit images on the basis of the analysis results. Thus, the challenge is solved.

5 Claims, 54 Drawing Sheets

(51) Int. Cl.
    *G06T 7/70*     (2017.01)
    *G06V 10/40*     (2022.01)
    *G06V 10/70*     (2022.01)
    *G06V 20/40*     (2022.01)
    *G06V 40/10*     (2022.01)
    *G06V 40/20*     (2022.01)

(52) U.S. Cl.
    CPC .............. *G06V 10/87* (2022.01); *G06V 40/10* (2022.01); *G06V 40/20* (2022.01); *G06T 2207/20044* (2013.01); *G06V 20/40* (2022.01); *G06V 2201/07* (2022.01)

(56) References Cited

U.S. PATENT DOCUMENTS

| | | | |
|---|---|---|---|
| 2013/0230211 A1* | 9/2013 | Tanabiki | G06T 7/75 382/103 |
| 2014/0232631 A1 | 8/2014 | Fleischmann et al. | |
| 2016/0125276 A1 | 5/2016 | Spicola, Sr. et al. | |
| 2019/0014750 A1 | 1/2019 | Hasumura | |
| 2019/0066327 A1 | 2/2019 | Fujimoto et al. | |
| 2020/0143157 A1* | 5/2020 | Borchersen | G06V 10/46 |
| 2021/0105980 A1 | 4/2021 | Idziaszek et al. | |
| 2021/0406530 A1 | 12/2021 | Borchersen et al. | |

FOREIGN PATENT DOCUMENTS

| | | |
|---|---|---|
| CN | 108601337 A | 9/2018 |
| CN | 111931725 A | 11/2020 |
| CN | 111988991 A | 11/2020 |
| JP | 4402902 B2 | 1/2010 |
| JP | 2018-007625 A | 1/2018 |
| JP | 2018-520680 A | 8/2018 |
| JP | 2019010004 A | 1/2019 |
| JP | 6793383 B1 | 12/2020 |
| JP | 2021-101668 A | 7/2021 |
| KR | 101938361 B1 | 1/2019 |
| WO | 2008007471 A1 | 1/2008 |
| WO | 2016086266 A1 | 6/2016 |
| WO | 2017187641 A1 | 11/2017 |

OTHER PUBLICATIONS

Liu et al., "Video Analytic System for Detecting Cow Structure", Computers and Electronics in Agriculture, Elsevier B. V., Sep. 23, 2020, vol. 178, 11 pages.

Office Action issued on Jul. 4, 2025, in corresponding Chinese Application No. 202180086045.3, 12 pages.

Office Action issued on Jul. 5, 2025, in corresponding Chinese Application No. 202180086060.8, 12 pages.

International Search Report issued on Mar. 8, 2022 in corresponding International application No. PCT/JP2021/047076; 7 pages.

* cited by examiner

Fig. 13

| frame_no | nose x | nose y | eye_right x | eye_ri y |
|---|---|---|---|---|
| 0 | 1156.142578 | 801.2727051 | 1142.360352 | 79 |
| 1 | 1166.555542 | 803.0534058 | 1148.305298 | 79 |
| 2 | 1181.76709 | 804.2488403 | 1155.754272 | 7! |
| 3 | 1186.108398 | 804.1126099 | 1159.80603 | 7! |
| 4 | 1192.496216 | 804.4854736 | 1163.61084 | 7! |
| 5 | 1191.361816 | 796.8452759 | 1160.3125 | |
| 6 | 1188.117554 | 786.9454956 | 1151.516968 | 7⋅ |
| 7 | 1187.106567 | 779.1461182 | 1148.884888 | 7! |
| ... | | | | |
| 150 | 1180.737061 | 773.4254761 | 1140.144409 | 7⋅ |
| 151 | 1181.373779 | 770.3927002 | 1139.687134 | 7⋅ |
| 152 | 1180.19104 | 764.8962402 | 1137.737061 | 71 |
| 153 | 1177.054321 | 762.4313965 | 1133.893921 | 71 |
| 154 | 1174.442017 | 760.1929932 | 1129.191528 | 71 |
| 155 | 1173.63501 | 760.1743774 | 1128.451294 | 71 |
| 156 | 1174.009399 | 759.8008423 | 1128.171265 | 70 |
| ... | | | | |
| 350 | 1174.120117 | 759.3046875 | 1129.268188 | 70 |
| 351 | 1174.079102 | 760.5985107 | 1129.22876 | 71 |
| 352 | 1174.757446 | 762.710144 | 1129.7771 | 71 |
| 353 | 1175.493164 | 761.8883057 | 1130.918091 | 71 |
| 354 | 1177.387939 | 758.0386963 | 1132.177734 | 71 |
| 355 | 1177.935669 | 758.2223511 | 1132.87793 | 70 |
| 356 | 1178.318481 | 757.8793945 | 1132.937134 | 71 |
| 357 | 1177.52356 | 758.8670654 | 1132.04187 | 71 |
| 358 | 1177.445435 | 759.8215332 | 1130.152344 | 71 |
| 359 | 1176.315796 | 760.3446655 | 1129.939331 | 71 |
| 360 | 1175.580566 | 761.3330078 | 1129.55896 | 7 |
| 361 | 1174.475586 | 763.302002 | 1128.69873 | 7 |
| 362 | 1174.075806 | 763.1403198 | 1128.63855 | 71 |

Fig. 14

| frame_no | nose x | nose y | eye_right x | eye_r y |
|---|---|---|---|---|
| 0 | 1156.142578 | 801.2727051 | 1142.360352 | 7 |
| 1 | 1166.555542 | 803.0534058 | 1148.305298 | 7 |
| 2 | 1181.76709 | 804.2488403 | 1155.754272 | 7 |
| 3 | 1186.108398 | 804.1126099 | 1159.80603 | 7 |
| 4 | 1192.496216 | 804.4854736 | 1163.61084 | 7 |
| 5 | 1191.361816 | 796.8452759 | 1160.3125 | |
| 6 | 1188.117554 | 786.9454956 | 1151.516968 | 7 |
| 7 | 1187.106567 | 779.1461182 | 1148.884888 | 7 |
| ... | | | | |
| 150 | 1180.737061 | 773.4254761 | 1140.144409 | 7 |
| 151 | 1181.373779 | 770.3927002 | 1139.687134 | 7 |
| 152 | 1180.19104 | 764.8962402 | 1137.737061 | 71 |
| 153 | 1177.054321 | 762.4313965 | 1133.893921 | 71 |
| 154 | 1174.442017 | 760.1929932 | 1129.191528 | 71 |
| 155 | 1173.63501 | 760.1743774 | 1128.451294 | 71 |
| 156 | 1174.009399 | 759.8008423 | 1128.171265 | 70 |
| ... | | | | |
| 350 | 1174.120117 | 759.3046875 | 1129.268188 | 70 |
| 351 | 1174.079102 | 760.5985107 | 1129.22876 | 71 |
| 352 | 1174.757446 | 762.710144 | 1129.7771 | 71 |
| 353 | 1175.493164 | 761.8883057 | 1130.918091 | 71 |
| 354 | 1177.387939 | 758.0386963 | 1132.177734 | 71 |
| 355 | 1177.935669 | 758.2223511 | 1132.87793 | 70 |
| 356 | 1178.318481 | 757.8793945 | 1132.937134 | 71 |
| 357 | 1177.52356 | 758.8670654 | 1132.04187 | 71 |
| 358 | 1177.445435 | 759.8215332 | 1130.152344 | 71 |
| 359 | 1176.315796 | 760.3446655 | 1129.939331 | 71 |
| 360 | 1175.580566 | 761.3330078 | 1129.55896 | 7 |
| 361 | 1174.475586 | 763.302002 | 1128.69873 | 7 |
| 362 | 1174.075806 | 763.1403198 | 1128.63855 | 71 |

Fig. 15

| frame_no | nose x | nose y | eye_right x | eye_r y |
|---|---|---|---|---|
| 0 | 1156.142578 | 801.2727051 | 1142.360352 | 7! |
| 1 | 1166.555542 | 803.0534058 | 1148.305298 | 7! |
| 2 | 1181.76709 | 804.2488403 | 1155.754272 | 7! |
| 3 | 1186.108398 | 804.1126099 | 1159.80603 | 7 |
| 4 | 1192.496216 | 804.4854736 | 1163.61084 | 7 |
| 5 | 1191.361816 | 796.8452759 | 1160.3125 | |
| 6 | 1188.117554 | 786.9454956 | 1151.516968 | 7 |
| 7 | 1187.106567 | 779.1461182 | 1148.884888 | 7 |
| ... | | | | |
| 150 | 1180.737061 | 773.4254761 | 1140.144409 | 7 |
| 151 | 1181.373779 | 770.3927002 | 1139.687134 | 7! |
| 152 | 1180.19104 | 764.8962402 | 1137.737061 | 71 |
| 153 | 1177.054321 | 762.4313965 | 1133.893921 | 71 |
| 154 | 1174.442017 | 760.1929932 | 1129.191528 | 71 |
| 155 | 1173.63501 | 760.1743774 | 1128.451294 | 71 |
| 156 | 1174.009399 | 759.8008423 | 1128.171265 | 70 |
| ... | | | | |
| 350 | 1174.120117 | 759.3046875 | 1129.268188 | 70 |
| 351 | 1174.079102 | 760.5985107 | 1129.22876 | 71 |
| 352 | 1174.757446 | 762.710144 | 1129.7771 | 71 |
| 353 | 1175.493164 | 761.8883057 | 1130.918091 | 71 |
| 354 | 1177.387939 | 758.0386963 | 1132.177734 | 71 |
| 355 | 1177.935669 | 758.2223511 | 1132.87793 | 70 |
| 356 | 1178.318481 | 757.8793945 | 1132.937134 | 71 |
| 357 | 1177.52356 | 758.8670654 | 1132.04187 | 71 |
| 358 | 1177.445435 | 759.8215332 | 1130.152344 | 71 |
| 359 | 1176.315796 | 760.3446655 | 1129.939331 | 71 |
| 360 | 1175.580566 | 761.3330078 | 1129.55896 | 7 |
| 361 | 1174.475586 | 763.302002 | 1128.69873 | 7 |
| 362 | 1174.075806 | 763.1403198 | 1128.63855 | 71 |

| frame_no | probability | predict |
|---|---|---|
| 1 | 4.76059E-09 | 0 |
| 2 | 7.12397E-09 | 0 |
| 3 | 1.02766E-08 | 0 |
| 4 | 1.11117E-08 | 0 |
| 5 | 1.74773E-08 | 0 |
| 6 | 2.18023E-08 | 0 |
| 7 | 2.23723E-08 | 0 |
| 8 | 2.52631E-08 | 0 |
| 9 | 1.98805E-08 | 0 |
| ... | ... | |
| 4500 | 0.07754046 | 0 |
| 4501 | 0.26931754 | 0 |
| 4502 | 0.6370489 | 1 |
| 4503 | 0.76747197 | 1 |
| 4504 | 0.8092774 | 1 |
| 4505 | 0.79703647 | 1 |
| 4506 | 0.72897863 | 1 |
| 4507 | 0.6131166 | 1 |
| 4508 | 0.45780918 | 0 |
| 4509 | 0.2258791 | 0 |
| 4510 | 0.10535777 | 0 |
| 4511 | 0.03516234 | 0 |
| ... | ... | |
| 9000 | 7.23812E-09 | 0 |
| 9001 | 9.76824E-09 | 0 |
| 9002 | 1.61628E-08 | 0 |
| 9003 | 2.82797E-08 | 0 |
| 9004 | 4.85462E-08 | 0 |

251

Search screen

Search condition

Keyword [　　　　　　　　　]

Period [ yyyy/mm/dd ] ~ [ yyyy/mm/dd ]　　[ Search ]

Analysis data list　　　　　　　　　　　　　　　　　[ Add analysis data ]　[ Check video ]　[ Output CSV ]

| | File name | Setting | Registrant | Date/time | Analysis |
|---|---|---|---|---|---|
| ● | ****01 | Mouse /Upward/Black | Taro TANAKA | 2020.04.10 09:27 | Complete |
| ● | ****02 | Rat /Obliquely upward/White | Taro TANAKA | 2020.04.10 09:40 | Complete |
| ○ | ****03 | Mouse /Horizontally/Black | Ichiro SUZUKI | 2020.04.10 10:00 | Complete |
| ○ | ****04 | Rat /Upward/White | Ichiro SUZUKI | 2020.04.10 10:30 | Complete |
| ○ | ****05 | Rat /Obliquely upward/White | Ichiro SUZUKI | 2020.04.10 10:50 | Complete |
| ○ | ****06 | Mouse /Obliquely upward/White | Taro TANAKA | 2020.04.10 11:00 | Complete |
| ○ | ****07 | Rat /Horizontally/White | Taro TANAKA | 2020.04.10 11:20 | In progress |
| ○ | ****08 | Rat /Horizontally/White | Taro TANAKA | 2020.04.10 11:40 | Yet |
| ○ | ****09 | Rat /Obliquely upward/White | Ichiro SUZUKI | 2020.04.10 12:00 | Yet |
| ○ | ****10 | Mouse / Horizontally /Black | Ichiro SUZUKI | 2020.04.10 12:23 | Yet |

Fig. 25

INFORMATION PROCESSING DEVICE FOR IDENTIFYING INDIVIDUAL ANIMALS AND ACTIVITIES IN USING OUTLINE DETECTION

TECHNICAL FIELD

The present invention relates to an information processing device, information processing method, and program.

BACKGROUND ART

Examples of conventional technologies include technologies that process biometric information of animals such as cats or dogs while identifying the animals as individuals (for example, see Patent Literature 1 and the like).

CITATION LIST

Patent Literature

Patent Literature 1: Japanese Unexamined Patent Application Publication No. 2018-007625

SUMMARY OF INVENTION

Technical Problem

However, the conventional technology of the above literature is not able to identify an animal as an individual in a situation in which a constantly moving animal or multiple animals is present, although it is able to measure biometric data of the animal contactlessly.

Also, when processing biometric information of the animal identified as an individual, this conventional technology checks the health condition of the animal. For this reason, a camera, as well as a thermograph or the like is required, resulting in an increase in cost. Further, this literature does not mention applications other than the management of the health condition.

The present invention has been made in view of the foregoing, and an object thereof is to provide an art to identify, as individuals, one or more individual mice doing activity in a predetermined activity range.

Solution to Problem

To accomplish the above object, an information processing device according to one aspect of the present invention includes
  image acquisition means configured to acquire a captured analysis target image of a state in which one or more animals are doing activity in a predetermined activity range, the analysis target image comprising multiple unit images arranged in a time direction,
  outline detection means configured to detect outlines of bodies of the one or more animals from each of the multiple unit images using a skeleton estimation model that when receiving a unit image, estimates and outputs a skeleton of a body of an animal;
  individual identification means configured to identify the one or more animals as individuals in each of the unit images on the basis of an output obtained by inputting time series of the outlines of the bodies of the one or more animals extracted from each of the unit images by the outline detection means to an individual identification model that when receiving time series of one or more outlines of a body of an animal, outputs the animal as an individual;
  specification means configured to specify an analysis attribute of the analysis target image;
  model selection means configured to select, on the basis of the analysis attribute of the analysis target image specified by the specification means, the skeleton estimation model used by the outline detection means from multiple skeleton estimation models and to select the individual identification model used by the individual identification means from multiple individual identification models;

As seen above, the present information processing device previously prepares the multiple skeleton estimation models and multiple individual identification models and selects, on the basis of the analysis attribute of the analysis target image specified by the specification means, the skeleton estimation model used by the outline detection means from the multiple skeleton estimation models and selects the individual identification model used by the individual identification means from the multiple individual identification models.

The present information processing device then detects, in accordance with an analysis instruction, the outlines of the bodies of the one or more animals from each of the multiple unit images included in the analysis target image and analyzes the detected outlines on a time-series manner, and identifies the one or more animals as individuals on the basis of the analysis results. This allows the user to identify the animals as individuals from the captured image of the one or more animals doing activity in the predetermined activity range.

An information processing method and program corresponding to the information processing device according to the one aspect of the present invention are also provided as an information processing method and program according to other aspects of the present invention.

Advantageous Effects of Invention

According to the present invention, the user is allowed to identify, as individuals, the one or more mice doing activity in the predetermined activity range.

BRIEF DESCRIPTION OF THE DRAWINGS

FIG. 13 is a drawing showing an example in which watering activity of a mouse is detected.

FIG. 14 is a drawing showing an example in which feeding activity of a mouse is detected.

FIG. 15 is a drawing showing an example in which mutual interference activity of mice is detected.

FIG. 25 is a diagram showing a search screen displayed on the PC of FIG. 24.

DESCRIPTION OF EMBODIMENTS

Now, embodiments of the present invention will be described with reference to the drawings.

Figure 1:
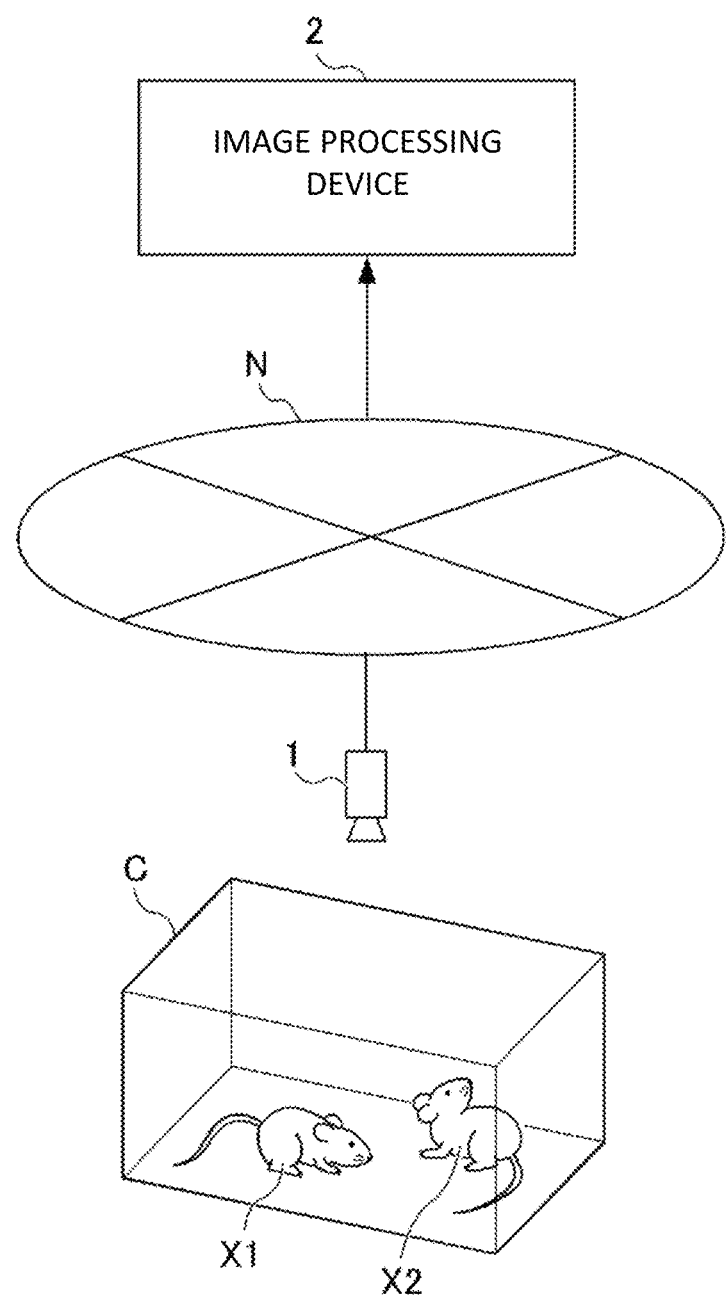
FIG. 1 is a drawing showing an example of the configuration of an information processing system including an image processing device according to an embodiment of an information processing device of the present invention.

FIG. 1 is a drawing showing the configuration of an information processing system including an image processing device according to an embodiment of an information processing device of the present invention.

First Embodiment

The information processing system shown in FIG. 1 includes a camera 1 installed (disposed) so as to capture images of a cage C housing one or more mice (mice X1, X2 in an example shown in FIG. 1) from above and an image processing device 2 connected to the camera 1 through a network N.

The network N includes a wired network, as well as a wireless network or the like. The cage C is housing means for causing animals to do activity in a predetermined activity range.

The camera 1 is, for example, a digital camera, network camera, or the like for capturing a video and captures a video of the inside of the cage C from above and outputs it to the image processing device 2.

As used herein, the term "video" refers to an image consisting of multiple unit images arranged in the time direction and is also called a picture. While field images may be used as unit images, frame images are used herein.

The image processing device 2 identifies, as individuals, the multiple mice X1, X2 included as subjects in the video using the video acquired from the camera 1 and learning models (to be discussed later in detail) stored in a model DB 42. The image processing device 2 also detects a factor (cause) forming the basis of the activity, such as the sociality of the mice X1, X2, the interaction between the mice X1, X2 present in the same activity range, or the relationship between the mice X1, X2, from the activity patterns (habits or the like) of the mice X1, X2 identified as individuals.

The image processing device 2 generates tracking images provided with at least one of markers, such as some parts (tracking points) of the skeleton of the body of each of the one or more mice included in the frame images extracted from the video or individual IDs (identification), and objects for visually identifying the outlines of the mice (the boundary between mice and the surroundings) and outputs the tracking images to an output unit 16 such as a display.

When a printer is connected to the image processing device 2 as the output unit 16, the tracking images can be printed.

The objects are the outlines of the individual mice, mask images, or the like. The markers include, for example, tracking points represented by figures such as circles, triangles, or rectangles, individual IDs represented by alphanumerics, and the like.

Details of the functional configuration or processes of the image processing device 2 will be described later with reference to FIG. 3 and subsequent drawings.

Figure 2:
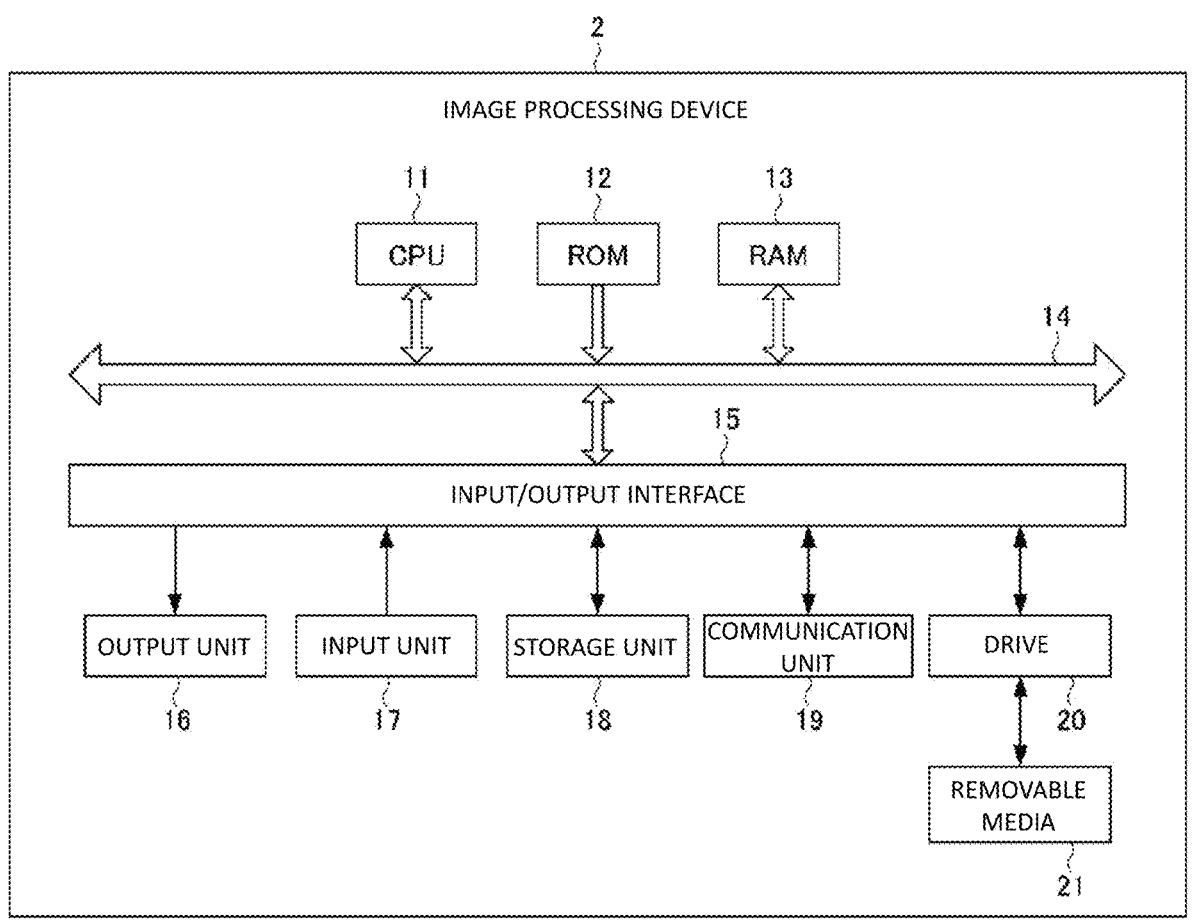
FIG. 2 is a block diagram showing an example of the hardware configuration of the image processing device according to the information processing device of the present invention in the information processing system of FIG. 1.

FIG. 2 is a block diagram showing an example of the hardware configuration of the information processing device according to the information processing device of the present invention in the information processing system of FIG. 1.

The image processing device 2 includes a CPU (central processing unit) 11, a ROM (read-only memory) 12, a RAM (random access memory) 13, a bus 14, an input/output interface 15, the output unit 16, an input unit 17, a storage unit 18, a communication unit 19, and a drive 20.

The CPU 11 performs processes in accordance with a program stored in the ROM 12 or a program loaded from the storage unit 18 into the RAM 13.

Data or the like necessary for the CPU 11 to perform processes is stored in the RAM 13 when necessary.

The CPU 11, ROM 12, and RAM 13 are connected to each other through the bus 14. The input/output interface 15 is also connected to the bus 14. The output unit 16, input unit 17, storage unit 18, communication unit 19, and drive 20 are connected to the input/output interface 15.

The output unit 16 consists of a display, a speaker, and the like and outputs images or sounds.

The input unit 17 consists of a keyboard, a mouse, and the like and receives various types of information in accordance with an instruction operation of a user.

The storage unit 18 consists of a hard disk and the like and stores data of various types of information.

The communication unit 19 controls communication that is performed with other communication targets (for example, the camera 1 in FIG. 1) through the network N.

Removable media 21 such as a magnetic disk, an optical disk, an magneto-optical disk, or a semiconductor memory is inserted into the drive 20 when necessary. A program read from the removable media 21 by the drive 20 is installed into the storage unit 18 when necessary. Various types of data stored in the storage unit 18 may be stored in the removable media 21.

Figure 3:
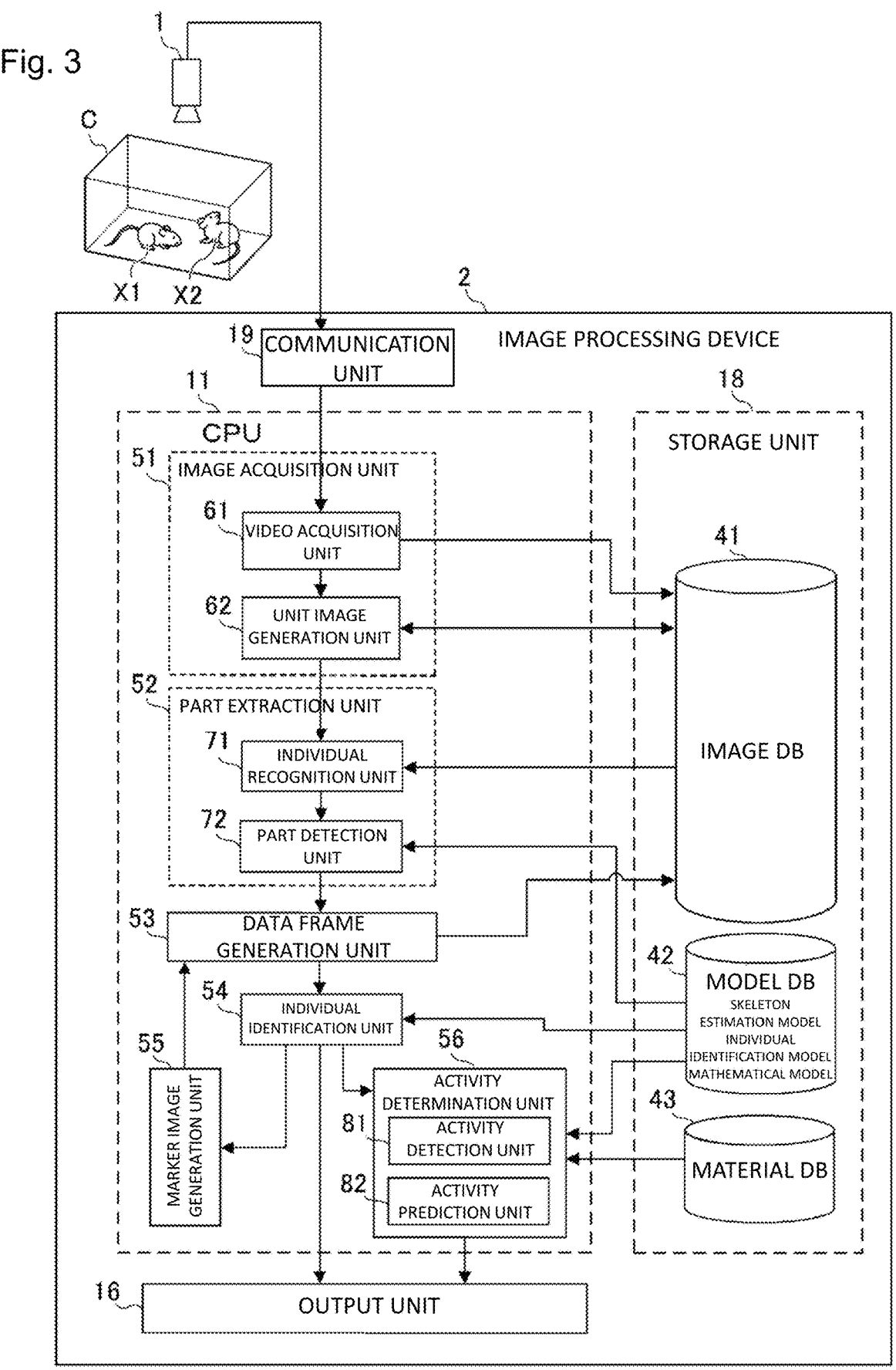
FIG. 3 is a functional block diagram showing a first embodiment of the information processing system of FIG. 1, that is, a first embodiment of the functional configuration of the image processing device of FIG. 2.

FIG. 3 is a functional block diagram showing a first embodiment of the information processing system of FIG. 1, that is, a first embodiment of the functional configuration of the image processing device 2 of FIG. 2.

An image DB 41, the model DB 42, and a material DB 43 are stored in the storage unit 18 of the image processing device 2 shown in FIG. 2.

The image DB 41 stores data on the video acquired from the camera 1, data on the multiple frame images forming the video (data on the still images), data on the tracking images in which the frame images are provided with the objects for tracking the animals, the markers representing the individuals, or the like, and a table indicating the transition of position information of the parts of the mice X1, X2 (data frame).

The model DB 42 is storing multiple types of learning models. Specifically, the model DB 42 is storing multiple (one or more) skeleton estimation models for estimating the skeletons of animals (mice, rats, and the like), multiple (one or more) individual identification models for identifying animals as individuals (if the same type of two animals are present, the animals are identified as different individuals), multiple (one or more) mathematical models for determining the activity of individual animals, and the like.

Each skeleton estimation model is a learning model created such that when receiving an image of an animal, it outputs the skeleton of the animal.

Each individual identification model is a learning model created such that when receiving the time series of one or more parts of the body of an animal, it outputs the animal as an individual.

Each mathematical model is a model created such that when receiving one or more images of an animal that changes with time, it outputs information indicating what kind of activity the activity of the animal is, that is, a model for analyzing the activity of the animal.

These types of models are learned learning data that is subjected to machine learning and updated with respect to previously prepared videos and still images of individual animals and, as a result, when newly receiving new videos or still images, identify animals or individuals in the input images, or analyze the activity of the individuals and output the analysis results. In this Description, such learned learning data is referred to as a "learning model."

Specifically, a previously selected mouse skeleton estimation model estimates, from a captured video of a state in which mice as an example of animals are doing activity, the disposition (skeleton) of the bones of the head, neck, arms, legs, tail, and the like of the one or more mice, a previously selected mouse individual identification model identifies individuals from the positions or movement of the feature points (parts such as the eyes, noses, ears, and tiptoes of the bodies of the mice) extracted from the skeletons of the animals, and a mathematical model determines the activity of the individuals and outputs the determination results.

That is, the learning models according to the first embodiment are learning models that analyze the individuals of animals or the activity of the individuals using a skeleton estimation technology, individual identification technology, and activity estimation technology.

Of the above models, for example, each skeleton estimation model receives data on any pixel (all pixels in the case of a model using CNN) in an image and calculates a proper value (the coordinates of the position of the nose or the probability of the coordinates of the nose) in accordance with an animal-specific model. The term "CNN" refers to a neural network formed centered on convolutional and pooling layers.

The learning models stored in the model DB 42 are reference learning models previously generated by a learning device (not shown) by applying machine learning to one or more (many) pieces of learning data, and newly learned data is also added.

For example, a convolutional learning neural network or the like can be used in machine learning. Note that the convolutional learning neural network is only illustrative and other machine learning techniques may be used. Moreover, the learning models need not be machine learning models, and an identifier that identifies animals as individuals using a predetermined algorithm may be used.

That is, the learning models may be of any type as long as they are learning models learned and generated such that when the skeletons, outlines, or movement of mice included in received images match those of known mice, the learning models provide and output the attributes of the mice.

The material DB 43 is storing data serving as materials for obtaining the reasons for the activity of the mice identified on the basis of the learning model, the sociality of the mice, or the like. The data in the material DB 43 is data in which the activity of the mice and the sociality derived from the activity or the relationships with other mice are associated with each other and can be used to determine various habits, ecology, or the like from the activity of mice.

For example, the data is data of mice movements as well as data from which the sociality of mice that do certain activity, the relationships with other mice of such mice, or the habits of such mice can be derived.

The material DB 43 is also storing data in which conditions under which mice do activity and the activity patterns of the mice derived from the conditions are associated with each other. That is, the material DB 43 is storing data serving as determination materials for determining what kind of activity the activity of mice detected from images by a mathematical model is. Examples of the data serving as determination materials include data on activity such as exploratory activity, eating/drinking, running/walking, sleeping, scratching, grooming, and fighting.

As shown in FIG. 3, the image processing device 2 includes an image acquisition unit 51, a part extraction unit 52, a data frame generation unit 53, an individual identification unit 54, a marker image generation unit 55, an activity determination unit 56, and the like.

The image acquisition unit 51 acquires a captured picture of a state in which one or more animals such as mice X1, X2 are doing activity in a predetermined activity range.

The image acquisition unit 51 includes a video acquisition unit 61 and a unit image generation unit 62.

The video acquisition unit 61 acquires a picture (video) captured by the camera 1. The unit image generation unit 62 generates an analysis target image consisting of multiple unit images arranged in the time direction, from the picture (video) acquired by the video acquisition unit 61 and stores the analysis target image in the image DB 41. That is, the unit image generation unit 62 generates a group of multiple frame-base unit images (still images; frame images) from the video.

The part extraction unit 52 extracts some parts of the body of each of the one or more animals from each of the unit images using a skeleton estimation model selected from the multiple skeleton estimation models in the model DB 42. That is, the part extraction unit 52 sequentially reads the multiple frame images from the image DB 41 and recognizes the image regions of animals doing activity on their own from the unit images included in the frame images. In other words, the part extraction unit 52 separates the outlines of the bodies of the animals from the background in each frame image and recognizes the image regions of the bodies of the animals.

The some parts of the body are, for example, one or more feature points such as the left and right eyes, the nose, the left and right ears, the tips of the left and right front legs, the tips of the left and right rear legs, the tip of the tail, bone joints, or the center of gravity of the body.

Each unit image consists of, for example, a frame image described above, one pixel, or multiple pixels.

The part extraction unit 52 includes an individual recognition unit 71 and a part detection unit 72.

The individual recognition unit 71 recognizes portions that change (move) in each of multiple unit images included in a frame image, as parts of one activity individual. Specifically, the individual recognition unit 71 binarizes each unit image and recognizes portions having a color different from that of the background as parts of an activity individual. The individual recognition unit 71 makes a comparison between preceding and following frame images and regards color-changing portions as the boundaries of regions.

The part detection unit 72 overlays a skeleton outputted from the skeleton estimation model on the regions of the portions recognized as parts of the activity individual in each of the multiple unit images, extracts parts of the body of an animal, and regards the parts as tracking points. The part detection unit 72 detects at least one or more parts, such as the nose and the left and right eyes, as parts of the body.

In the present embodiment, the parts of the body of each of the one or more animals are extracted from the images by combining the part extraction unit 52 including the individual recognition unit 71 and part detection unit 72 with the skeleton estimation model. Alternatively, the parts of the bodies of the animals may be extracted by previously storing a part extraction model that when receiving a unit image, outputs parts of the bodies of animals, in the model DB 42 and inputting unit images to the model DB 42.

The data frame generation unit 53 converts the parts of the bodies extracted by the part extraction unit 52 into data frames.

The data frame generation unit 53 specifies the positions of the particular parts (eyes, nose, ears, legs, tail, skeletons, or the like) of the animals using coordinates representing the distance from a predetermined reference point in each image, for each of the regions of the animals.

Specifically, the data frame generation unit 53 generates tables in which the parts of the bodies extracted by the part extraction unit 52 and position information representing the parts using a two-dimensional (plane) coordinate system (x-axis, y-axis, or the like) having, as a reference, a certain reference point in the cage C included in each frame image or the parts of the activity individual are associated with each other. The generated tables are referred to as data frames. The x-axis refers to the horizontal axis of the two-dimensional (plane) coordinate system, and the y-axis refers to the vertical axis of the plane.

That is, the data frame generation unit 53 generates data frames indicating the transition of the positions of the parts that change with the activity of each animal.

Note that to acquire spatial positions as tracking points, a three-dimensional coordinate system (x-axis, y-axis, z-axis) is used. The z-axis refers to the depth axis of the three-dimensional coordinate system.

The individual identification unit 54 identifies the one or more animals as individuals in the multiple unit images on the basis of an output obtained by inputting the time series of the parts of the bodies of the one or more animals extracted from the multiple unit images by the part extraction unit 52 to an individual recognition model selected from the multiple individual recognition models in the model DB 42.

Specifically, the individual identification unit 54 analyzes the one or more parts extracted from the multiple unit images by the part extraction unit 52 in a time-series manner using an individual recognition model selected for the images from the multiple individual recognition models and identifies the one or more mice X1, X2 as individuals in the multiple unit images on the basis of the analysis results.

The individual identification unit 54 analyzes a state in which the position coordinates of the parts change with the lapse of time and identifies (classifies as different individuals) the one or more animals included in the frame images on the basis of the analysis results.

In other words, the individual identification unit 54 determines what animals' parts the one or more parts are, or what animals the individual animals having those parts are.

Specifically, the individual identification unit 54 analyzes the data frames generated by the data frame generation unit 53 in a time-series manner with reference to the model DB 42, identifies the one or more mice X1, X2 as individuals in the data frames on the basis of the analysis results, and provides the individual IDs of the identified mice X1, X2 to the tracking points.

For example, the individual identification unit 54 converts the positional relationship between the parts of the individuals at any time point or the frequency with which a predetermined condition is satisfied, into data.

As used herein, the term "predetermined condition" refers to, for example, that a part and another part are present in predetermined coordinate positions (predetermined range) for a predetermined period of time, that a state in which the distance between a part of an individual and a part of another individual is zero or close to zero continues for a predetermined period of time, or the like.

The individual identification unit 54 instructs the marker image generation unit 55 to generate images in which at least one of markers indicating tracking points of the mice X1, X2 identified by the individual identification unit 54 and objects for visually identifying the individual mice X1, X2 are superimposed on the unit images and outputs the obtained marker-provided images (tracking images) to the output unit 16.

The marker image generation unit 55 generates the marker-provided images in which the markers indicating the individual mice X1, X2 identified by the individual identification unit 54 are associated with the parts of the bodies of the mice X1, X2 extracted by the part extraction unit 52.

Specifically, the marker image generation unit 55 generates the marker-provided images (tracking images) in which the unit images are provided with the markers that allow the user to visually identify the individual mice X1, X2 identified by the individual identification unit 54. The markers are, for example, individual IDs (characters) or tracking points for the respective individuals. The objects are contours, frames, mask images, or the like colored in different colors for the respective individuals.

The activity determination unit 56 determines the activity of the one or more mice X1, X2 identified by the individual identification unit 54. The activity here includes the activity of the respective mice X1, X2, as well as the engagement activity between the multiple mice X1, X2 present in the unit images, and the like.

Specifically, when the transition of the positions of the parts in the data frames satisfies one of previously set one or more conditions, the activity determination unit 56 determines activity corresponding to the satisfied condition.

More specifically, the activity determination unit 56 determines whether the transition of the coordinates of the parts matches one of the previously set conditions for each of the animals identified (classified) by the individual identification unit 54, on the basis of a mathematical model selected from the multiple mathematical models in the model DB 42 and the material data in the material DB 43 and provides an animal activity label corresponding to the matched condition ("01" for scratching activity, "02" for sleeping, "03" for grooming activity, or the like) to the time information (time stamp) of the frame images including the parts or the data frames.

Thus, for example, when, in the environment in which the two mice X1, X2 are housed and are doing activity in the cage C, the frequency with which the nose (part) of one mouse, X1, contacts the nose (part) of the other mouse, X2, exceeds a predetermined frequency in a predetermined period of time, an inference that the individuals are doing grooming activity in which they are attempting to build friendship, an inference that they are attempting reproductive activity if they are a male and a female, or the like is derived.

The activity determination unit 56 includes an activity detection unit 81 and an activity prediction unit 82.

If a condition defining the positional relationship between the a part of an animal and another particular part (watering place, feeding place, a part of another animal) is satisfied, the activity detection unit 81 detects activity related to the positional relationship.

Specifically, with reference to the model DB 42 and material DB 43, the activity detection unit 81 determines whether the positional relationship between the parts of the mice xX1, X2 at any time point in a data frame or the positional relationship between the mice X1, X2 and another life-related member (watering place, feeding place, etc.) in the cage C satisfies a condition in the material DB 43 and detects activity corresponding to the satisfied condition. Here, the activity detection unit 81 detects at least one of the sociality of the respective mice X1, X2, the interaction between the mice X1, X2 present in the same activity range, and the relationship between the mice X1, X2.

The activity prediction unit 82 predicts how the mice X1, X2 will live from now on, on the basis of the relationship between the mice X1, X2 detected by the activity detection unit 81.

Figure 4:
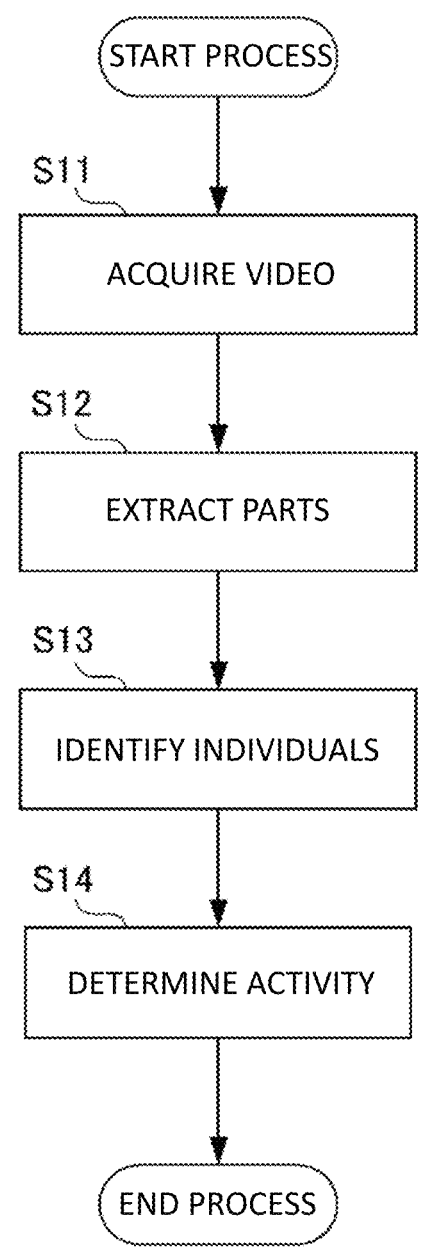
FIG. 4 is a flowchart showing the operation of the image processing device having the functional configuration of FIG. 3.

Next, referring to FIG. 4, image processing performed by the information processing device will be described. FIG. 4 is a flowchart showing an example of the flow of image processing performed by the information processing device having the functional configuration of FIG. 3.

In the information processing system according to the first embodiment, the camera 1 captures an image (here, a video) of the one or more mice X1, X2 doing activity in the cage C and inputs the video to the image processing device 2, and the image processing device 2 performs image processing as follows to assist in identifying the one or more individual mice X1, X2 as individuals and determining the personality, sociality, or the like of the mice X1, X2.

In step S11, the image acquisition unit 51 acquires the image (for example, video) that is a captured image of a state in which the one or more animals are doing activity in the predetermined activity range and that consists of multiple unit images arranged in the time direction.

In step S12, the part extraction unit 52 extracts some parts (the eyes, nose, ears, legs, parts of bones or joints, the center of gravity of the body, or the like) of the body of each of the one or more animals from each of the multiple unit images included in the acquired video.

In step S13, the individual identification unit 54 analyzes the multiple parts extracted from each of the multiple unit images by the part extraction unit 52 in a time-series manner and identifies the one or more animals as individuals in each of the multiple unit images on the basis of the analysis results.

The phrase "identify as individuals" refers to, for example, providing an individual ID such as "0" to a part of the mouse X1 of the mice X1, X2 housed in the cage C as shown in FIGS. 1 and 3 to identify the mouse X1 as an individual "0" and providing an individual ID such as "1" to a part of the mouse X2 to identify the mouse X2 as an individual "1".

In step S14, the activity determination unit 56 determines the activity of the one or more mice X1, X2 identified by the individual identification unit 54.

In the image processing device 56, the activity detection unit 81 detects at least one of the sociality of the respective mice X1, X2, the interaction between the mice X1, X2 present in the same activity range, and the relationship between the mice X1, X2 on the basis of the positional relationship between the parts of the mice X1, X2 at any time point.

As described above, the image processing device 2 extracts the some parts of the body of each of the mice X1, X from the captured video of the state in which the two mice X1, X2 are doing activity in the cage C, analyzes the extracted parts in a time series manner, identifies the mice X1, X2 as individuals, and displays the tracking images in which the identified individuals are provided with the markers, such as individual IDs or tracking points, or objects for identifying individuals. This allows the user to identify the individual mice X1, X2 present and doing activity in the same images as individuals.

The image processing device 2 also detects, as the activity of the mice X1, X2, for example, the sociality of the mouse X1 and mouse X2, the interaction between the mice X1, X2 present in the same activity range, the relationship between the mice X1, X2, or the like. This allows the user to consider the master-slave relationship (dominance, subordination, etc.), habits, ecology, or the like of the mouse X1 and mouse X2.

Next, referring to FIGS. 5 and 11, the procedure of image processing performed by the image processing device 2 in the present information processing system will be described.

Figure 5:
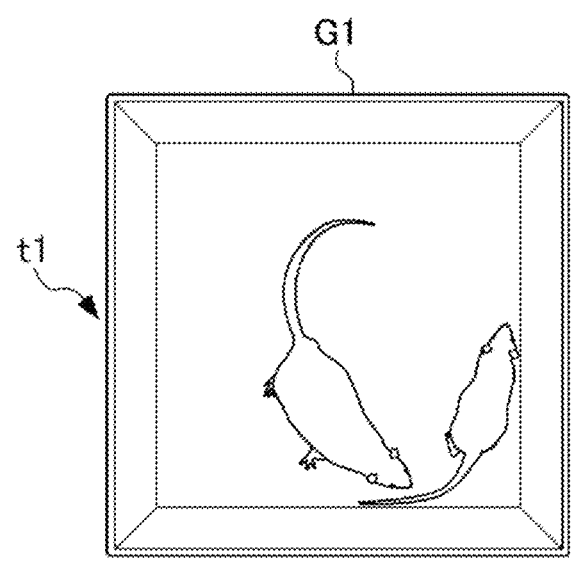
FIG. 5 is a drawing showing an example of a unit image acquired from a picture.
Figure 6:
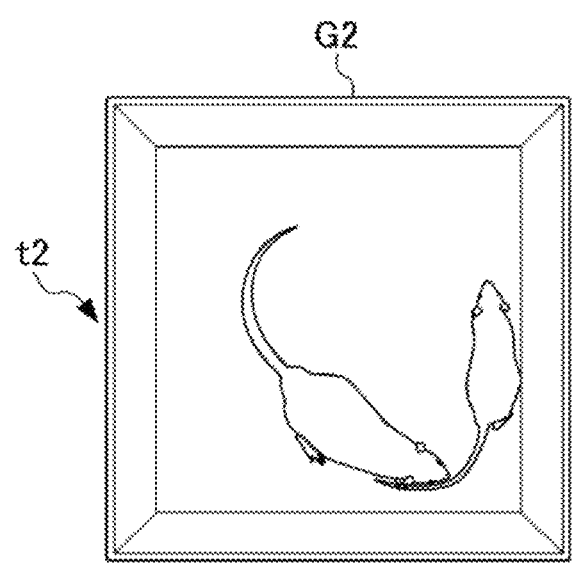
FIG. 6 is a drawing showing an example of a unit image acquired from the picture following the unit image of FIG. 5.
Figure 7:
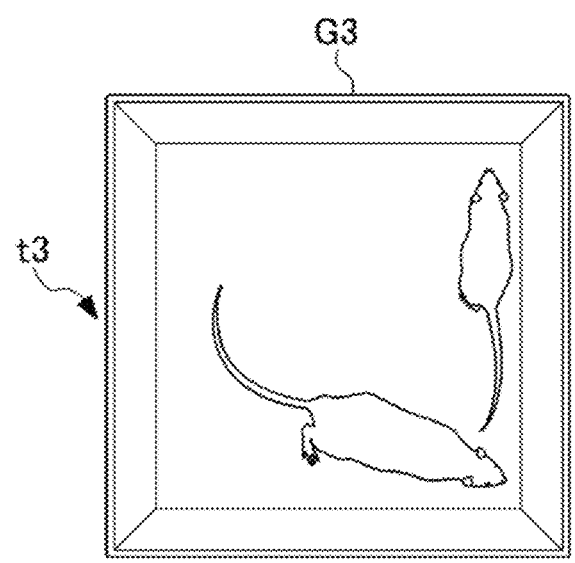
FIG. 7 is a drawing showing an example of a unit image acquired from the picture following the unit image of FIG. 6.
Figure 8:
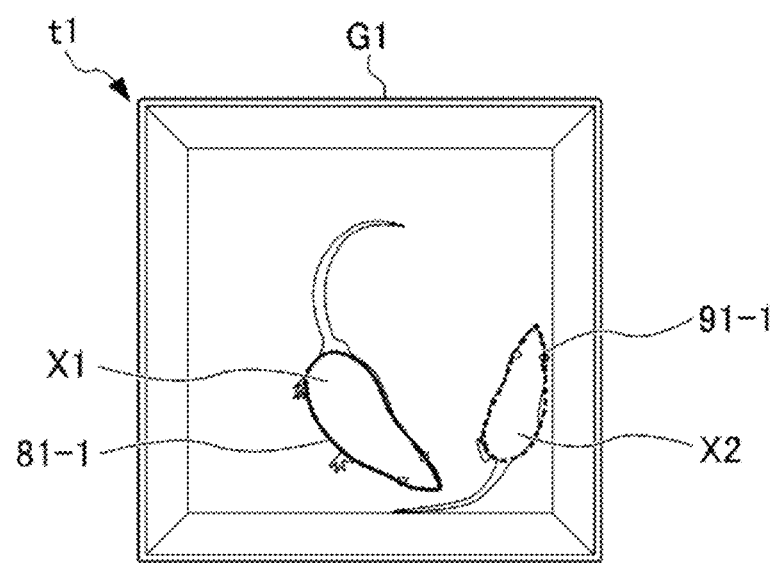
FIG. 8 is a drawing showing a state in which individuals are identified from the unit image of FIG. 5.
Figure 9:
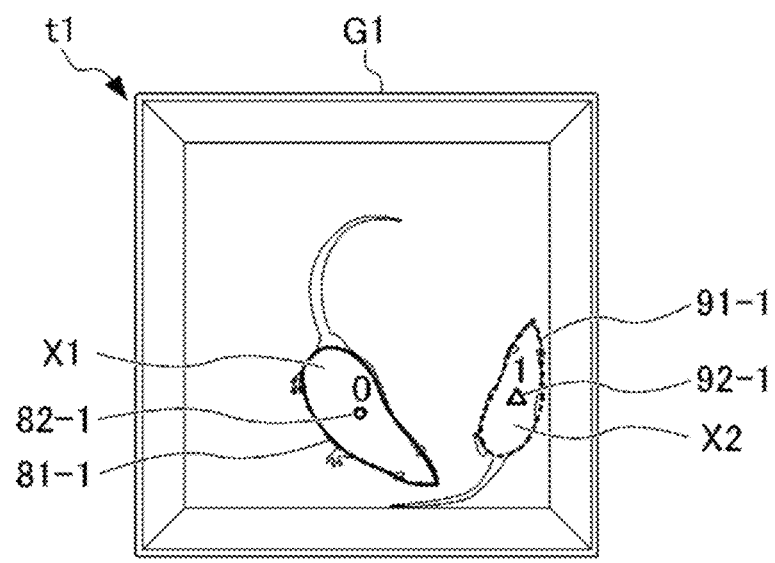
FIG. 9 is a drawing showing a state in which parts are detected from the unit image of FIG. 8.
Figure 10:
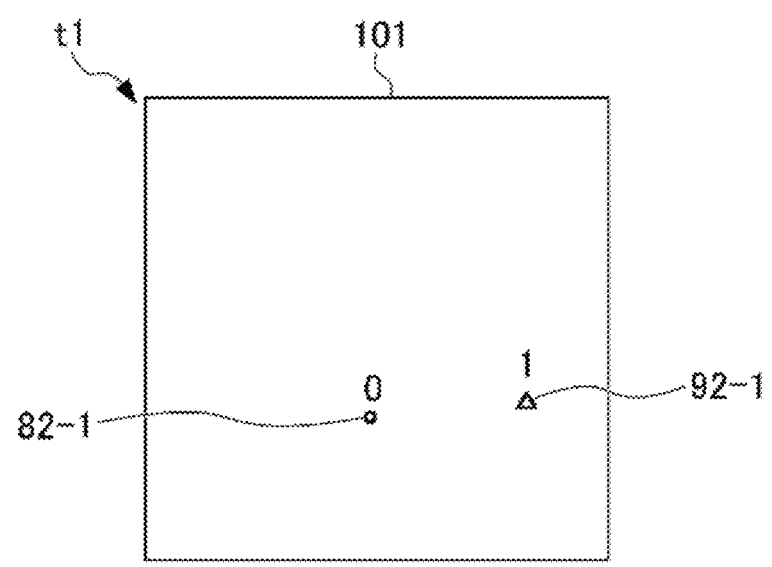
FIG. 10 is a drawing showing a state in which the parts of FIG. 9 are extracted.

FIG. 5 is a drawing showing an example of a frame image acquired from the video. FIG. 6 is a drawing showing an example of a frame image acquired from the video following the frame image of FIG. 5. FIG. 7 is a drawing showing an example of a frame image acquired from the video following the frame image of FIG. 6. FIG. 8 is a drawing showing a state in which individuals are identified in the frame image of FIG. 5. FIG. 9 is a drawing showing a state in which parts are detected from the frame image of FIG. 8. FIG. 10 is a drawing showing a state in which the parts of FIG. 9 are extracted. FIG. 11 is a drawing showing a state in which the parts extracted from the frame images of FIGS. 5 to 8 are tracked. FIG. 12 is a drawing showing a tracking image in which the frame image at time t3 of FIG. 7 is provided with markers.

In the present information processing system, the camera 1 captures the video of the inside of the cage C are transmits the captured video to the image processing device 2.

In the image processing device 2, the image acquisition unit 51 acquires frame images G1, G2, G3 from the video received from the camera 1 in a time-series manner in the order of times t1, t2, t3, as shown in FIGS. 5 to 7.

Then, in the part extraction unit 52, the individual recognition unit 71 binarizes unit images (pixels) included in, for example, the frame image G1 at time t1 so that the background (cage) and the bodies of the white mice X1, X2 are separated and the regions of the individuals are recognized. In this example, as shown in FIG. 8, the region 81-1 of the body of the mouse X1 and the region 91-1 of the body of the mouse X2 are recognized.

Then, as shown in FIG. 9, the part detection unit 72 detects one or more parts 82-1, 92-1 of the regions 81-1, 91-1 as tracking points for tracking activity.

In an example shown in FIG. 9, the part detection unit 72 calculates the center of gravity of the region 81-1 and detects two-dimensional coordinates (x1, y1) indicating the part 82-1 corresponding to the center of gravity of the region 81-1 on the frame image G1 as a tracking point. "0" is provided to the part 82-1 as an individual ID.

Similarly, the part detection unit 72 calculates the center of gravity of the region 91-1 and detects two-dimensional coordinates (x2, y2) indicating the part 92-1 corresponding to the center of gravity of the region 91-1 on the frame image G1 as a tracking point. "1" is provided to the part 92-1 as an individual ID.

As seen above, the one or more parts of the animals are detected, and the movement of the bodies is converted into data from the parts obtained as the detection results.

The method of obtaining the center of gravity of each region and regarding the position of the center of gravity as a tracking point described in the present embodiment is only illustrative. Alternatively, one or more parts of each animal, such as the left and right eyes, nose, the left and right front legs, the left and right rear legs, the joints of the legs, the outlines or centers of the ears, the spine, or the center, hairline, or tip of the tail, may be detected as tracking points.

By detecting one or more parts of each animal, tracking the parts in a time-series manner, and comparing them with a learning model in the model DB 42 as described above, the animal is identified as an individual having a skeleton that makes such movement, that is, it is determined what kind of animal the animal is.

The parts (tracking points) of the body thus detected are extracted, and tracking data 101 including the extracted parts 82-1, 92-1 and the individual IDs is generated as shown in FIG. 10.

The above process of generating the tracking data 101 is performed also with respect to the frame images G2, G3, and the generated tracking data is analyzed in a time-series manner. Thus, the positional relationship between the parts of the individual mice X1, X2 or the frequency with which the predetermined condition is satisfied at any time point can be converted into data.

Figure 11:
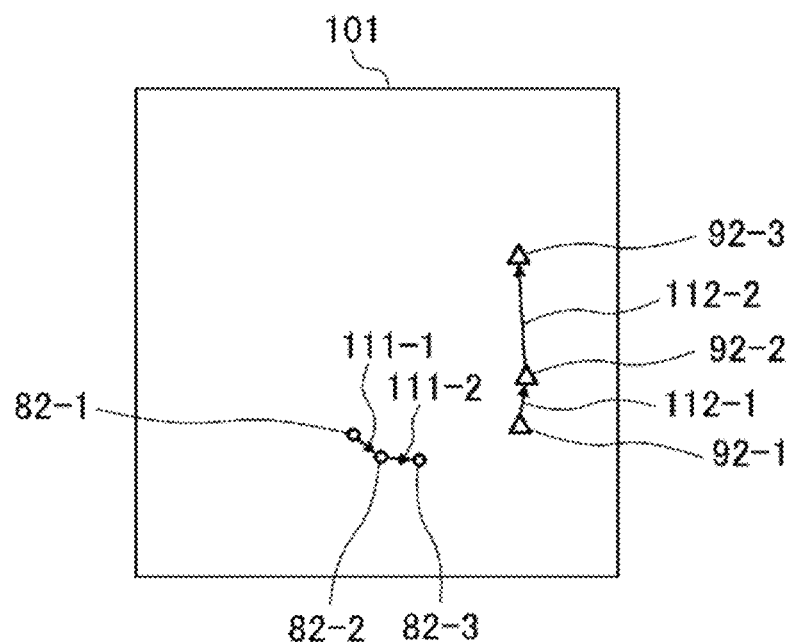
FIG. 11 is a drawing showing a state in which the parts extracted from the unit images of FIGS. 5 to 7 are tracked.
Figure 12:
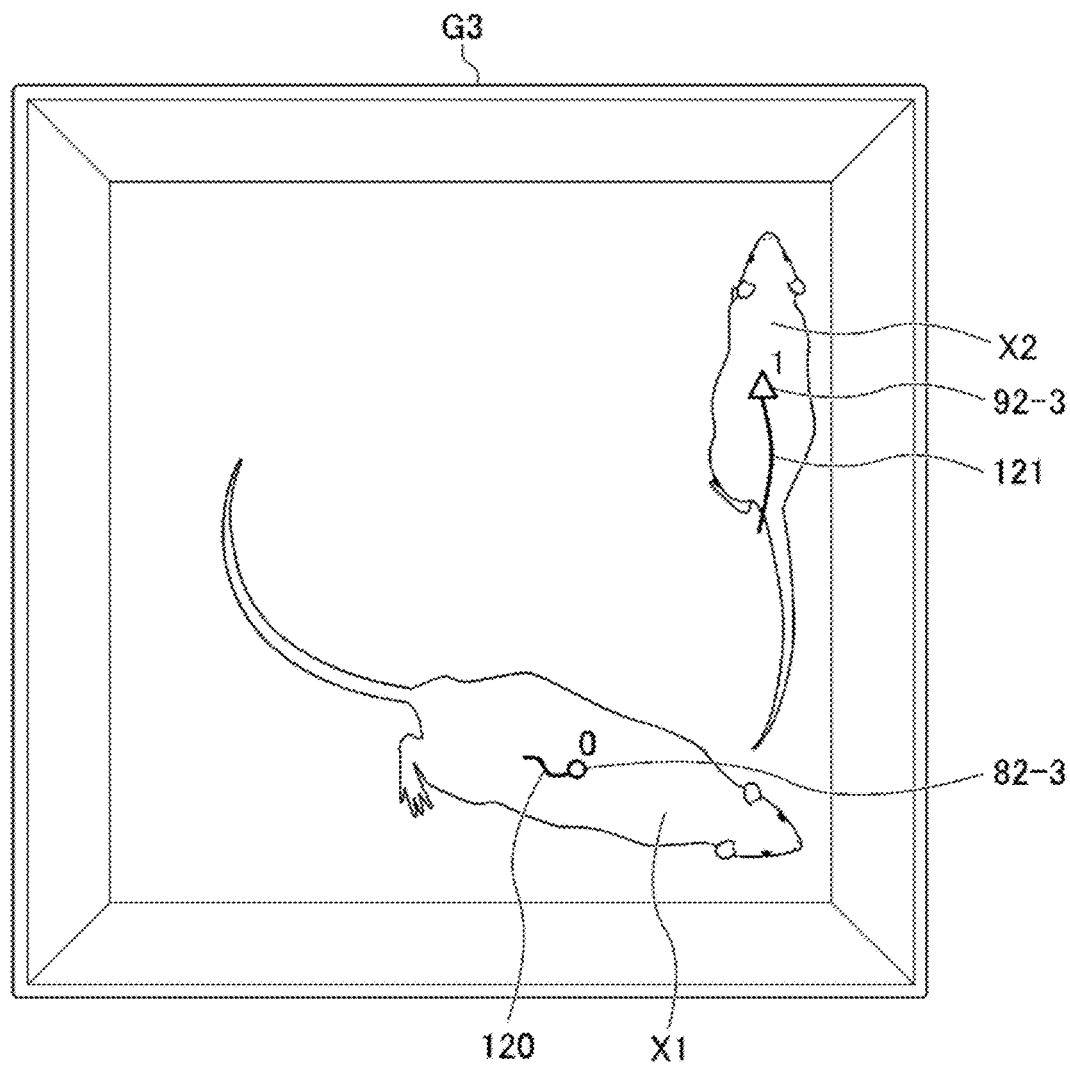
FIG. 12 is a drawing showing a tracking image in which the unit image at time t3 of FIG. 7 is provided with markers.

For example, by stacking the tracking data 101 including the parts generated so as to correspond to the frame images G1 to G3, as shown in FIG. 11, activity trajectories associated with the activity of the animals are obtained. That is, the movement trajectory of the mouse X1 is obtained as vector data 111-1, 111-2 indicating the movement trajectory of the parts 82-1, 82-2, and 82-3. The movement trajectory of the mouse X2 is obtained as vector data 112-1, 112-2 indicating the movement trajectory of the parts 92-1, 92-2, and 92-3.

Then, the marker image generation unit 55 generates an image in which the markers indicating the parts of the animals, the individual IDs, or the like are superimposed on the unit image. Thus, a tracking image G3A is displayed as shown in FIG. 12.

In the tracking image G3A, the frame image G3 (see FIG. 7) at time t3 is provided with, for example, a marker (circle mark) indicating the part 82-3 of the mouse X1, the individual ID "0", and a trajectory line 120.

The tracking image G3A also shows a marker (triangle mark) indicating the part 92-3 of the mouse X2, the individual ID "1", and a trajectory line 121.

By reproducing the tracking image while holding the trajectory lines 120, 121 from times t1, t2 of the frame images G1, G2 for a predetermined period of time (for example, about 0.5 sec), a video in which the mice X1, X2 move with the trajectory lines 120, 121 displayed residually is reproduced.

Referring to FIGS. 13 to 15, some examples in which the activity of the individual mice is determined from the positional relationship between the one or more parts of the mice and the sociality, interaction, or relationship is detected will be described.

FIG. 13 is a drawing showing an example in which the watering activity of the mice is detected. FIG. 14 is a drawing showing an example in which the feeding activity of the mice is detected. FIG. 15 is a drawing showing an example in which the mutual interference activity between the mice is detected.

As shown in FIG. 13, the image processing device 2 extracts particular parts (in this example, the nose and the left and right eyes) of the mice as tracking points from the video of the cage housing the mice captured by the camera 1, tracks the positions (coordinates x, y) of the tracking points in a time-series manner, and thus acquires the coordinates indicating the positions of the nose and the left and right eyes of each individual mouse in each frame image.

In the image processing device 2, the activity determination unit 56 determines the activity of the animals on the basis of whether time-series changes in the positions of the predetermined parts of the animals match a predetermined condition.

Specifically, if the distance between the position (coordinates) of the nose of a mouse and the position (coordinates) of a watering outlet mounted on the wall surface of the cage is continuously zero or close to zero in certain multiple frames, for example, (parenthesized) frames Nos. 150 to 156 of FIG. 13, the activity determination unit 56 determines that that the mouse is doing watering activity.

Also, if the distance between the position (coordinates) of the nose of a mouse and the position (coordinates) of a feeding place disposed in the cage is continuously zero or close to zero in (parenthesized) frames Nos. 150 to 156 of FIG. 14, the movement determination unit 56 determines that the mouse is doing feeding activity.

Also, if the distance between the position (coordinates) of the nose of a mouse and the position (coordinates) of the nose of another mouse is continuously zero or close to zero in (parenthesized) frames Nos. 150 to 156 of FIG. 15, the activity determination unit 56 determines that the mice are doing mutual interference activity.

As described above, the image processing device 2 in the information processing system according to the first embodiment extracts the some parts of the body of each of the mice X1, X from the captured video of the state in which the two mice X1, X2 are doing activity in the cage C, analyzes the positions of the extracted parts in a time-series manner, and identifies the mice X1, X2 as individuals. This allows the user to identify the mice X1, X2 as individuals in the captured video of the mice X1, X2 doing activity in the predetermined activity range.

The image processing device 2 also determines that the activity of one mouse is, for example, watering activity, feeding activity, mutual interference activity with the other mouse present in the same activity range, or the like. This allows the user to consider the habits, ecology, master-slave relationship (dominance, subordination, etc.) of the mice.

On the premise that the positions of the parts do not significantly change between the preceding and following frames, the individual identification unit 54 is able to properly identify the individuals from the continuity of the positions of the parts extracted in the preceding frames.

The individual identification unit 54 identifies the individuals on the basis of the outlines or the position information of the parts and thus is able to properly identify the individuals without depending on the brightness or background of the image capture environment.

Next, referring to FIG. 16, a second embodiment will be described. Note that, in the second embodiment, the same components as the functional components of the first embodiment shown in FIG. 3 are given the same reference signs and will not be described.

Figure 16:
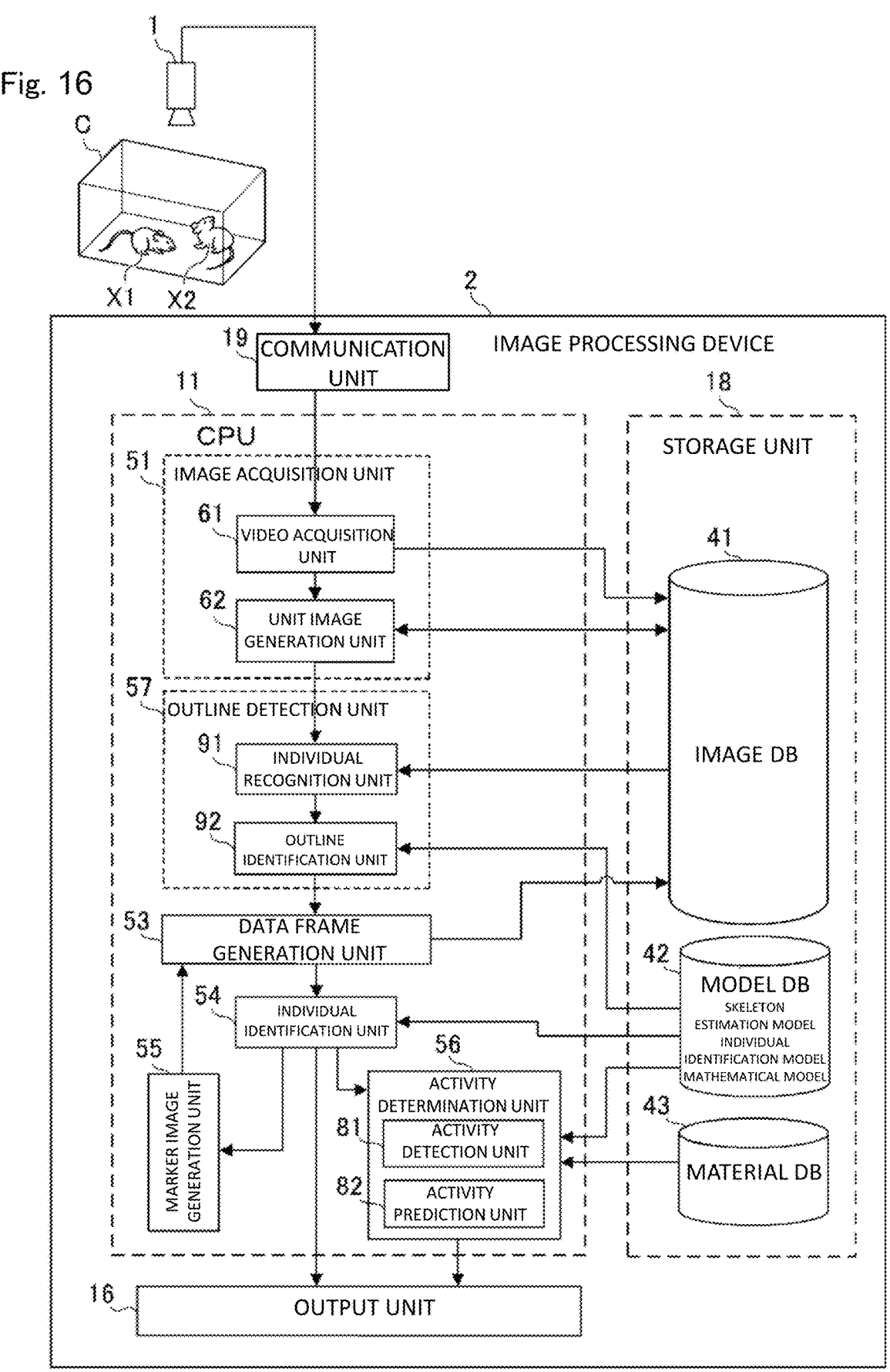
FIG. 16 is a functional block diagram showing a second embodiment of the information processing system of FIG. 1, that is, a second embodiment of the functional configuration of the image processing device 2 of FIG. 2.

FIG. 16 is a functional block diagram showing a second embodiment of the information processing system of FIG. 1, that is, a second embodiment of the functional configuration of the image processing device 2 of FIG. 2.

An image processing device 2 includes an outline detection unit 57. The outline detection unit 57 detects the outline of the body of each of one or more animals from each of multiple unit images using a skeleton estimation model selected from multiple skeleton estimation models in a model DB 42.

The outline detection unit 57 includes an individual recognition unit 91 and an outline identification unit 92.

The individual recognition unit 91 recognizes a region including a unit image making a change (movement) as one activity individual in each of the multiple unit images.

Specifically, the individual recognition unit 91 binarizes each unit image and recognizes parts having a color different from that of the background as parts of an activity individual. Preferably, a comparison is made between preceding and following frame images, the color-changing parts are regarded as the boundary of the region.

The outline identification unit 92 identifies the region including the parts recognized as the parts of the activity individual, as the outline of the body of each of one or more mice X1, X2 in each of the multiple unit images.

A data frame generation unit 53 generates data frames (see FIG. 22) indicating the probability that a change in the outline of each animal associated with the activity of the animal is particular activity.

An individual identification unit 54 identifies the one or more animals as individuals in each of the multiple unit images on the basis of an output obtained by inputting the time series of the outline of the body of each of the one or more animals extracted from each of the multiple unit images by the outline detection unit 57 to the skeleton estimation model in the model DB 42.

The individual identification unit 54 analyzes the one or more outlines detected from the multiple unit images by the outline detection unit 57 in a time-series manner and identifies the one or more animals as individuals in the multiple unit images on the basis of the analysis results.

Specifically, the individual identification unit 54 identifies the mice X1, X2 as individuals by analyzing the one or more outlines detected from the multiple frame images in a time-series manner with reference to the model DB 42 and outputs information on the individual mice X1, X2 (the individual IDs, the positions of the outlines, or the like) obtained as the identification results to the activity determination unit 56. That is, the individual identification unit 54 determines whether the detected outline is that of the mouse X1 of the two mice X1, X2 in the cage or that of the mouse X2.

In the second embodiment, the learning models stored in the model DB 42 are learned learning data that is subjected to machine learning with respect to previously prepared videos and still images of individual mice and, as a result, when newly receiving new videos or still images, identifies mice as individuals in the received images and outputs information on the identified individuals (the individual IDs, the positions of the outlines, or the like).

Specifically, for example, when the captured video of the state in which the mice are doing activity is inputted to a learning model in the model DB 42, the learning model outputs the individual IDs of the one or more mice included in the video and the positions of the outlines (body contours) of the mice having the individual IDs in the video.

That is, the learning models according to the second embodiment are learning models using a skeleton estimation technique, and the individual identification unit 54 is able to detect the positions of the outlines of the individuals from the regions of the identified individuals using this skeleton estimation technique.

The activity determination unit 56 converts, for example, the general activity of each individual at any time point or the frequency with which a predetermined condition is satisfied, into data on the basis of the information on the individuals received from the individual identification unit 54 and checks the activity of the individuals or the frequency against data in a material DB 43.

Specifically, if the value of the probability that the activity of the individuals is particular activity in a data frame satisfies one of one or more previously set conditions, the activity determination unit 56 determines activity corresponding to the satisfied condition.

As used herein, the phase "one or more conditions" refers to, for example, one or more of a condition that one mouse does the general activity of curling up itself, a condition that the other mouse does the general activity of snuggling up to the body of the curled-up mouse, and a condition that the frequency is a certain frequency or more.

The activity determination unit 56 refers to the material DB 43 and, when the activity of the mice identified by the individual identification unit 54 satisfies these conditions, determines that the mice have a good relationship and are becoming a pair.

As seen above, the functional configuration of the image processing device 2 in the information processing system according to the second embodiment produces advantageous effects similar to those of the first embodiment. Further, it produces the following advantageous effects.

That is, the image processing device 2 configured as described above extracts the outlines of the bodies of the two mice X1, X2 from the captured video of the state in which the mice X1, X2 are housed and are doing activity in the cage C, analyzes the detected outlines in a time-series manner, identifies the mice X1, X2 as individuals, and thus allows the user to identify the mice X1, X2 present and doing activity in the same image as individuals.

Second Embodiment

Figure 17:
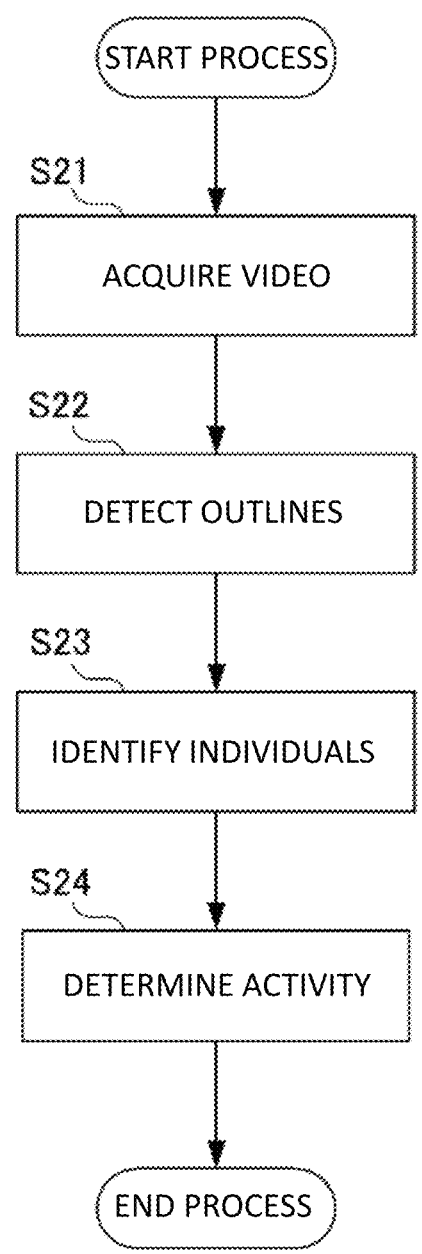
FIG. 17 is a flowchart showing the operation of the image processing device having the functional configuration of FIG. 16.

Next, referring to FIG. 17, image processing operations performed by an information processing device having the functional configuration according to the second embodiment of FIG. 16 will be described. Note that, in the description of the image processing operations according to the second embodiment, the same operations as those of the first embodiment shown in FIG. 4 are given the same step numbers as those in FIG. 4 and will not be described. FIG. 17 is a flowchart showing an example of the flow of image processing performed by the information processing device having the functional configuration of FIG. 16.

In the second embodiment, in step S21, the video is acquired from the camera 1. In step S22, the outline detection unit 57 detects the outlines of the bodies of the one or more animals from each of the unit frames of the multiple frame images included in the acquired video.

In step S23, the individual identification unit 54 analyzes the outlines extracted from the multiple unit images by the outline detection unit 57 in a time-series manner and identifies the one or more animals as individuals in the multiple unit images on the basis of the analysis results. Step S24 and later processes are similar to those of the first embodiment (FIG. 4).

The image processing device 2 having the functional configuration according to the second embodiment detects the outlines of the bodies of the mice X1 and X2 from each of the unit images of the multiple frame images included in the video acquired from the camera 1, analyzes a state in which the outlines change with the activity of the mice X1, X2 in a time-series manner, and thus identifies the mice X1, X2 as individuals. This allows the user to identify the mice X1, X2 shown in the same image as individuals.

Also, the image processing device 2 monitors a state in which the outlines of the identified mice X1, X change in a time-series manner and, when the predetermined conditions are satisfied, detects that the activity of the mice X1, X2 is particular activity. This allows the user to find not only the existing ecology but also new ecology.

Next, referring to FIGS. 18 to 22, the procedure of image processing performed by the image processing device in the present information processing system will be described.

Figure 18:
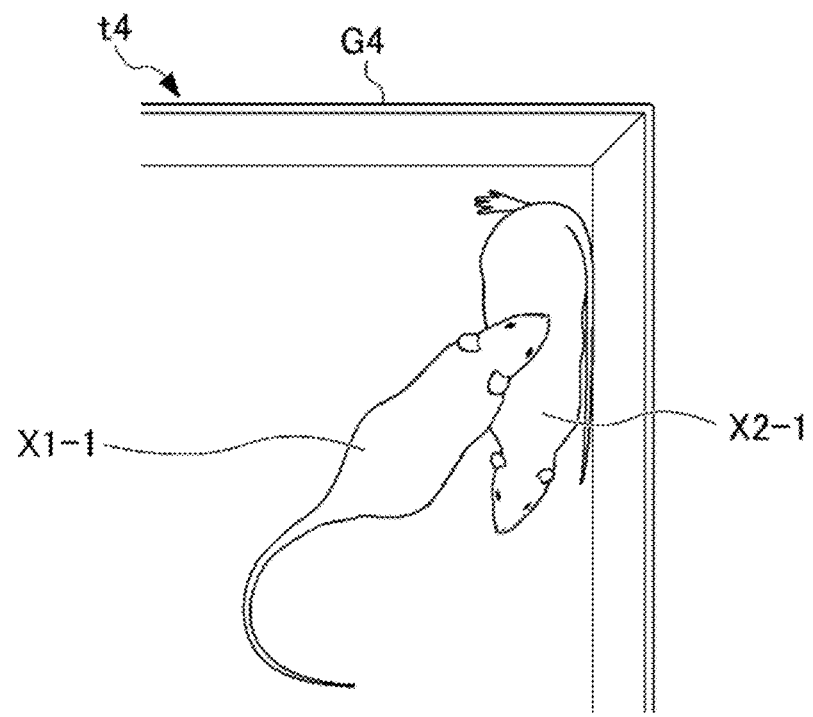
FIG. 18 is a drawing showing an example of a unit image acquired from a picture.
Figure 19:
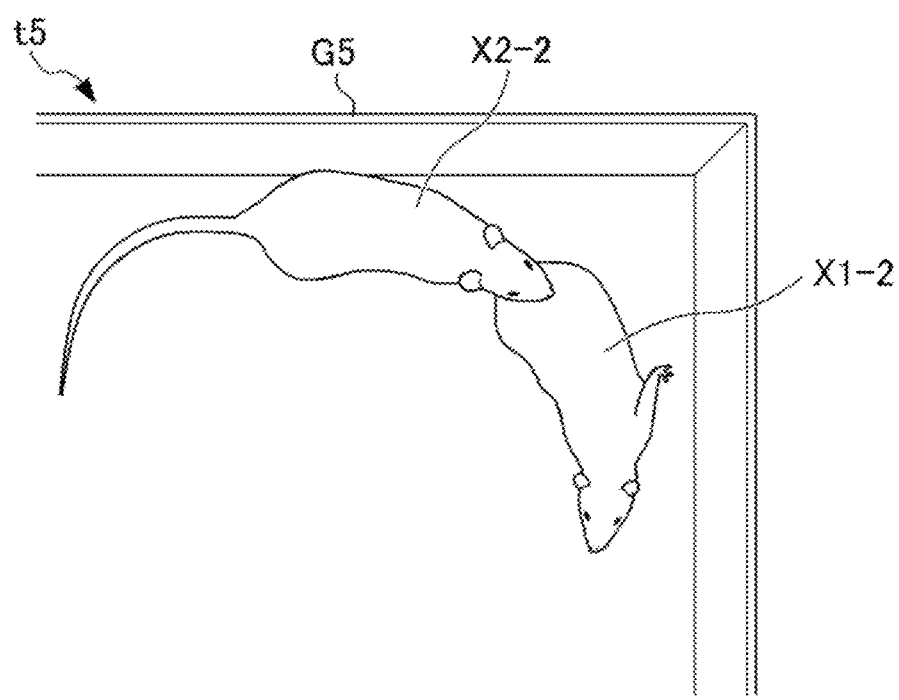
FIG. 19 is a drawing showing an example of a unit image acquired from the picture following the unit image of FIG. 18.
Figure 20:
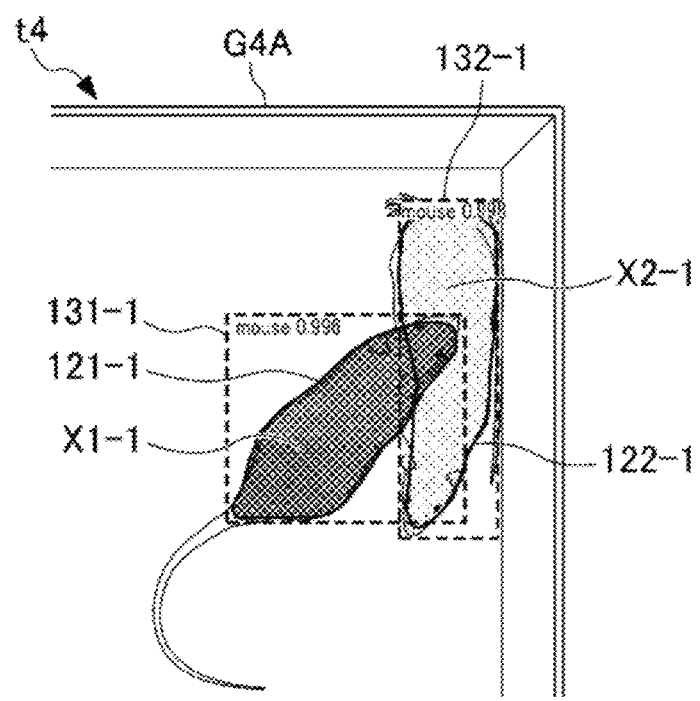
FIG. 20 is a drawing showing a state in which outlines are detected from the unit image of FIG. 18.
Figure 21:
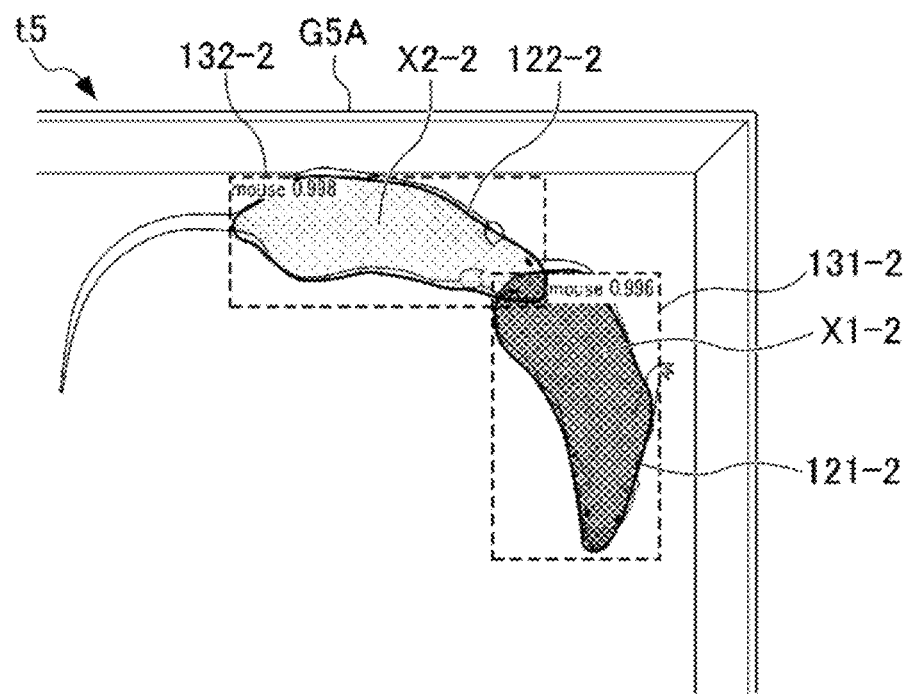
FIG. 21 is a drawing showing a state in which outlines are detected from the unit image of FIG. 19.
Figure 22:
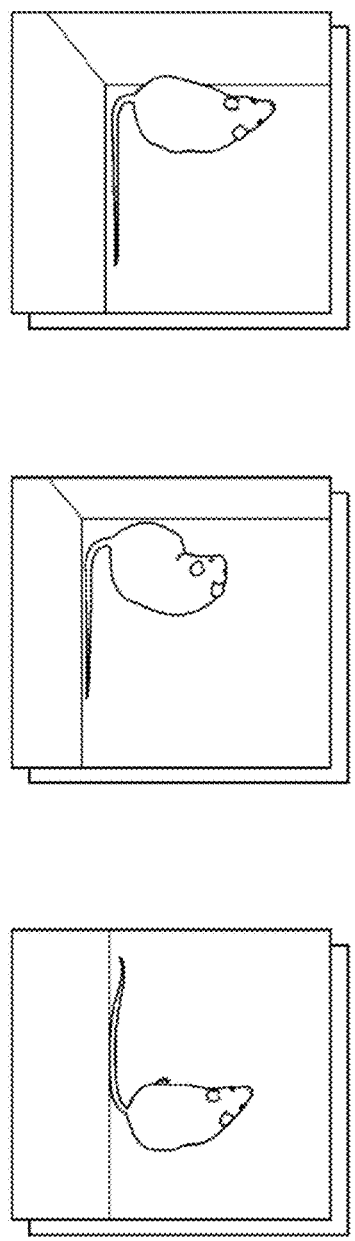
FIG. 22 is a drawing showing an example in which scratching activity is detected.

FIG. 18 is a drawing showing an example of a frame image acquired from the video. FIG. 19 is a drawing showing an example of a frame image acquired from the video following the frame image of FIG. 18. FIG. 20 is a drawing showing a tracking image in which the frame image at time t4 of FIG. 18 is provided with objects indicating outlines and individual markers. FIG. 21 is a drawing showing a tracking image in which the frame image at time t5 of FIG. 19 is provided with objects indicating outlines and individual markers. FIG. 22 is a drawing showing an example in which scratching activity is detected.

In the description with reference to FIGS. 18 to 21, one of the two mice shown in the frame images is referred to as a mouse X1-1 in the frame image G4 at time t4 and is referred to as a mouse X1-2 in the frame image G5 at time t5. Similarly, the other mouse is referred to as a mouse X2-1 and a mouse X2-2, respectively.

In the present information processing system, the camera 1 captures the video of the inside of the cage C and transmits the video to the image processing device 2.

In the image processing device 2, the image acquisition unit 51 sequentially acquires the frame image G4 at time t4 shown in FIG. 18 and the frame image G5 at time t5 shown in FIG. 19 in a time-series manner from the video received from the camera 1.

Then, in the outline detection unit 57, the individual recognition unit 91 binarizes unit images included in, for example, the frame image G4 at time t4 so that the background (cage) and the bodies of the white mice form regions having different colors and the regions of the respective individuals are recognized. As a result, the regions of the bodies of the two mice are individually recognized.

FIG. 20 shows an example display of a tracking image G4A in which individuals are identified. In this example display of the tracking image G4A, a blue object 121-1 is displayed on the outline (body contour) of the mouse X1-1, and a red object 122-1 is displayed on the outline (body contour) of the mouse X2-1.

Also, markers such as an individual ID "mouse0.996" for identifying the mouse X1-1 as an individual and a frame 131-1 surrounding the individual are displayed in the tracking image G4A.

Similarly, markers such as an individual ID "mouse0.998" for identifying the mouse X2-1 as an individual and a frame 132-1 surrounding the individual are displayed in the tracking image G4A.

The individual recognition unit 91 also binarizes unit images included in the frame image G5 at time t5 so that the background (cage) and the bodies of the white mice are separated and the regions of the respective individuals are recognized.

In an example of a tracking image G5A in which individuals are identified shown in FIG. 21, a yellow object 121-2 is displayed on the outline (body contour) of the mouse X1-2, and a red object 122-2 is displayed on the outline (body contour) of the mouse X2-2.

Also, markers such as an individual ID "mouse0.996" for identifying the mouse X1-2 as an individual and a frame 131-2 surrounding the individual are displayed in the tracking image G5A.

Similarly, markers such as an individual ID "mouse0.998" for identifying the mouse X2-2 as an individual a frame 132-2 surrounding the individual are displayed in the tracking image G5A.

As seen above, the outlines of the bodies of the mice are detected, and the two mice are identified as individuals from the situation in which the outlines change in a time-series manner. When the respective individuals satisfy a predetermined conditions at any time, particular activity of the mice is determined. Thus, the reasons for the activity of the respective mice can be known.

Referring to FIG. 22, an example in which the activity of the individual mice is determined from the positional relationship between the outlines of the mice and the sociality, interaction, or relationship is detected will be described.

FIG. 22 shows an example in which scratching activity is detected.

In FIG. 22, frame images are sequentially acquired starting with frame No. 1, and the mice are identified as individuals. Then, the activity determination unit 56 calculates the probability that the mice are doing particular activity, for each of the frame images and generates data frames in which the calculated probabilities are associated with the frame images.

The activity determination unit 56 then labels (classifies) the activity of the mice on the basis of the probabilities in the data frames, provides identification information of the activity to the data frames, and stores the resulting data frames in the image DB 41.

For example, if the calculated probabilities in the data frames of frame Nos. 4502 to 4507 in FIG. 22 exceed a predetermined threshold, the activity determination unit 56 determines that the mice have done particular activity and provides identification information (for example, predict "1" or the like) indicating the particular activity to the data frames of frame Nos. 4502 to 4507. Also, if time-series changes in the outlines of the mice (the activity of the mice) match a condition previously set in the material DB 43, the activity determination unit 56 determines that the activity of the mice is particular activity of mice derived from the condition, for example, activity in which mice are scratching the floor of a cage, that is, scratching activity.

The image processing device 2 according to the second embodiment calculates the probability that the mice identified as individuals are doing particular activity, for each of the frame images, labels the data frames at the time points when the mice have done the particular activity, on the basis of the calculated probabilities, and thus is able to detect the predetermined activity of the mice, as well as to detect unexpected activity.

This allows the user to identify and observe the mice housed in the cage, as well as to find general activity or new activity done by the mice.

Third Embodiment

Next, referring to FIGS. 23 to 30, a third embodiment will be described.

The above first and second embodiments construct the models only with respect to the particular animal species or activity (white mouse, scratch activity, and the like) and image capture environment, output the models as RAW data (the position information of the parts, or the like), and only construct the condition determination program. On the other hand, the third embodiment is an embodiment that can be applied to multiple animal species, activities, and image capture environments, that is, an embodiment having greater practicality.

In the third embodiment, annotation for acquiring RAW data (creation of training data for determining the positions of acquired parts), construction of conditions for determining each activity using RAW data (mathematical models), creation of a program and module for converting those conditions into an application, extension of a program for detecting the movement, eating, and water drinking of white mice, and the like are performed.

In the first and second embodiments, minimum required tasks are realized by the user's own hardware and software environments. On the other hand, in the third embodiment, a user interface environment (hereafter referred to as the "UI environment") that users can easily operate with consistency in the work process is constructed so that versatility is increased and even common users who do not have high IT literacy can use it stably.

Also, a system is constructed as cloud services, that is, as a server-client system so that the execution environment of the system stably operates without depending on the user (client)-side conditions and the specification or cost is optimized in accordance with the frequency or load of the execution task.

First, referring to FIG. 23, an overview of an information processing system according to the third embodiment will be described.

Figure 23:
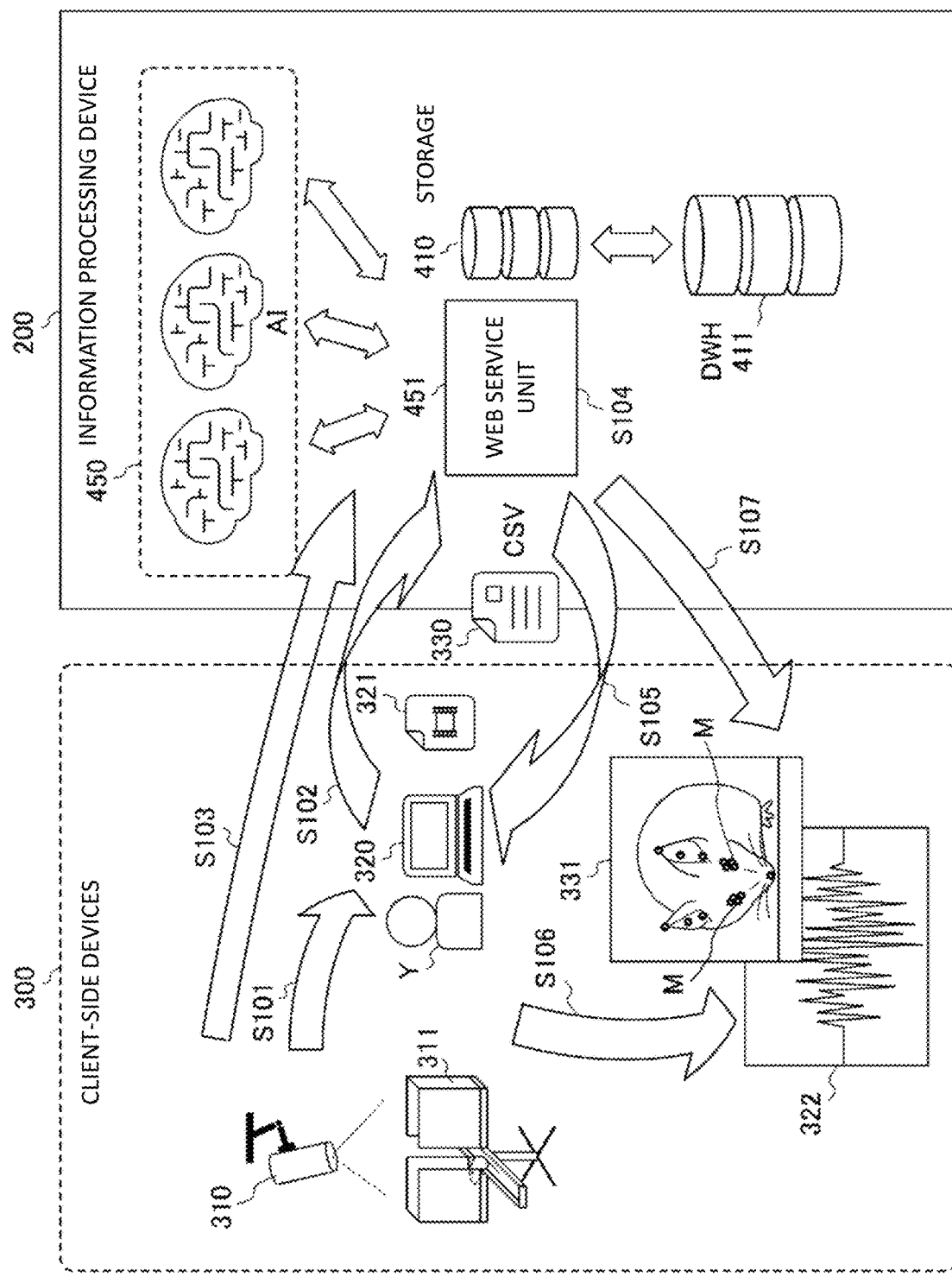
FIG. 23 is a drawing showing an overview of a business model in which the information processing system of FIG. 1 is used for commercial purposes.

FIG. 23 is a drawing showing an overview of a business model that is a third embodiment of the information processing system and is a commercial extension of the information processing systems of the first and second embodiments.

As shown in FIG. 23, the information processing system of the third embodiment is configured such that the client-side devices 300 of a client Y and a server 200 of a contractor who undertakes requests communicate with each other.

The server 200 receives a request from the client Y, analyzes a video uploaded from the client Y, and transmits the analysis results to the client Y.

The client-side devices 300 include a camera 310 and cage 311 forming the image capture environment of animals and a client computer 320 (hereafter referred to as the "PC 320") that collects analysis target videos captured by the camera 310.

The cage 311 is a container for causing animals to do activity in a predetermined range. The camera 310 captures images of the animals that do activity in the cage 311. The image capture environment of the animals may be appropriately changed in accordance with the content of a request.

The PC 320 incorporates video (image) data captured by the camera 310 and stores it in a local disk (internal storage or the like). The PC 320 then uploads the video data 321 stored in the local disk to the server 200 to request the server 200 to analyze the activity of the animals included in the video.

The PC 320 then acquires information on the analysis results (CSV file 330) and the processed video data (processed video 331) in which markers M are provided to the positions of the eyes of the animals transmitted from the server 200 in response to the request.

The PC 320 creates a material (graph 322) for analyzing data in the CSV file 330 or uses the processed video 331 as one of analysis materials.

The server 200 includes an image analysis unit 450, a Web service unit 451, a storage 410, and a data warehouse 411 (hereafter referred to as the "DWH 411").

The image analysis unit 450 includes the functional components of FIG. 3 shown in the first embodiment or the functional components of FIG. 16 shown in the second embodiment and analyzes images.

The Web service unit 451 has a function of authenticating login information received from the PC 320, a function of searching for an analysis target, a function of outputting the search results, a function of adding analysis data, and a function of displaying the analysis results. The functional configuration will be described later specifically.

Moreover, the Web service unit 451 takes security measures by having functions of performing encrypted communication, access source IP communication, leased line communication, and the like.

That is, the Web service unit 451 serves as an interface with the PC 320.

The storage 410 is storing video data whose analysis has been requested through the Web service unit 451 or video data being analyzed.

The DWH 411 is storing various types of related data and systematically archives processing results in association with the data in the storage 410. This makes possible the reuse of data and thus a reduction in the number of animals to be subjected to experiment.

The steps (flow) of data processing performed by the information processing system according to the third embodiment will be described.

In step S101, the video of the state in which the animals are doing activity in the cage 311 is captured, and the video data 321 is stored in the local disk of the PC 320.

In step S102, the video data 321 stored in the PC 320 is uploaded to the server 200 to request the contractor to analyze the video.

In the server 200, the Web service unit 451 stores the video data 321 uploaded from the PC 320 in the storage 410.

While, in steps S101 and S102, the captured video data 321 is temporarily stored in the PC 320 and then uploaded to the server 200, the video data 321 captured by the camera 310 may be directly uploaded to the server 200 if the video data is a video continuously captured for 24 hours, as shown as step S103.

In step S104, in the server 200, the image analysis unit 450 reads the video stored in the storage 410, performs the requested analysis of the video data 321, stores the processed video 331 generated by processing the video during the analysis and the analysis results CSV file 330 in the storage 410, and outputs an analysis completion notification to the PC 320. The PC 320 receives the analysis completion notification and displays a search screen. When analysis target video data is specified, the Web service unit 451, in step S105, searches for the specified video data, and downloads the processed video 331 and the analysis results CSV file 330 to the PC 320.

In step S106, the PC 320 creates a graph 322 for analysis using the processed video 331 and analysis results CSV file 330 downloaded from the server 200 and attaches the processed video 331 as a material for supporting the graph 322.

As described above, in steps S105 and S106, the analysis results CSV file 330 (numerical data) is downloaded to the PC 320, and the graph 322 is created from the CSV file 330. Alternatively, for example, in accordance with the content of the request, the server 200 may create the graph 322 from the CSV file 330 and download the graph 322 to the PC 320 as the analysis results, as shown as step S107.

Figure 24:
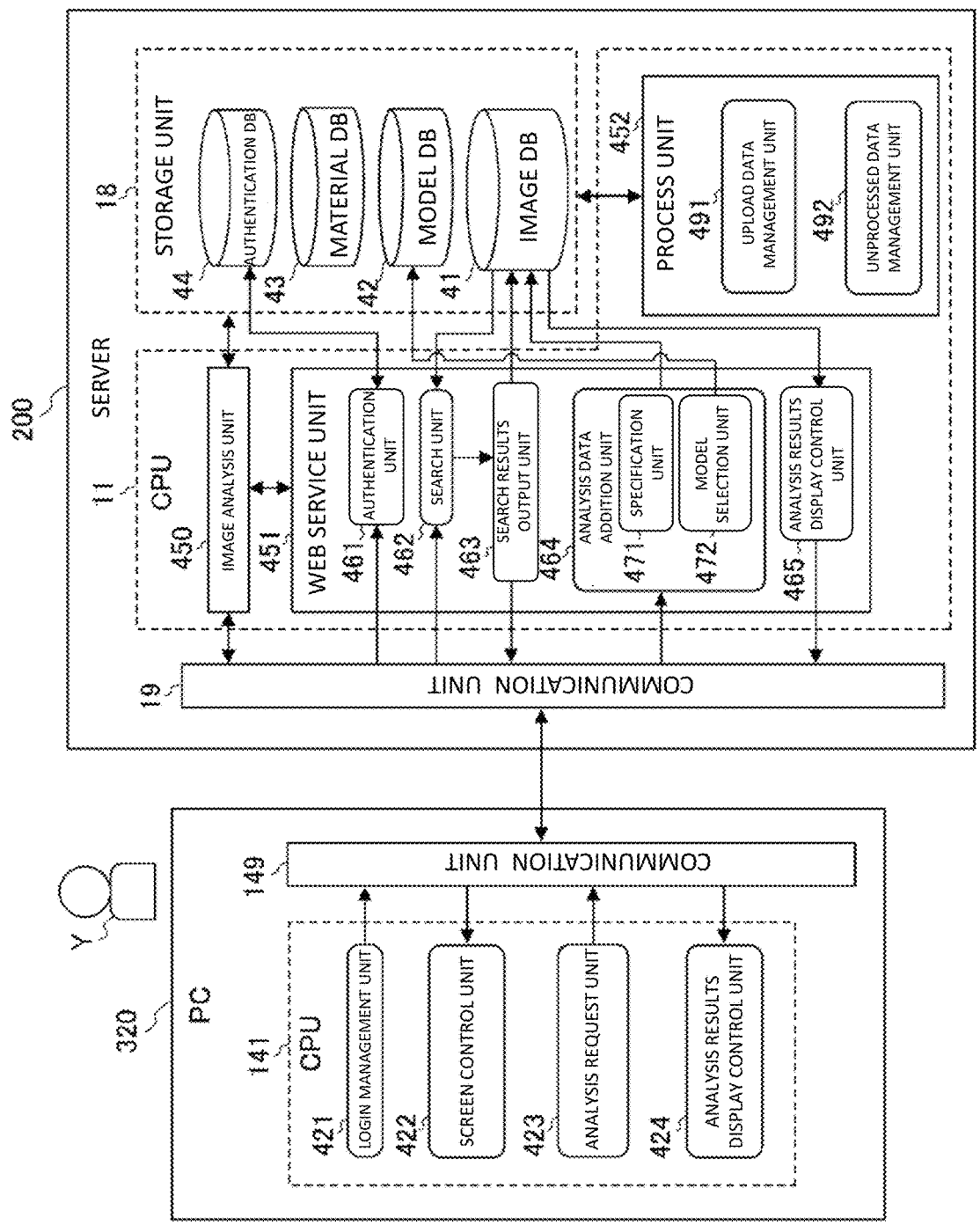
FIG. 24 is a functional block diagram showing a third embodiment of the information processing system of FIG. 1, that is, the functional configuration of a server using the functional configuration of the image processing device of FIG. 3 as an image analysis unit and a client-side PC

Next, referring to FIG. 24, the functional components of the information processing system according to the third embodiment of FIG. 23 will be described. FIG. 24 is a functional block diagram showing the functional components of the information processing system according to the third embodiment of FIG. 23.

In the description of the functional components of the information processing system according to the third embodiment, the same components as the functional components according to the first embodiment shown in FIG. 3 and the functional components according to the second embodiment shown in FIG. 16 are given the same reference signs and will not be described.

As shown in FIG. 24, an authentication DB 44 is stored in a region of the storage unit 18 of the server 200. The authentication DB 44 is storing authentication information that allows the client Y to log in to the server 200. The authentication information is a login ID, a password, and the like serving as identification information for identifying the client Y.

A model DB 42 previously stores multiple types of learning models generated or updated by machine learning or the like. The multiple types of learning models include, for example, skeleton estimation models, individual identification models, and mathematical models. Each type of learning models comprises, for example, learning models corresponding to the respective species of analysis target animals, learning models corresponding to respective image capture directions, or learning models corresponding to the respective colors of animals.

When performing processes corresponding to steps S101 to S107 of FIG. 23, the image analysis unit 450, the Web service unit 451, and a process unit 452 function in the CPU 11 of the server 200.

The image analysis unit 450 analyzes specified image data in the video data 321 acquired on the basis of the request from the client Y using a selected model.

Specifically, the image analysis unit 450 reads an analysis target image specified by a specification unit 471 from the image DB 41 and analyzes the image using a learning model (skeleton estimation model, individual identification model, mathematical model, or the like) selected from the multiple types of learning models by a model selection unit 472 and extracted from the model DB 42.

Image processing performed by the image analysis unit 450 is processing, such as the identification of the animals as individuals, the identification of the outlines of the animals, and the analysis of the activity of the animals in the video, described in the first embodiment or second embodiment. The Web service unit 451 performs login authentication at the time of login of the client Y to the server 200, search for the results of video analysis requested by the client Y, output of the search results, addition of analysis data, display control of the analysis results, and the like.

The Web service unit 451 includes an authentication unit 461, a search unit 462, a search result output unit 463, an analysis data addition unit 464, an analysis results display control unit 465, and the like.

The authentication unit 461 authenticates the user by checking the inputted login information against the authentication information in the authentication DB. When the login information and authentication information are matched as a result of the check, the authentication unit 461 permits the client Y to log in to the server 200.

The search unit 462 displays a search screen 251 (see FIG. 25) on the PC 320 of the authenticated client Y, searches for the analysis results in the image DB 41 in accordance with a search request from the search screen 251, and passes the search results to the search result output unit 463. Display of a list of search results, addition of analysis data, display of analysis results, and the like can be performed on the search screen 251.

The search result output unit 463 outputs the search results obtained by the search unit 462 to the PC 320 so that the search results are listed on the search screen 251 of the PC 320.

The analysis data addition unit 464, in response to an analysis data addition operation on the search screen 251, displays an analysis data addition screen 261 (see FIG. 26) on the PC 320.

Upon an analysis data addition operation on the analysis data addition screen 261, analysis target video data is uploaded to the image processing device 2. The uploaded analysis target video data is additionally registered in the image DB 41 of the image processing device 2.

After the upload, the client can specify analysis conditions with respect to the new file added to the image DB 41 on the analysis data addition screen 261.

The analysis data addition unit 464 includes the specification unit 471 and model selection unit 472. The specification unit 471 specifies the analysis attributes (the species of analysis targets (for example, mouse, rat, or the like), the image capture direction of the analysis targets (for example, upward, obliquely upward, horizontally, or the like), the color of the analysis targets (for example, white, black, or the like) of the analysis target image.

Figure 26:
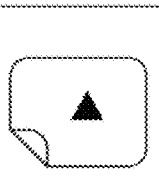
FIG. 26 is a diagram showing an analysis data addition screen popped up on the search screen of FIG. 25.

Specifically, the specification unit 471 displays the analysis data addition screen 261 of FIG. 26.

The analysis data addition screen 261 is provided with a file field and a setting field. The file field is provided with the icons of analysis target image files and bar graphs indicating the progress of analysis.

The setting field is provided with radio buttons (specification buttons) used by the client Y to specify analysis attributes, such as the species (for example, mouse, rat, or the like) of animals included in an analysis target image, the image capture direction (for example, upward, obliquely upward, horizontally, or the like) of the analysis target animals, and the color (for example, white, black, or the like) of the analysis target animals.

When the client Y uploads an analysis target image to the image processing device 2, the icon of the uploaded addition target image file is displayed in the file field of the analysis data addition screen 261.

Then, the client Y sets the attributes of the image (the species of animals included in the analysis target image, the image capture direction of the analysis target animals, the color of the analysis target animals, and the like) using the corresponding radio buttons in the setting field below the icon of the image file. This allows the image processing device 2 to improve the image analysis accuracy and thus to more accurately perform identification of the species or individuals of the animals included in the image, analysis of the activity of the animals, and the like.

The model selection unit 472 selects, on the basis of the analysis attributes of the image specified by the specification unit 471, a model to be used by the part extraction unit 52 of FIG. 3 or the outline detection unit 57 of FIG. 16 from the multiple skeleton estimation models stored in the model DB and selects a model to be used by the individual identification unit 54 from the multiple individual identification models stored in the model DB.

The analysis results display control unit 465 displays the analysis results CSV file 330, the processed video 331, and the like downloaded from the server 200.

The process unit 452 manages image data for analysis and unprocessed data.

The process unit 452 includes an upload data management unit 491 and an unprocessed data management unit 492.

The upload data management unit 491 transfers the image data uploaded from the PC 320 to the image DB 41 and updates a management file. The upload data management unit 491 also has an every minute startup function using cron, a duplicate startup prevention function, and the like.

The unprocessed data management unit 492 checks unprocessed data in the management file. The unprocessed data management unit 492 also copies the unprocessed data. The unprocessed data management unit 492 also performs AI processing in a processing directory. The unprocessed data management unit 492 also stores the resulting file in a corresponding directory. The unprocessed data management unit 492 also creates an analysis results CSV file 330 and stores it in a corresponding directory. Moreover, as with the upload data management unit 491, the unprocessed data management unit 492 has an every minute startup function using cron, a duplicate startup prevention function, a management file update function, and the like.

When performing processes corresponding to steps S101 to S107 of FIG. 23, a login management unit 421, a screen control unit 422, an analysis request unit 423, and an analysis results display control unit 424 function in the CPU 141 of the PC 320.

The login management unit 421 displays a login screen on the PC 320 and transmits login information inputted to the login screen by the client Y to the server 200 to request login authentication.

The screen control unit 422 displays the search screen on the PC 320, transmits a search keyword inputted to the search screen by the client Y to the server 200 to request a search, and displays the search results with respect to the request on the search screen. A list of search results is displayed on the search screen. Moreover, addition of analysis data, display of analysis results, and the like can be performed on the search screen.

The analysis request unit 423 displays the analysis data addition screen on the PC 320 and transmits a file and analysis conditions specified on the analysis data addition screen by the client Y to the server 200 to request analysis.

The analysis results display control unit 424 displays an analysis results display screen on the PC 320 and displays the analysis results CSV file 330 and the processed video 331 downloaded from the server 200 on the analysis results display screen.

Figure 27:
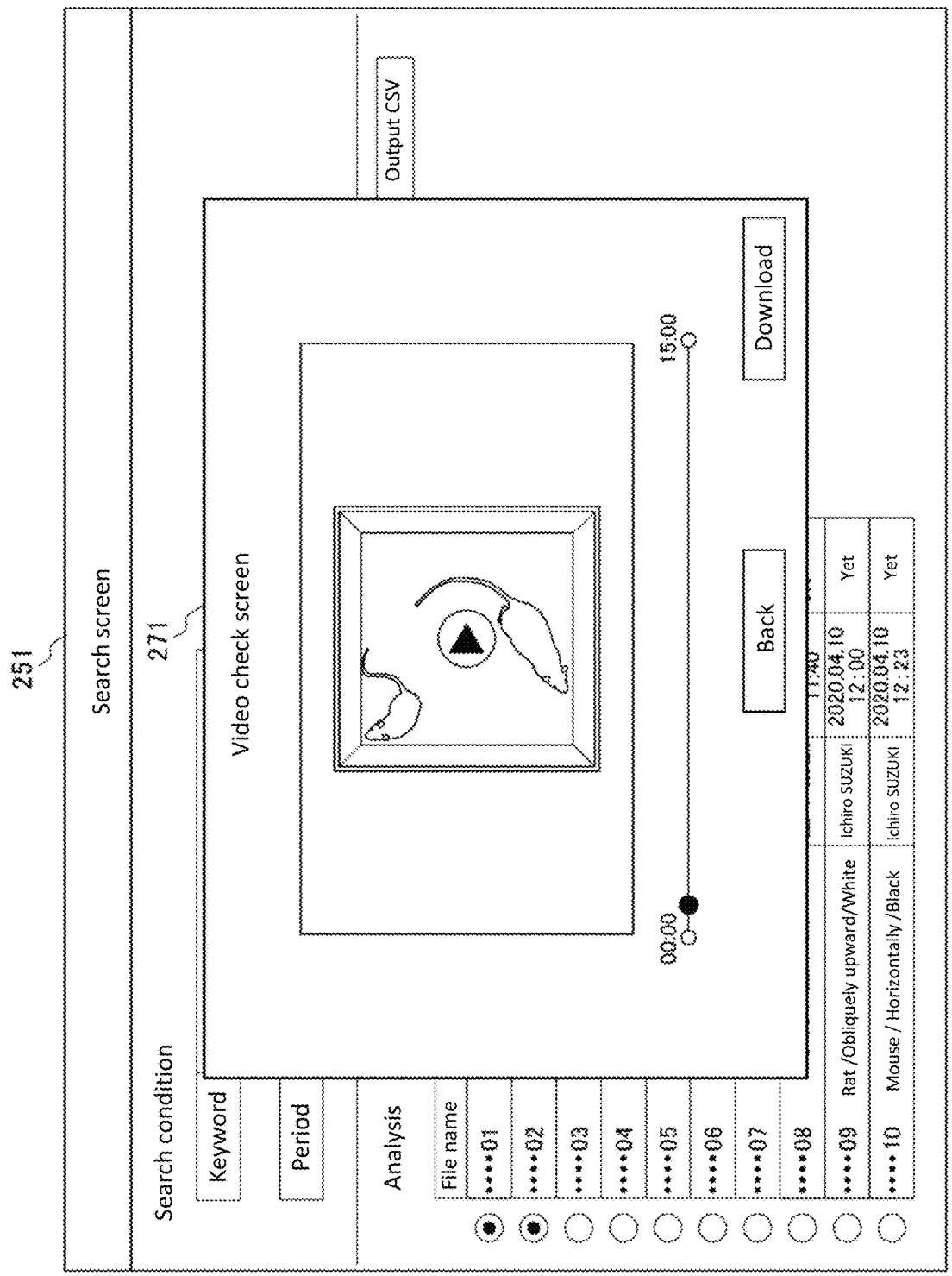
FIG. 27 is a diagram showing a video check screen popped up on the search screen of FIG. 25.

Referring to FIGS. 25 to 27, the operation of the information processing system according to the third embodiment will be described.

FIG. 25 is a drawing showing the search screen displayed on the PC. FIG. 26 is a drawing showing the analysis data addition screen popped up on the search screen. FIG. 27 is a drawing showing a video check screen popped up on the search screen.

The search screen shown in FIG. 25 is displayed on the PC 320 (see FIG. 24). The search screen 251 is provided with input fields for inputting search conditions such as a keyword and a period, an analysis data list field, an analysis data addition button, a video check button, a CSV output button, and the like.

The analysis data list field is provided with a analysis data file name field, a registrant field, a date/time field, and an analysis field, and analysis data is listed in the analysis data list field. The current analysis status of analysis data is displayed in the analysis field. For example, "complete", "in progress", or the like is displayed. Selection buttons for selecting the respective pieces of analysis data are disposed on the left side of the analysis data list. By operating a button corresponding to the selected analysis data, addition of the analysis data, check of the video, output of the CSV, or the like is performed.

If many pieces of analysis data are registered in the server 200, the client Y, on the search screen 251, narrows down the analysis data by search condition, selects (specifies) among pieces of analysis data displayed in the analysis data list using a selection button, and then pushes down one of the analysis data addition button, video check button, and CSV output button. Thus, a process (addition of the analysis data, check of the video, output of the CSV, or the like) corresponding to the button operation is performed.

(Addition of Analysis Data) When the client Y selects (specifies), on the search screen 251 of FIG. 25, desired analysis data using a corresponding selection button and then, for example, pushes down the analysis data addition button, the analysis data addition screen 261 shown in FIG. 26 is popped up on the search screen 251.

The analysis data addition screen 261 is provided with an addition target analysis data file field, an analysis attribute setting field for making (specifying) settings with respect to a video included in each file, a back button, a cancel button, a register button, and the like.

The analysis attribute setting field is provided with, for example, buttons for selecting the species of animals, the image capture direction of the animals, the color of the animals, and the like, and the client Y is able to make (specify) settings using those buttons. By selecting, with respect to video data uploaded as new analysis data, an analysis target file and making settings on the selected file on the analysis data addition screen 261, the analysis data is automatically analyzed later.

At this time, learning models to be used for analysis target animals are selected from the multiple types of learning models (skeleton estimation models, individual identification models, and mathematical models) stored in the model DB 42 on the basis of the species of the animals, the image capture direction of the animals, the color of the animals, and the like set as analysis attributes on the analysis data addition screen 261.

(Check of Video)

When the client Y selects (specifies), on the search screen 251 of FIG. 25, desired analysis data using a corresponding selection button and then pushes down, for example, the video check button, a video check screen 271 shown in FIG. 27 is popped up on the search screen 251. The video check screen 271 is provided with a playback area in which addition target analysis data is played back, a back button, a download button, and the like. The playback area is provided with an image (still image) in which selected analysis data (video data) is stopped and a playback button (triangular icon). By clicking the playback button (triangular icon), the still image starts to move and is played back as a video.

When it is difficult to determine, for example, whether a video uploaded as new analysis data is analysis target data or analyzed, processed video on the basis of only the file name, the client Y is able to check the video by playing it back on the video check screen 271.

Also, by pushing down the download button, the analysis data displayed on the playback area is downloaded. The download function is useful when the client Y desires to use the processed video 331 on the PC 320.

(Advantages Obtained by Using Present Information Processing System)

Figure 28:
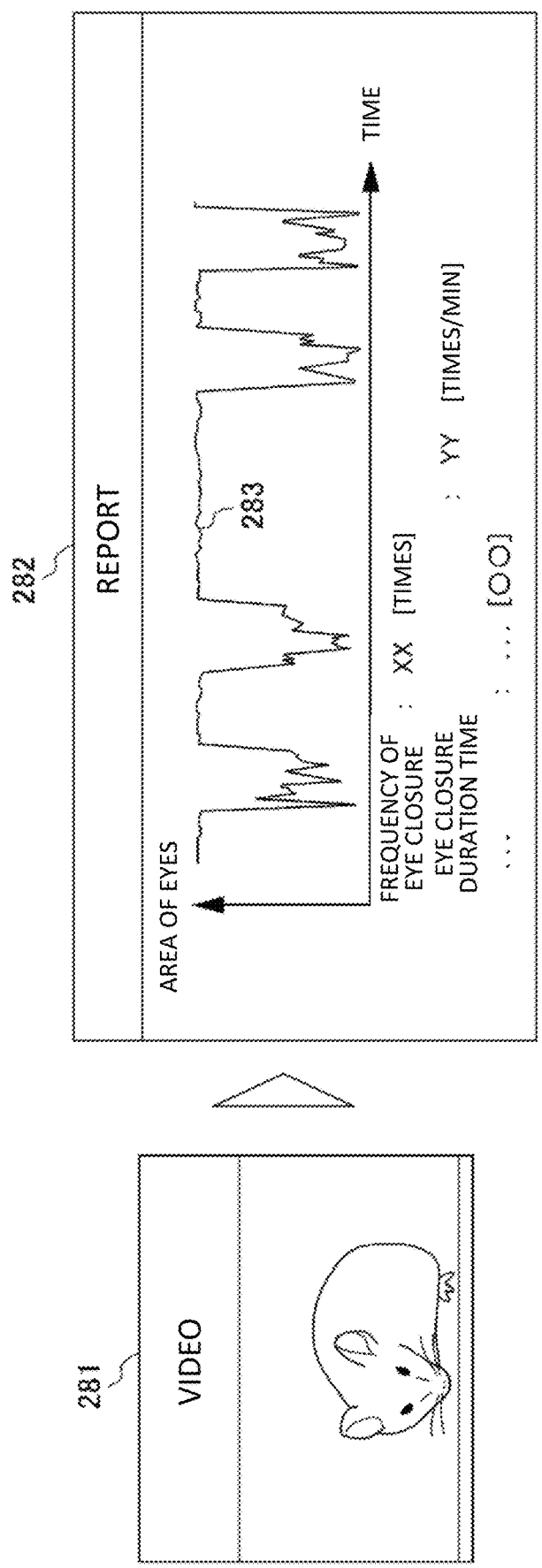
FIG. 28 is a drawing showing an example of a report created from a video.

Referring to FIG. 28, advantages obtained by using the present information processing system will be described. FIG. 28 is a drawing showing an example of a report created from a video.

The present information processing system is able to output quantitative data on the opening and closing of the small eyes of a mouse, which is difficult to visually identify, and thus to identify such ungraspable details with unprecedented accuracy.

For example, when the PC 320 of the requester Y uploads captured video data 281 of a mouse to the server 200 to request the server 200 to analyze the state of the eyes of the mouse, as shown in FIG. 28, the part detection unit 72 sets markers M at the positions of the eyes of the mouse and recognizes that the area of the eyes is increased when the eyes of the mouse are opened and is reduced when the eyes are closed, that is, identifies the opening and closing of the eyes. Thus, the server 200 is able to create, for example, a graph 283 in which the area of the eyes changes with changes in time, as a report 282 and to provide it to the client Y.

For example, the frequency of eye closure per given time, the eye closure duration time (the frequency of eye closure per minute), as well as data corresponding to the content of the request can be outputted as the report 282.

That is, the present information processing system is able to grasp changes in the tiny parts quantitatively. It is also able to automatically process a long-time video. It is also able to improve throughput.

(Robust Security)

Figure 29:
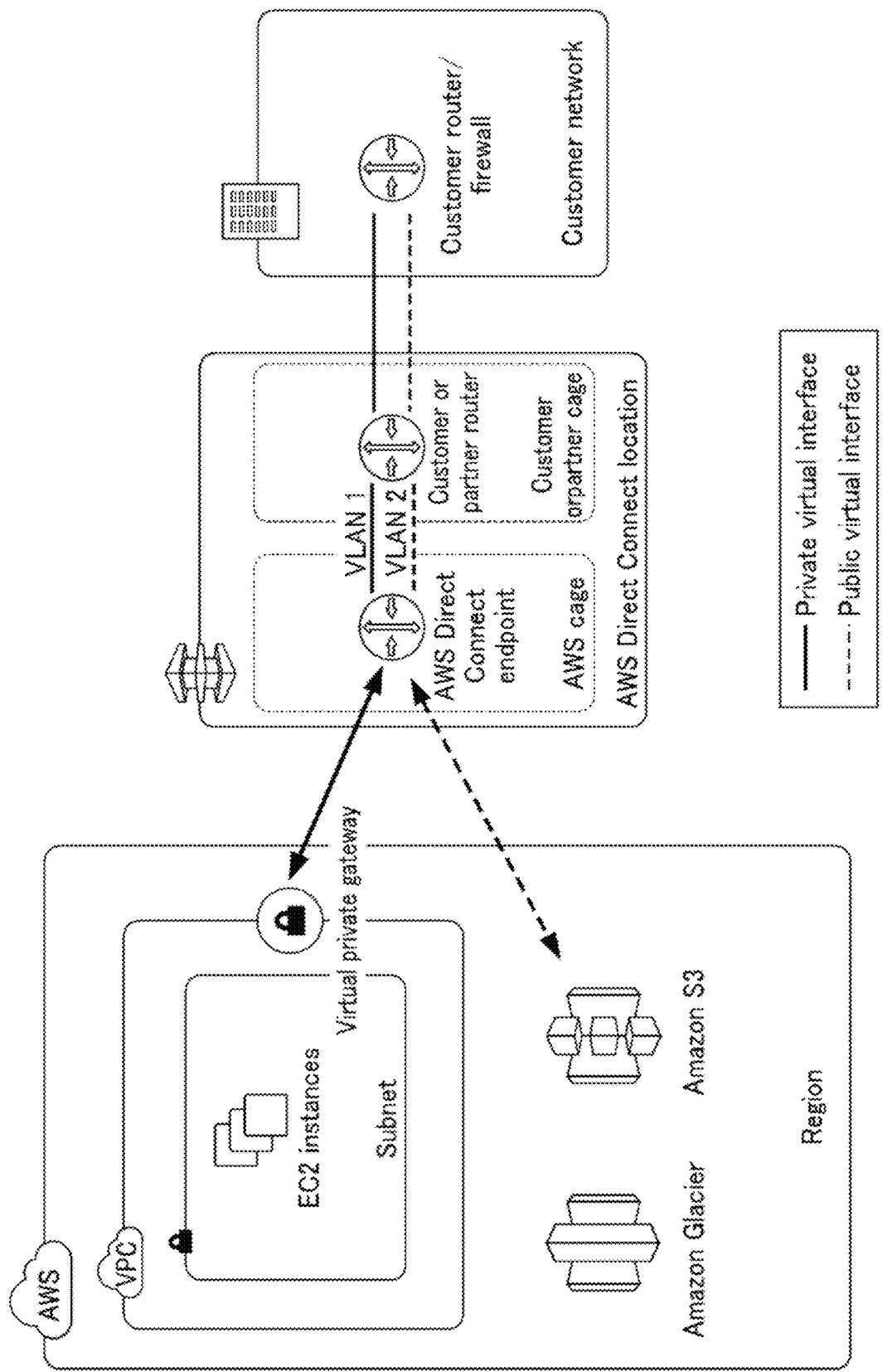
FIG. 29 is s diagram showing an example of a closed network connection configuration that forms robust security.

Referring to FIG. 29, the security of the present information processing system will be described.

FIG. 29 is a drawing showing an example of the connection configuration of a closed network that provides robust security.

The user can configure the present information processing system by selecting the security level in accordance with the user-side policy and cost. Note that the encryption of communication is required and use of https is assumed.

One example system configuration corresponding to the security level include "plum", "bamboo", and "pine". "Plum" allows limited access in which only the GIP of an in-house proxy is passed. "Bamboo" allows access through a reverse proxy using a client certificate. "Pine" provides closed network connection with the in-house environment through a direct connect (DX).

An example of the connection configuration of the closed area of the above "pine" is shown in FIG. 29.

(Deepening of Present Information Processing System)

Figure 30:
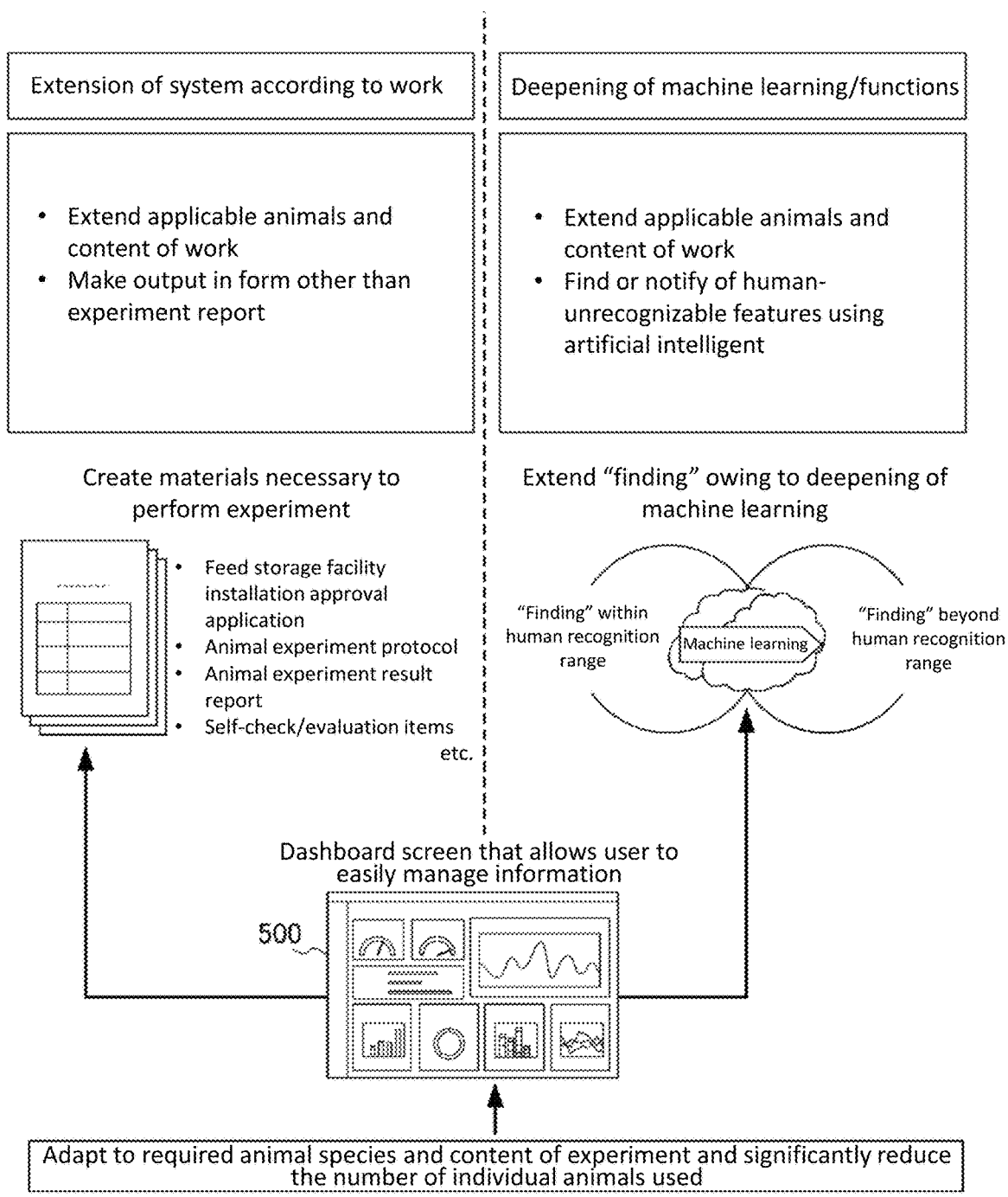
FIG. 30 is a drawing showing the dashboard screen of the present information processing system.

Referring to FIG. 30, the deepening of the present information processing system will be described. FIG. 30 is a drawing showing the dashboard screen of the present information processing system.

As shown in FIG. 30, the present information processing system has a function of displaying a dashboard screen 500 that allows a user to easily manage information.

The dashboard screen 500 has features that allow the user, for example, to make an extension corresponding to the animal species or experiment environment, to make an output in a form other than an experiment report, and to find or notify of human-unrecognizable features using artificial intelligent.

Specifically, the dashboard screen 500 allows the user to create, for example, a feed storage facility installation approval application, an animal experiment protocol, an animal experiment result report, a self-check, evaluation items, and the like as documents necessary to perform an experiment.

The dashboard screen 500 allows the user to extend applicable animals or the content of an experiment as an extension according to work. The dashboard screen 500 also allows the user to make an output in a form other than an experiment report.

The dashboard screen 500 also allows the user to extend a "finding" owing to the deepening of machine learning. For example, the dashboard screen 500 allows the user to obtain a "finding" within the recognition range of a human and a "finding" beyond the recognition range of a human.

The dashboard screen 500 also allows the user to extend application animals or the content of an experiment as the deepening of machine learning or functions. The dashboard screen 500 also allows the user to find or notify of human-unrecognizable features using artificial intelligent.

The information processing system according to the third embodiment is summarized as follows. That is, when the user specifies the analysis attributes (the species of the analysis targets (for example, mouse, rat, or the like), the image capture direction of the analysis targets (for example, upward, obliquely upward, horizontally, or the like), the color of the analysis targets (for example, white, black, or the like) of the analysis target image, the model selection unit 472 selects, on the basis of the specified analysis attribute of the analysis target image, a skeleton estimation model to be used by the part extraction unit 52 of FIG. 3 or the outline detection unit 57 of FIG. 16 from the multiple skeleton estimation models in the model DB and selects an individual identification model to be used by the individual identification unit 54 of FIG. 3 or 16 from the multiple individual identification models, and analyzes the image using the selected skeleton estimation model and individual identification model in accordance with an image analysis instruction. This allows the user to properly identify the species of the animals using the models suitable for the analysis targets and to obtain the analysis results such as the activity of the animals.

The server 200 is able to adapt to multiple animal species and the content of an experiment and has functions such as the management, download, and the like of analysis data. This makes it possible to reuse the analysis data and to significantly reduce the number of individual animals actually used in experiments.

Moreover, the following advantageous effects are obtained.

For example, the information processing system according to the third embodiment automatically labels (tags) the analysis data on the basis of the specified analysis attributes or the like. This allows the user to search for analysis data by tag when reusing the analysis results, that is, to easily search for analysis data.

When using only a single existing model with respect to multiple analysis attributes or the like, it is necessary to update the existing model by retraining it and to consider the accuracy of the model again. In the case of the information processing system according to the third embodiment, the multiple models are previously retained with respect to the multiple analysis attributes or the like, and a new model is created when a new attribute appears. This makes model learning compact.

The above series of processes may be performed by hardware or software.

In other words, the functional configurations of FIGS. 3, 16, and 24 are only illustrative and are not limiting.

That is, the information processing system only has to have functions of performing the entire above series of processes. The functional blocks and databases used to perform those functions are not limited to the examples shown in FIGS. 3, 16, and 24. Also, the locations in which the functional blocks and databases are present are not limited to those in FIGS. 3, 16, and 24 and may be any locations. The functional blocks or databases of the image processing device 2 or server 200 may be transferred to the camera 1, PC 320, or the like. Further, the image processing device 2, camera 1, and PC 320 may be the same hardware.

For example, to cause software to perform the series of processes, a program forming the software is installed to a computer or the like through a network or storage medium.

The computer may be a computer incorporated in dedicated hardware. The computer may also be a computer capable of performing various functions when various programs are installed thereto, for example, a server or a general-purpose smartphone or personal computer.

A storage medium including such a program may consist of, for example, removable media (not shown) that is distributed separately from the device body in order to provide the program to the user, a storage medium that is provided to the user with the storage medium previously incorporated in the device body, or the like.

In the present specification, the steps of describing the program to be stored in a storage medium include processes that are performed in a time-series manner in that order, as well as processes that need not necessarily be performed in a time-series manner but rather may be performed in parallel or individually.

Also, in the present specification, the term "system" refers to an overall device consisting of multiple devices, multiple means, or the like.

While, in the above embodiments, the shape of the markers is triangular or circle, the shape is not limited to this example and may be any other shape. The same also applies to the objects representing the outlines of the bodies.

In the above embodiments, the activity determination unit 56 has been described as determining whether the condition defining the positional relationship between a part of an animal and another particular part (watering place, feeding place, a part of another animal) is satisfied. In this case, the condition defining the positional relationship between the part of the animal and the other particular part is stored in the material DB 43 of the storage unit 18, and the activity determination unit 56 reads the condition from the material DB 43. Alternatively, an activity database may be provided separately from the material DB 43 so that the above condition is stored in the activity database.

While, in the above embodiments, the machine learning technique is used, for example, a rule that the most distant part from the center of gravity be regarded as the nose may additionally be set.

While, in the above embodiments, the center of gravity is detected (extracted) as a part of the body, particular parts such as the eyes, nose, ears, bones or joints may additionally be detected (extracted).

While, in the above embodiments, the mice have been described as being an example of targets identified as individuals, for example, rats, hamsters, guinea pigs, rabbits, or the like may be used as analysis targets by expanding data in the model DB 42 or material DB 43. Also, domestic animals such as pigs, cattle, sheep, or chickens, or various animals such as dogs, cats, monkeys, or humans may be used as targets.

In the above embodiments, the some parts of the body of each of the one or more animals are extracted from each of the multiple unit images, the extracted multiple parts are analyzed in a time-series manner, and the one or more animals in the multiple unit images are identified as individuals on the basis of the analysis results. However, this order is only illustrative. Alternatively, for example, after recognizing (identifying) individuals, parts of the individuals may be extracted. Or, the identification of individuals and the extraction of parts may be performed simultaneously.

To recognize (identify) individuals and then extract parts of the individuals, first, the locations in the images in which the individuals are present are identified, trimming is performed, and then parts of the individuals are extracted.

To detect parts of multiple individuals and then identify the individuals, the positions of multiple particular parts are detected in the images, and then it is determined to which set the parts belong (in this case, the part set of one particular individual) on the basis of an estimation on "how those locations change in the time direction."

That is, the step of extracting the positions of the parts of the animals, the step of identifying individuals, and the resulting step of determining the sociality of the individuals only have to be included.

Referring to FIGS. 31 to 54, the relationships between various indexes (the movement trajectory, the distribution of the presence positions in each region, the presence time in each region, the movement distance, the total amount of movement, the orientation of the body, the speed, the angular velocity, and the like and each of the initial movement period immediately after the mice are put into the cage and the period until the mice are stabilized) will be described. These pieces of data aim to allow the user to recognize the movement range, the amount of movement, activity habits, rhythm, and the like when the positions of some parts (eyes, nose, or the like), the position of the center of gravity, or the outline (contour) of the body of each of the mice (animals) extracted from the video (multiple unit images arranged sequentially on the time axis) change in a time-series manner.

In FIGS. 31 to 54, graphs representing the initial movement period from the start of measurement to 1320 FRAME (44 sec) and graphs representing the period from the start of measurement to 18030 FRAME (about 10 min) form pairs.

First, referring to FIGS. 31 and 32, the relationships between the positions of the mice in the cage and the movement trajectories of the mice will be described.

Figure 31:
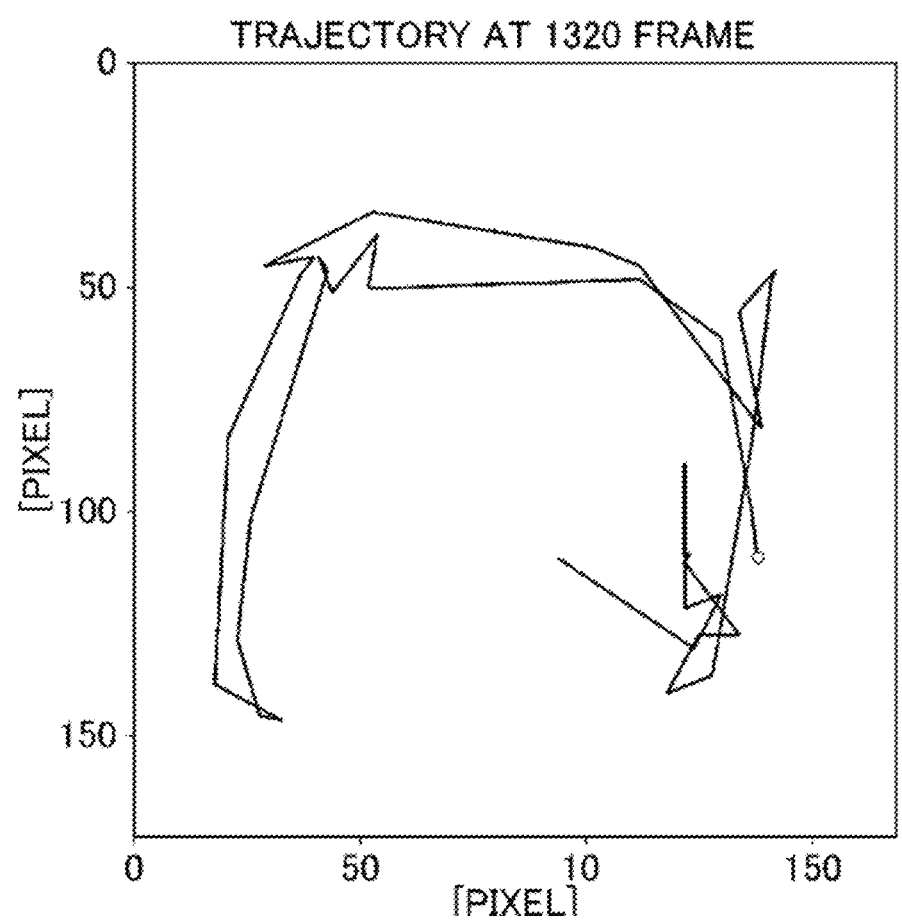
FIG. 31 is a graph showing the positions of mice present in a cage and the movement trajectories of the mice in an initial movement period from the start of measurement to 1320 FRAME (44 sec).

FIG. 31 is a graph showing the positions of the mice present in the cage and the movement trajectories in the initial period from the start of measurement and the 1320

FRAME (44 sec). FIG. 32 is a graph obtained by continuously drawing the graph of FIG. 31 from then on until 18030 FRAME (about 10 min).

Figure 32:
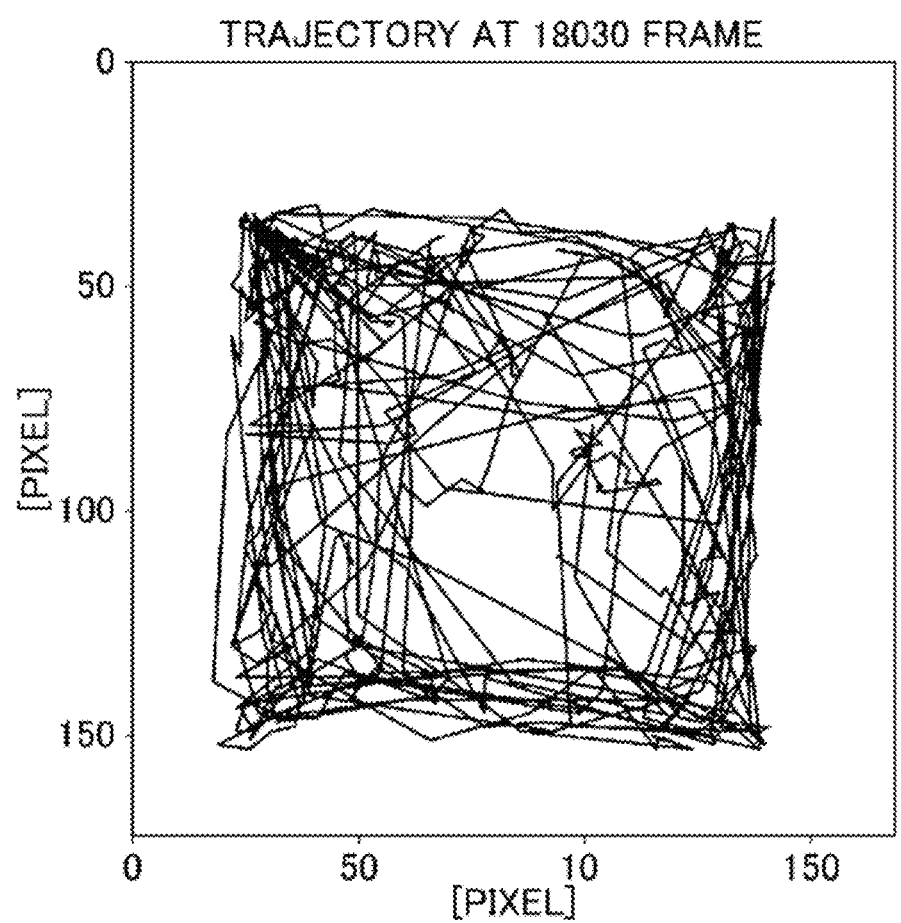
FIG. 32 is a graph obtained by continuously drawing the graph of FIG. 31 from then on until 18030 FRAME (about 10 min).

The vertical axes of FIGS. 31 and 32 represent the length in the depth direction of the floor of the cage expressed in pixel count (PIXEL), and the horizontal axes represent the length in the width direction of the floor of the cage expressed in pixel count (PIXEL).

The graph representing the initial movement period until 1320 FRAME of FIG. 31 indicates that the mice moved on the edge while avoiding the central part of the cage and the mice had anxiety.

The graph representing the period from the start of measurement to 10 min of FIG. 32 indicates that many of the individuals more often moved on the edges of the cage than the central portion thereof, as expected. On the other hand, the graph also shows movement lines representing linear movement and entangled movement lines. The entangled movement lines suggest that the mice stayed there and did some activity (grooming or the like). By learning such information using AI, the activity, mental illness, or the like of the mice can be identified.

Next, referring to FIGS. 33 and 34, the presence distribution of the mice in each of nine regions of the floor of the cage will be described.

Figure 33:
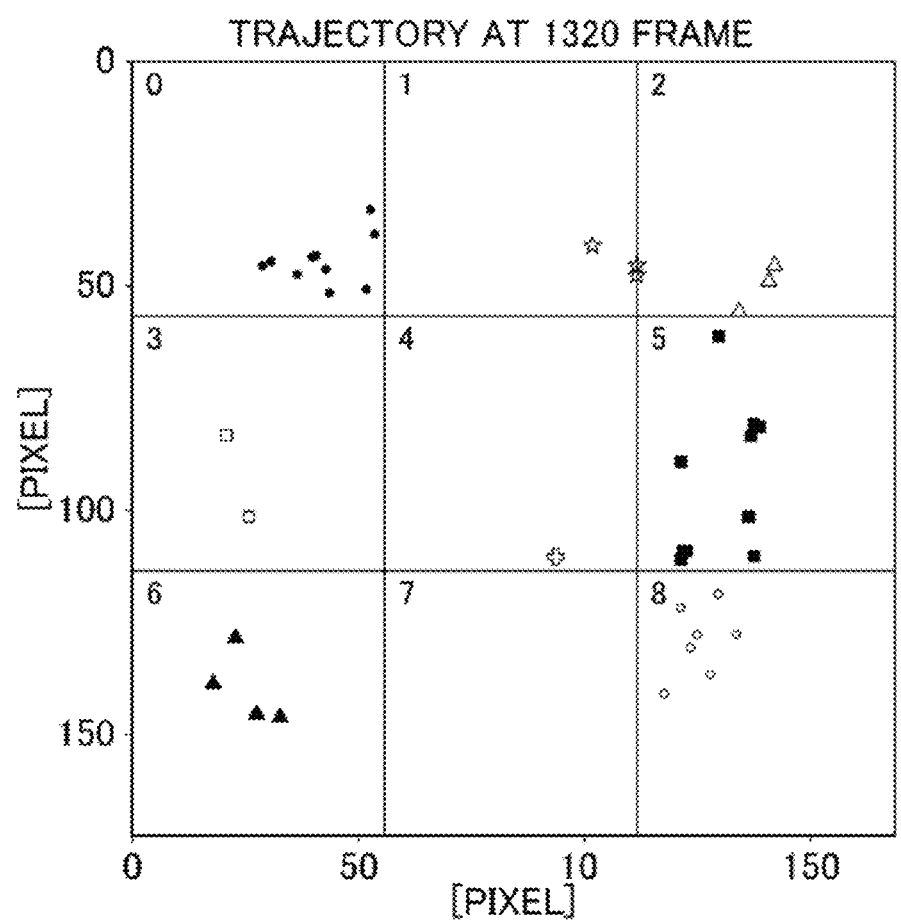
FIG. 33 is a graph showing the distribution of the positions of the mice in each of the nine regions (0 to 8) of the floor of the cage in the initial movement period from the start of measurement to 1320 FRAME (44 sec).
Figure 34:
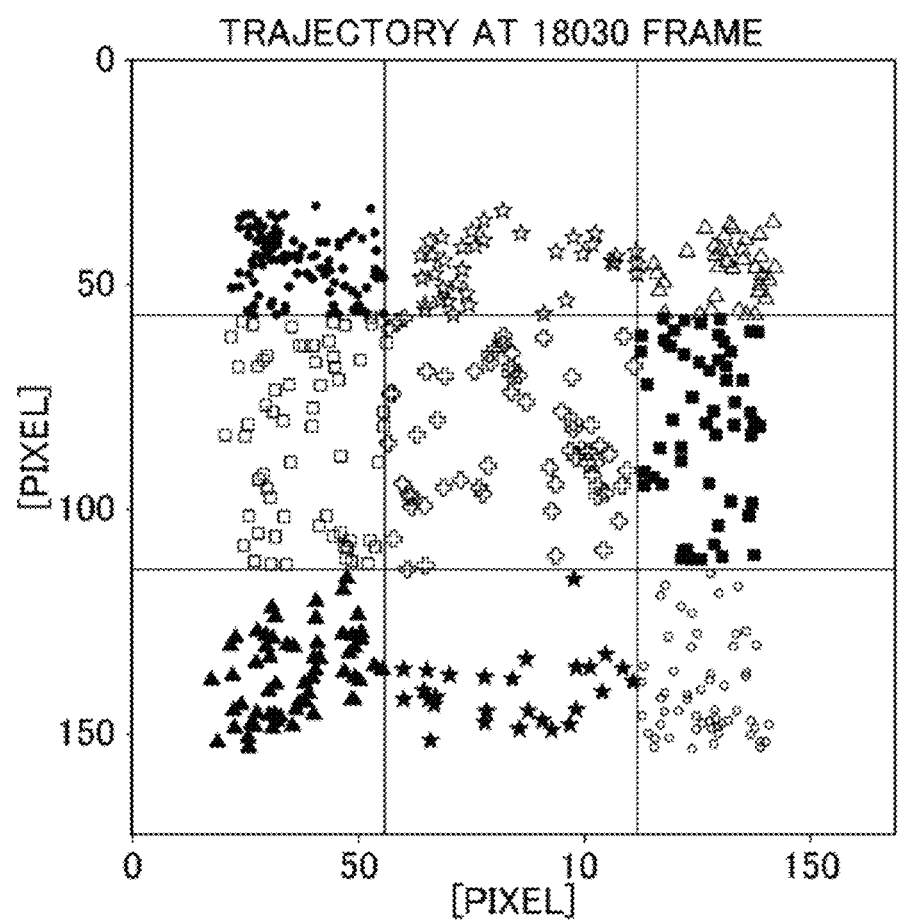
FIG. 34 is a graph obtained by continuously drawing the graph of FIG. 33 from then on until 18030 FRAME (about 10 min).

The vertical and horizontal axes of FIGS. 33 and 34 represent pixel (PIXEL). FIG. 33 is a graph showing the presence position distribution of the mice in each of nine regions (numbers 0 to 8) of the floor of the cage in the initial movement period from the start of measurement to 1320 FRAME (44 sec). FIG. 34 is a graph obtained by continuously drawing the graph of FIG. 33 from then on until 18030 FRAME (about 10 min).

FIGS. 33 and 34 are drawings obtained by plotting the positions of the mice in the cage per minute. By providing the coordinates of the presence positions of the mice in each of the nine regions of the floor of the cage with identification information of the region including the coordinate information and managing the resulting information, the graphs of FIGS. 33 and 34 are created.

The graph representing the initial movement period until 1320 FRAME of FIG. 33 shows more plots in regions (numbers 0, 5, 6, 8, etc.) near the edges of the cage and indicates that the mice were present near the edges for a longer time.

The graph of FIG. 34 obtained by continuously drawing the graph of FIG. 33 for about 10 min from then on indicates that the mice were often present near the edges like before but the number of plots increased also in number 4 region in the central portion and the mice moved to the central portion of the cage more often. This can be said to indicate that the feeling of the mice came to calm down compared to that in the initial movement period.

Next, referring to FIGS. 35 and 36, the presence time of the mice in each of the above regions (0 to 8) will be described.

Figure 35:
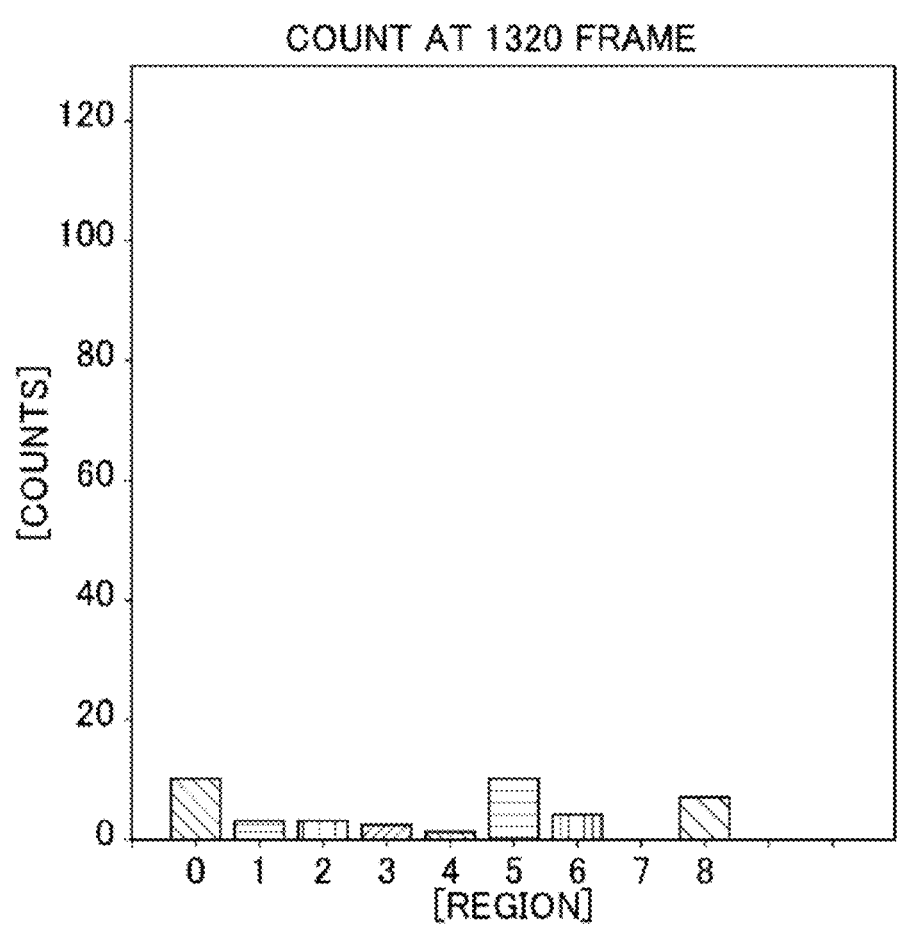
FIG. 35 is a bar graph showing the presence time of the mice in each of the nine regions of the floor of the cage in the initial movement period from the start of measurement to 1320 FRAME (44 sec).

FIG. 35 is a bar graph showing the presence time of the mice in each of the nine regions of the floor of the cage in the initial movement period from the start of measurement to 1320 FRAME (44 sec). FIG. 36 is a bar graph obtained by continuously drawing the graph of FIG. 35 from then on until 18030 FRAME (about min).

Figure 36:
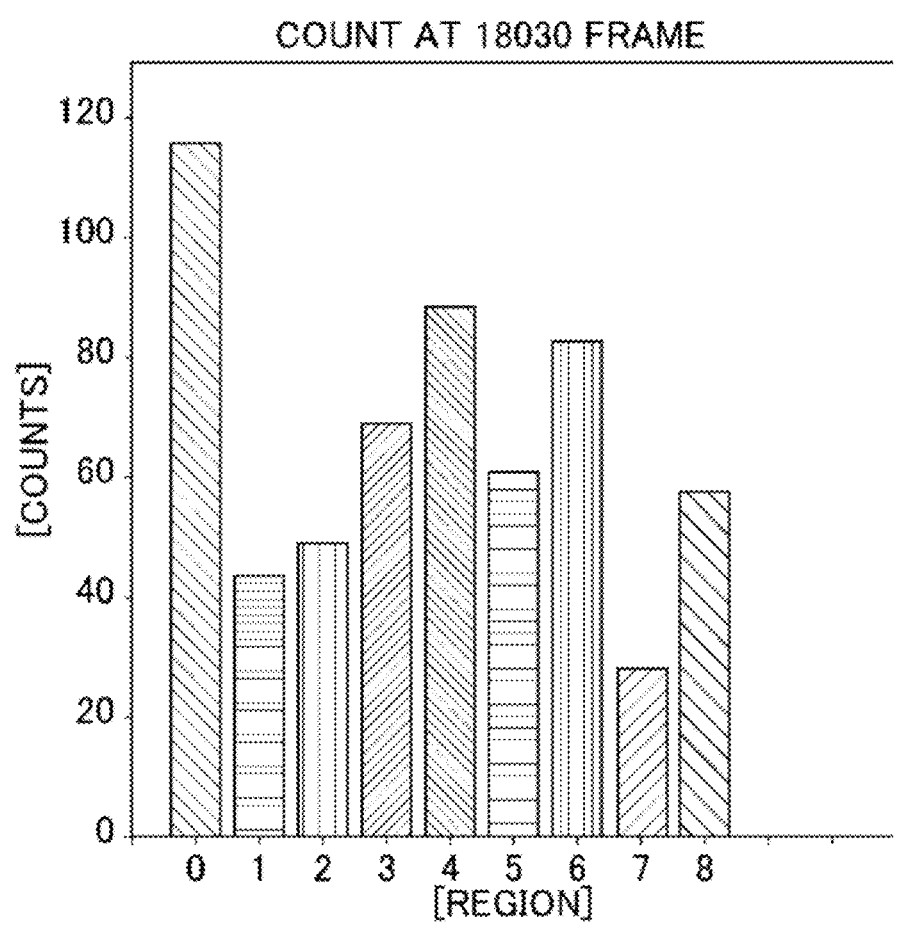
FIG. 36 is a graph obtained by continuously drawing the graph of FIG. 35 from then on until 18030 FRAME (about 10 min).

The vertical axes of FIGS. 35 and 36 represent the plot count (COUNTS), and the horizontal axes represent the region (REGION). The numbers on the horizontal axis correspond to the numbers (0 to 8) of the regions in FIG. 33.

FIGS. 35 and 36 are graphs obtained by counting plots representing the presence of the mice in each region, that is, by piling up the presence of the mice in each region. When the number of plots (points) is increased by one in FIG. 33 or 34, the bar graph of a region having a corresponding number in FIG. 35 or 36 is raised by one count.

From FIGS. 33 to 36, the user can visually understand in which region in the cage the mice stayed more often (less often).

Next, referring to FIGS. 37 and 38, the presence time of the mice in a region around the edges of the cage and a region around the center of the cage will be described.

Figure 37:
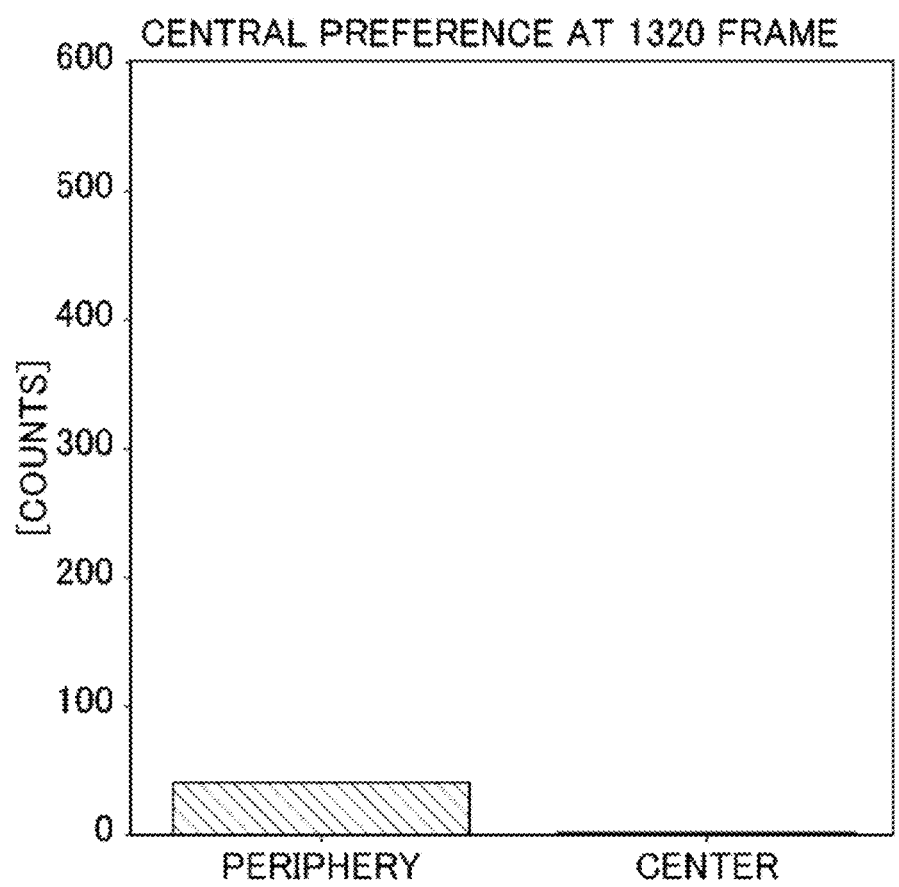
FIG. 37 is a graph showing the presence time of the mice in a region (No. 4 region) near the center of the cage and the other region near the edges (regions other than No. 4 region) in the initial movement period from the start of measurement to 1320 FRAME (44 sec).

FIG. 37 is a graph showing the presence time of the mice in the region (No. 4 region shown in FIG. 33) around the center of the cage and the region around the edges (regions other than No. 4 region) in the initial movement period from the start of measurement to 1320 FRAME (44 sec). FIG. 38 is a graph obtained by continuously drawing the graph of FIG. 37 from then on until 18030 FRAME (about min).

Figure 38:
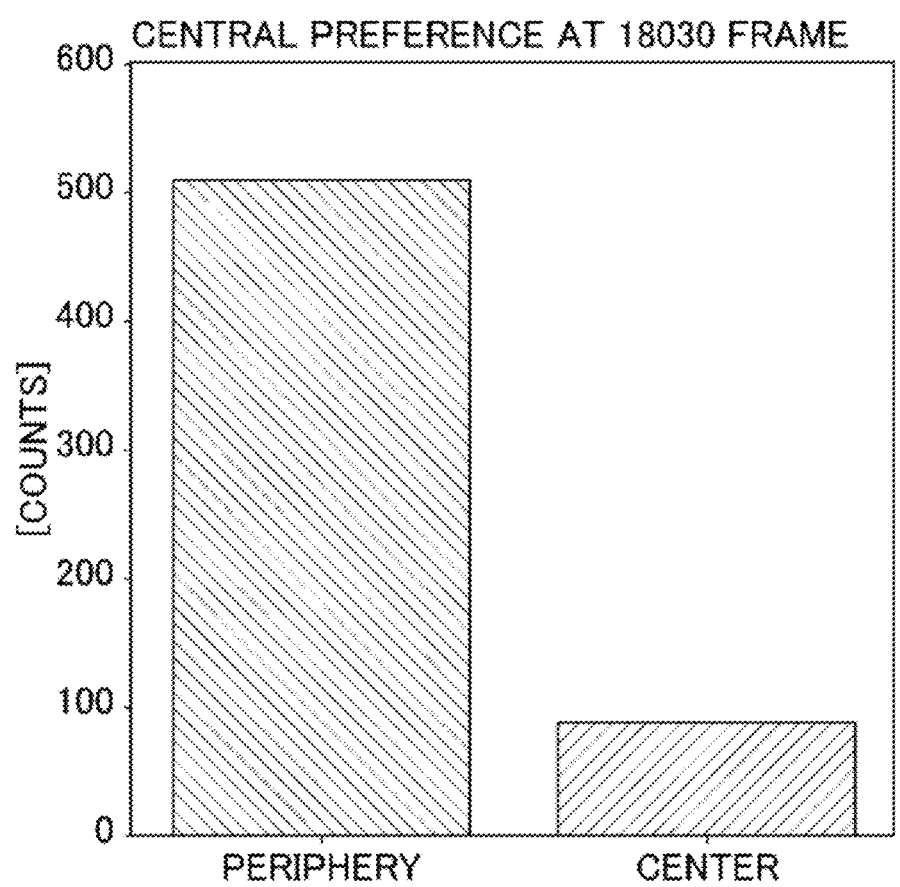
FIG. 38 is a graph obtained by continuously drawing the graph of FIG. 37 from then on until 18030 FRAME (about 10 min).

The vertical axes of FIGS. 37 and 38 represent the plot count (COUNTS), and the horizontal axes represent the region (REGION). There are two regions (REGION): the region around the center (No. 4 region) and the region around the edges (regions other than No. 4 region).

The graph representing the initial movement period of FIG. 37 indicates that the mice were often present in the region near the edges (the regions other than No. 4 region). The graph of FIG. 38 indicates that the mice were present in the region around the edges (the regions other than No. 4 region) with an overwhelming frequency but the mice were more often present in the region around the center (No. 4 region) than in the initial movement period.

Next, referring to FIGS. 39 and 40, the movement distance of the mice per second (30 FRAME) will be described.

Figure 39:
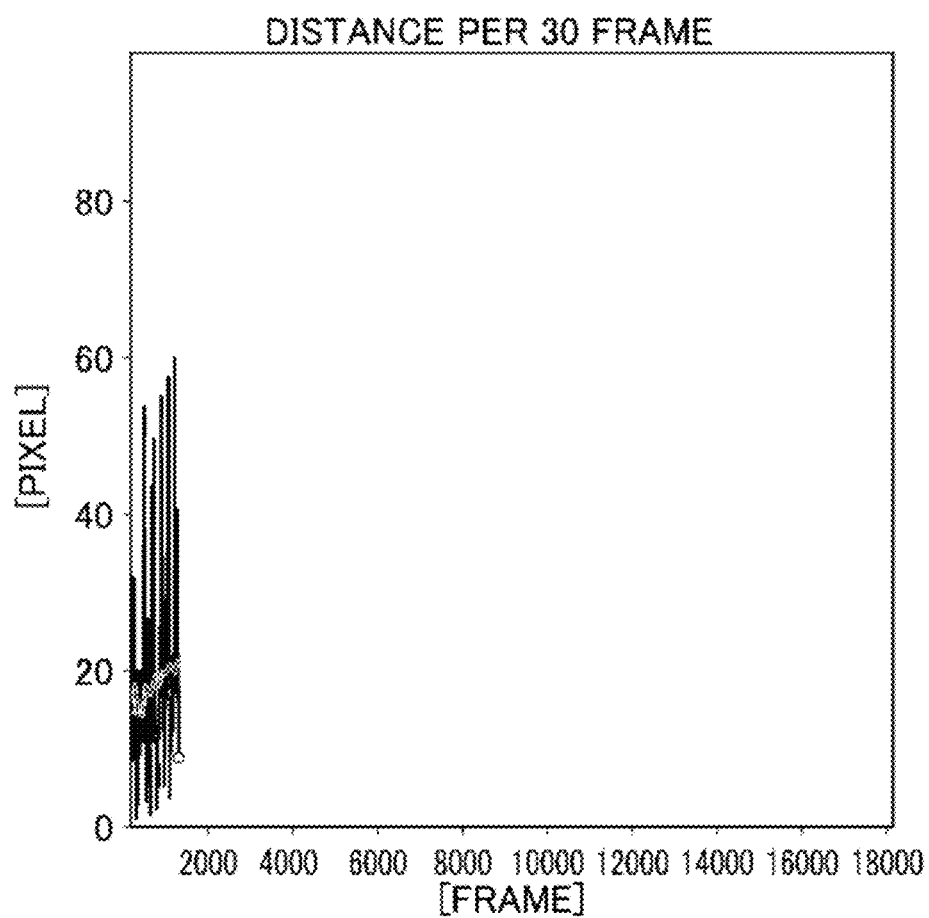
FIG. 39 is a graph showing the relationship between the initial movement period from the start of measurement to 1320 FRAME and the movement distance per second (30 FRAME) of the mice.

FIG. 39 is a graph showing the relationship between the initial movement period from the start of measurement to 1320 FRAME and the movement distance of the mice per second (30 FRAME). FIG. 40 is a graph obtained by continuously drawing the graph of FIG. 39 from then on until 18030 FRAME (about 10 min).

Figure 40:
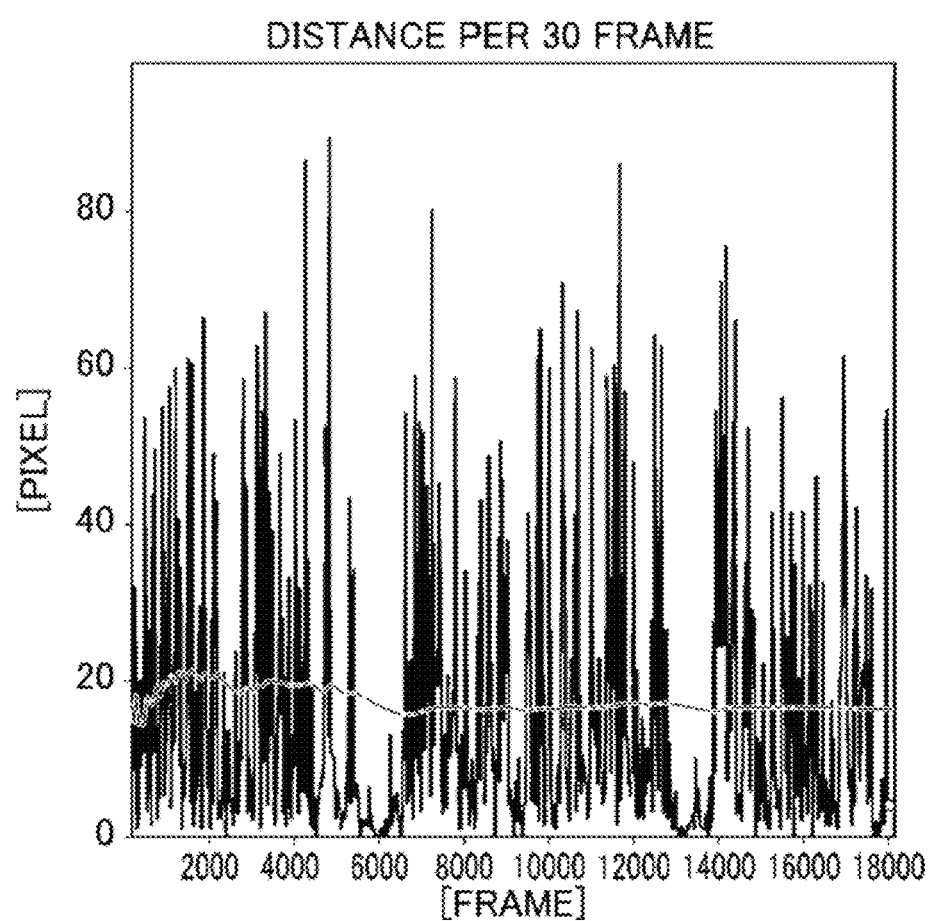
FIG. 40 is a graph obtained by continuously drawing the graph of FIG. 39 from then on until 18030 FRAME (about 10 min).

The vertical axes of FIGS. 39 and 40 represent the distance (PICXEL), and the horizontal axes represent the time (FRAME).

The graphs of FIGS. 39 and 40 show the distance (PICXEL on the image) per 30 frames, that is, per second between the location that each mouse has passed and the location in which the mouse is currently present.

That is, the graphs of FIGS. 39 and 40 represent the movement distance of the mice per sec. A higher swing in the vertical direction of the graph indicates that the mice moved a longer distance in a short time, and the value of the vertical axis of the graph that is closer to 0 indicates that the mice stayed there longer.

In the graphs of FIGS. 39 and 40, broken lines presented around the center of the amplitude represent the moving average. As seen above, the movement speed of the mice is recognized by obtaining the average in a time having some width.

These graphs are time-series graphs. For this reason, for example, when the mice calmed down, the mice no longer moved much, as shown in the latter half of the graph of FIG. 40. Of them, a mouse that continued moving at constant speed can be said to have been calm. On the other hand, a mouse that suddenly began to run or stopped for an abnormally long time can be assumed to have been mentally abnormal.

Next, referring to FIGS. 41 and 42, the orientation of the bodies of the mice in the cage will be described.

Figure 41:
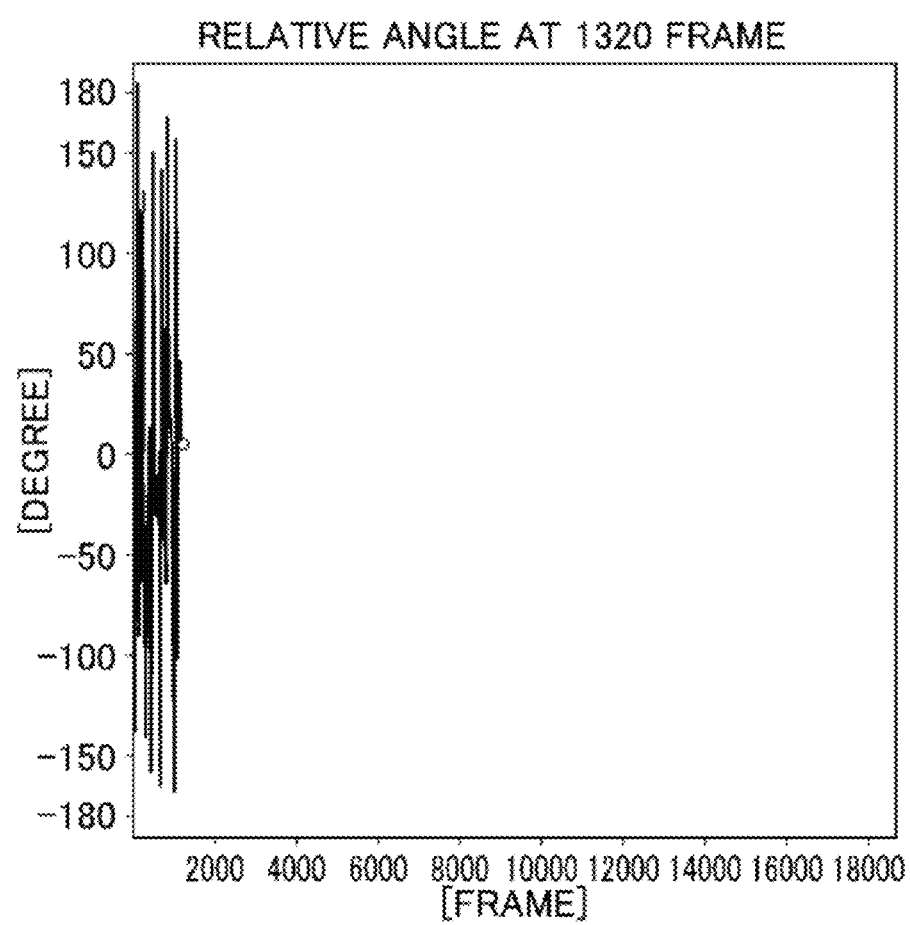
FIG. 41 is a graph showing the relationship between the initial movement period from the start of measurement to 1320 FRAME and the momentary orientation of the bodies of the mice in the case.

FIG. 41 is a graph showing the relationship between the initial movement period from the start of measurement to 1320 FRAME and the momentary orientation of the bodies of the mice in the case. FIG. 42 is a graph obtained by continuously drawing the graph of FIG. 41 from then on until 18030 FRAME (about min).

Figure 42:
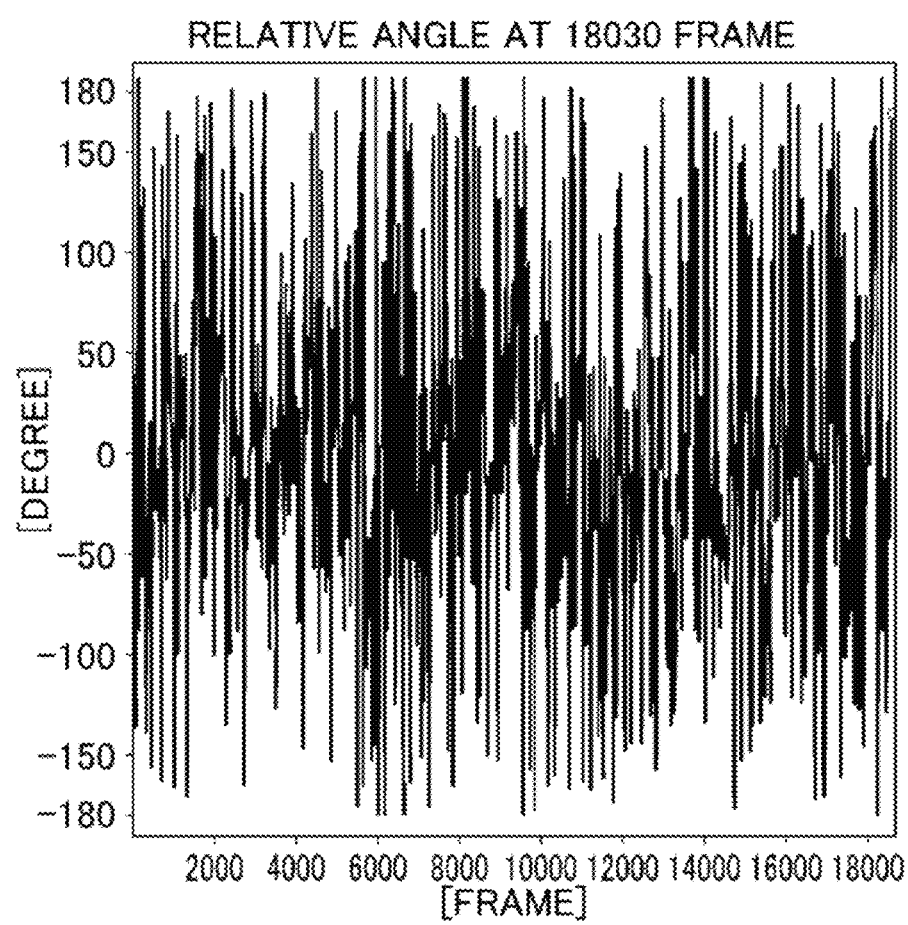
FIG. 42 is a graph obtained by continuously drawing the graph of FIG. 41 from then on until 18030 FRAME (about 10 min).

The vertical axes of FIGS. 41 and 42 represent the angle (DEGREE), and the horizontal axes represent the time (FRAME). Assuming that the orientation of the body of a mouse at any time point is upright (0 degree on the vertical axis of each graph), when the mouse is oriented, for example, rightward from that time point, the graphs of FIGS. 41 and 42 swing in the negative direction. For example, when the mouse turns its head to the rear, the orientation of the body changes by 150 degrees or more and thus the graphs significantly swing.

Next, referring to FIGS. 43 and 44, the total movement distance (the total amount of movement) of the mice in the cage will be described.

Figure 43:
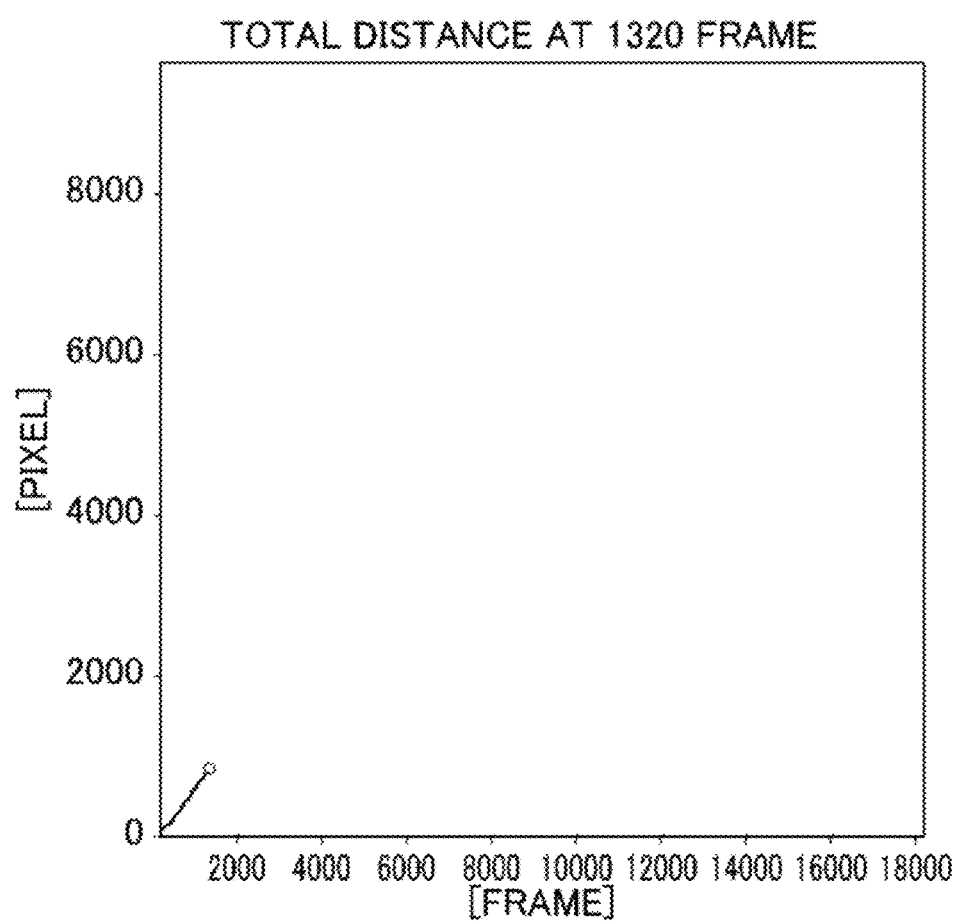
FIG. 43 is a graph showing relationship between the initial movement period from the start of measurement to 1320 FRAME (44 sec) and the total movement distance (the total amount of movement) of the mice.

FIG. 43 is a graph showing relationship between the initial movement period from the start of measurement to 1320 FRAME (44 sec) and the total movement distance of the mice. FIG. 44 is a graph obtained by continuously drawing the graph of FIG. 43 from then on until 18030 FRAME (about 10 min).

Figure 44:
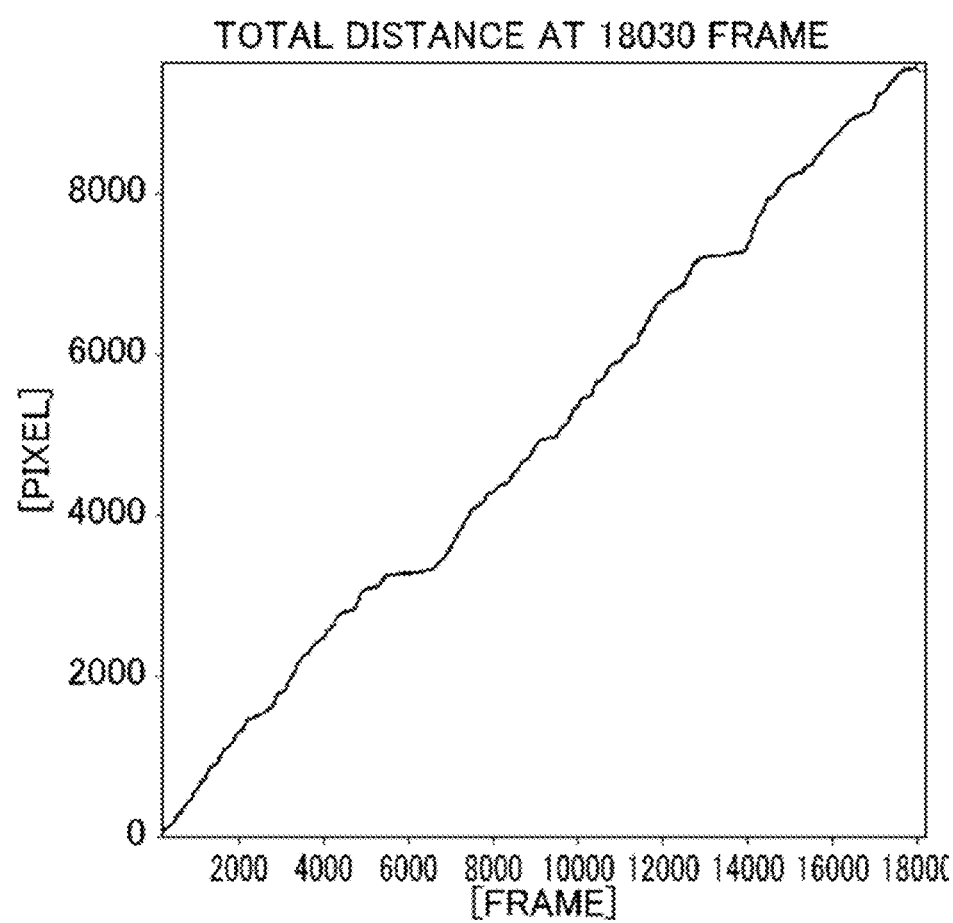
FIG. 44 is a graph obtained by continuously drawing the graph of FIG. 43 from then on until 18030 FRAME (about 10 min).

The vertical axes of FIGS. 43 and 44 represent the distance (PICXEL), and the horizontal axes represent the time (FRAME).

The graph of FIG. 43 is a graph representing the total movement distance obtained by accumulating the movement distance. The movement distance of the mice is added up starting with 0 at the measurement start time point, and the movement distance from the start of measurement is finally shown. While it is difficult to recognize the momentary state of the mice in the above movement speed graph (the graph of FIG. 39), for example, whether the mice are stopping at that moment is recognized by making a comparison between the graphs of FIGS. 43 and 44 representing the total movement distance and the graph representing the movement speed.

The graph (FIG. 44) indicate whether the final movement distance was long or short, as well as indicates at what timing during the movement the amount of movement suddenly increased.

That is, these graphs allow the user to grasp the activity of the mice in terms of both the speed and the amount of movement.

For example, in the graph of FIG. 39, the red top point (a circular point in the graph) vertically swings with the lapse of time. A horizontal movement of the red point indicates that the mice made no movement, and the speed becomes a value close to 0 in the graph of FIG. 39.

Next, referring to FIGS. 45 and 46, the rotation activity of the mice in the cage will be described.

Figure 45:
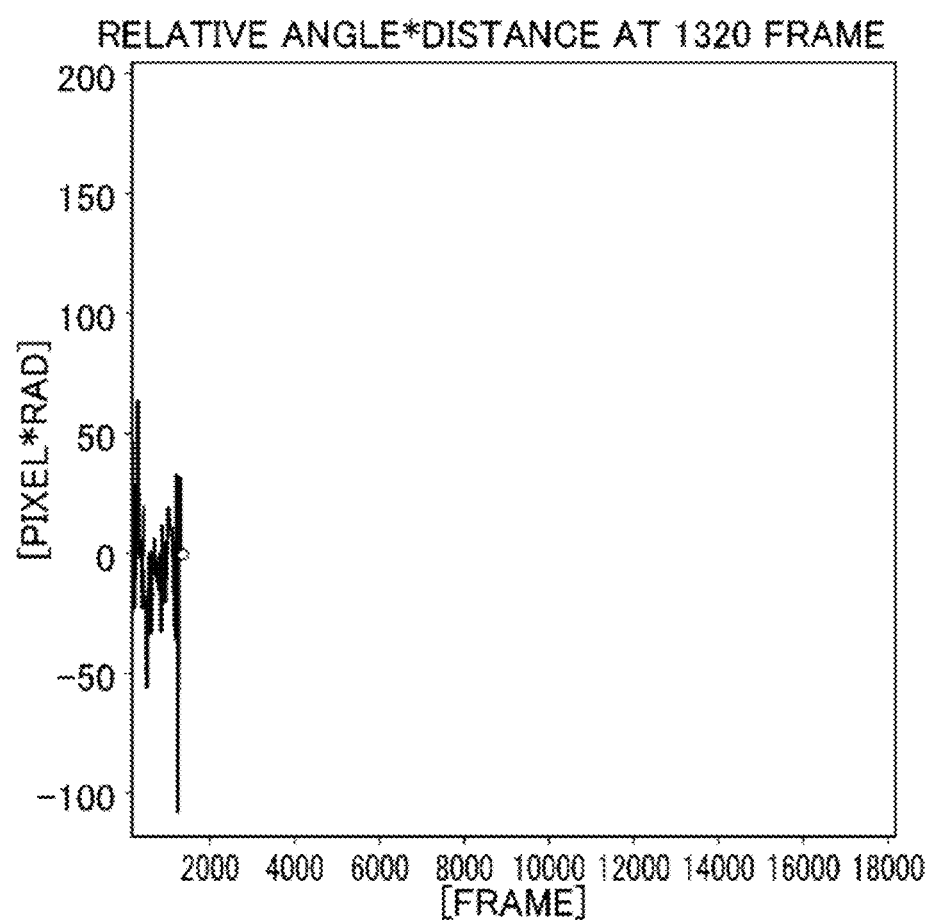
FIG. 45 is a graph showing relationship between the initial movement period from the start of measurement to 1320 FRAME (44 sec) and the rotation activity (angular velocity) of the mice.

FIG. 45 is a graph showing the relationship between the initial movement period from the start of measurement to 1320 FRAME (44 sec) and the rotation activity (angular velocity) of the mice. FIG. 46 is a graph obtained by continuously drawing the graph of FIG. 45 from then on until 18030 FRAME (about 10 min).

Figure 46:
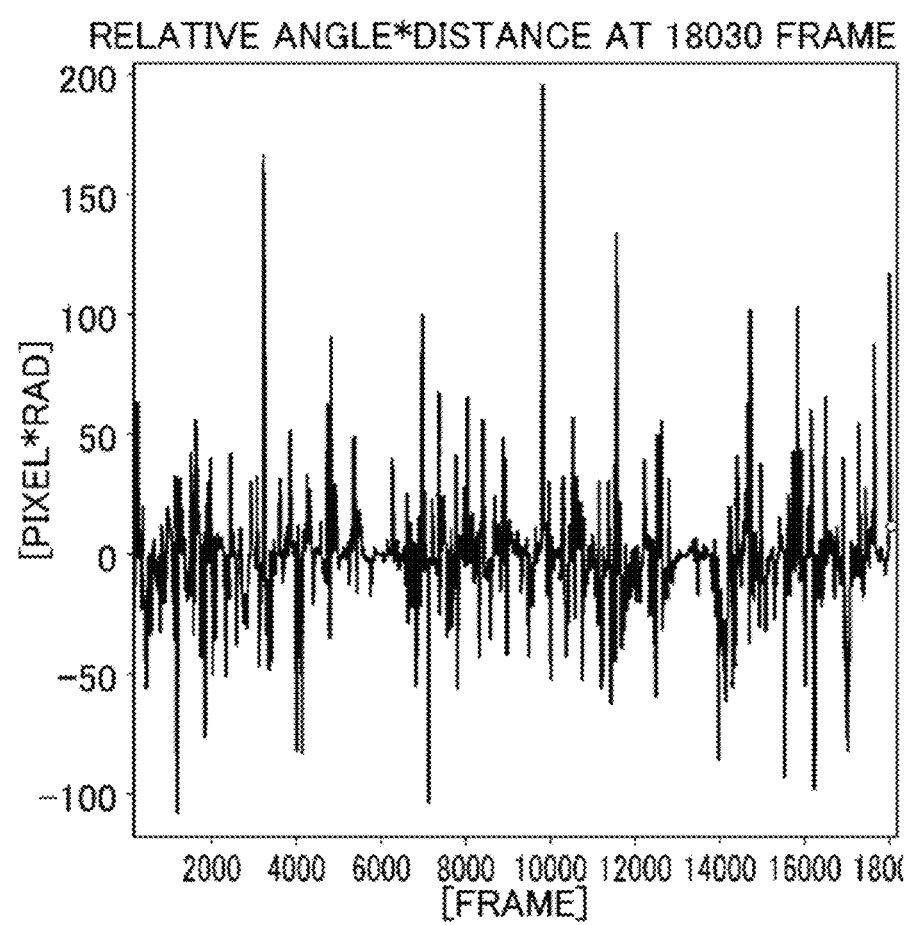
FIG. 46 is a graph obtained by continuously drawing the graph of FIG. 45 from then on until 18030 FRAME (about 10 min).

The vertical axes of FIGS. 45 and 46 represent distance×angle (PICXEL×RAD), and the horizontal axes represent the time (FRAME).

The graphs of FIGS. 45 and 46 are graphs obtained by graphing the angle by which the orientation of the body is changed, in a time-series manner. These graphs are obtained by multiplying the angle by which the orientation of the body is changed, such as 20 degrees or 30 degrees, by the movement distance.

When a mouse is simply spinning round and round, the value of the angle becomes 0 in the graphs of FIGS. 45 and 46. When the mouse is further moving while changing the orientation of its body, the graphs significantly vertically swing.

For example, when the orientation of the nose tip (the direction from around the neck to the nose tip) is changed with respect to the orientation of the body (the direction from the tail to around the neck), activity such as looking around is recognized from the graphs of FIGS. 45 and 46. On the other hand, when the mouse is staying there and turning around while changing the orientation of the body, a mental state in which the mouse is desperately trying to grasp the surroundings is recognized from the graphs. By not only identifying the activity of the mouse from a comparison between the immediately preceding and current orientations of the body but also taking into account also the movement of the mouse, different activity can be observed.

Next, referring to FIGS. 47 and 48, the movement speed of the mice in the cage will be described.

Figure 47:
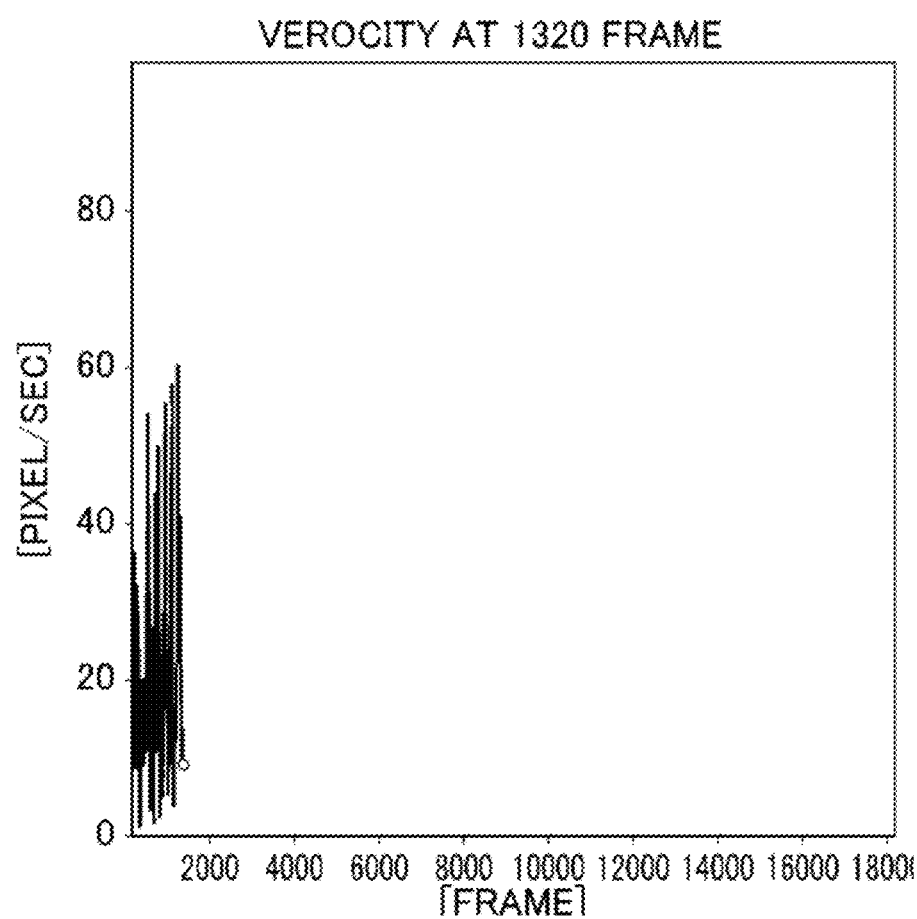
FIG. 47 is a graph showing relationship between the initial movement period from the start of measurement to 1320 FRAME (44 sec) and the movement speed of the mice.

FIG. 47 is a graph showing the relationship between the initial movement period from the start of measurement to 1320 FRAME (44 sec) and the movement speed of the mice. FIG. 48 is a graph obtained by continuously drawing the graph of FIG. 47 from then on until 18030 FRAME (about 10 min).

Figure 48:
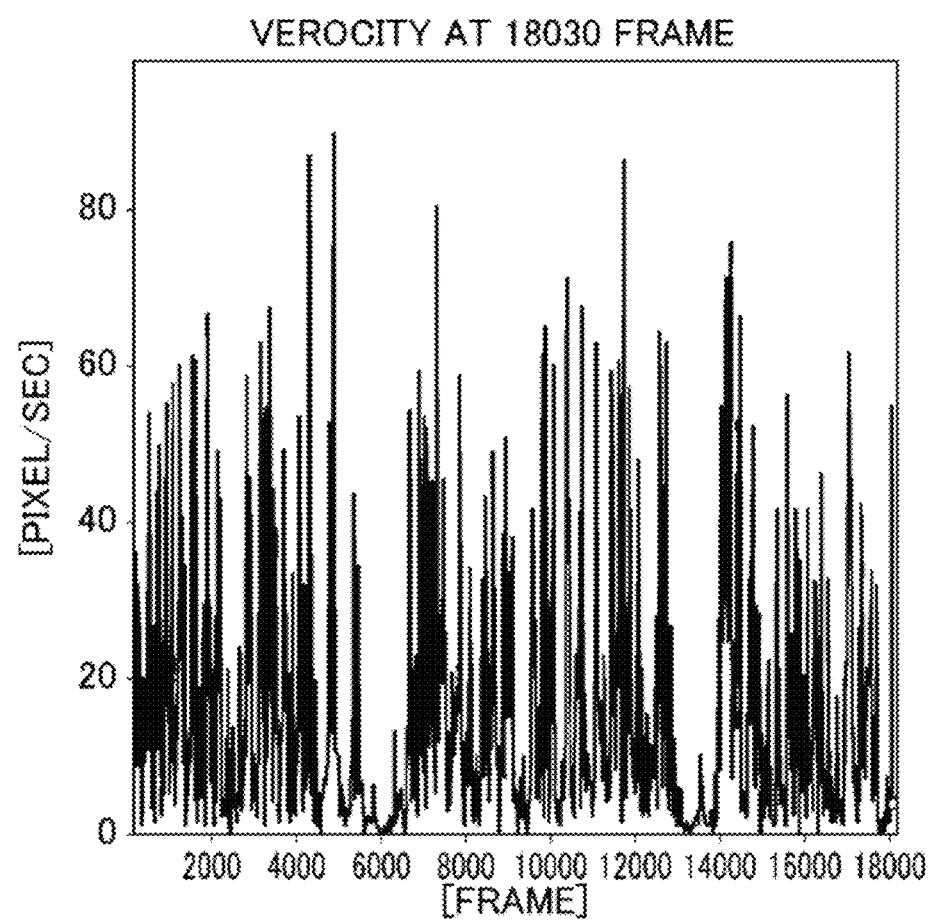
FIG. 48 is a graph obtained by continuously drawing the graph of FIG. 47 from then on until 18030 FRAME (about 10 min).

The vertical axes of FIGS. 47 and 48 represent distance/time (PICXEL/SEC), and the horizontal axes represent the time (FRAME).

FIGS. 47 and 48 are graphs having a concept close to that of the graphs of the movement speed of FIGS. 39 and 40.

In the graphs of FIGS. 39 and 40, the distance per 30 frames is measured.

For example, data is also present among 0 frame, 30 frame, and 60 frame. While, in the graphs of FIGS. 39 and 40, the movement speed is calculated by making comparisons only between 0 frame and 30 frame and between 30 frame and 60 frame, in the graphs of FIGS. 47 and 48, the speed is calculated by obtaining the difference between the 0 frame and 1 frame and dividing the difference by the time. For this reason, the calculated speed can be said to be a more precise speed index.

The speed at which the time elapses varies between a mouse and a human, and one second for the human corresponds to zero point several seconds for the mouse.

In the graphs of FIGS. 39 and 40, the speed per second is outputted with a human sense. On the other hand, in the graphs of FIGS. 47 and 48, the speed is outputted with a more precise mouse sense. Thus, the activity of the mice is represented more precisely.

Next, referring to FIGS. 49 and 50, the angular velocity of a rotating mouse in the cage will be described.

Figure 49:
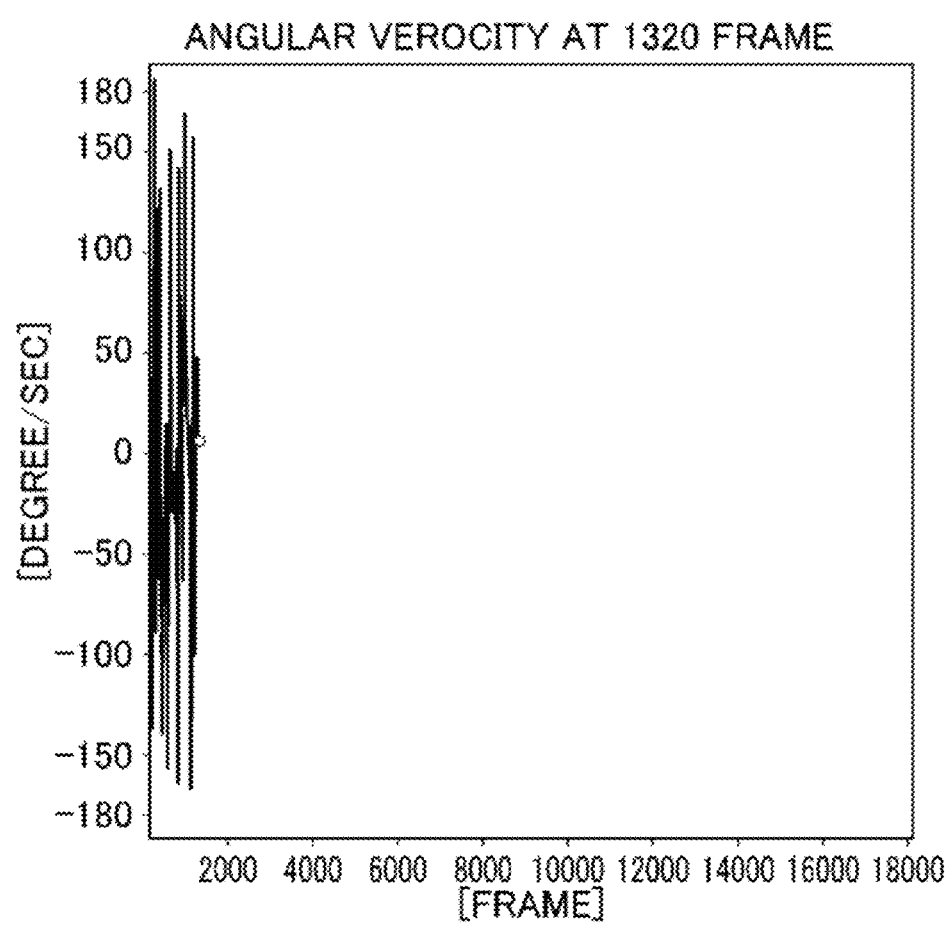
FIG. 49 is a graph showing relationship between the initial movement period from the start of measurement to 1320 FRAME (44 sec) and the angular velocity of the moving mice.

FIG. 49 is a graph showing the relationship between the initial movement period from the start of measurement to 1320 FRAME (44 sec) and the angular velocity of a moving mouse. FIG. 50 is a graph obtained by continuously drawing the graph of FIG. 49 from then on until 18030 FRAME (about 10 min).

Figure 50:
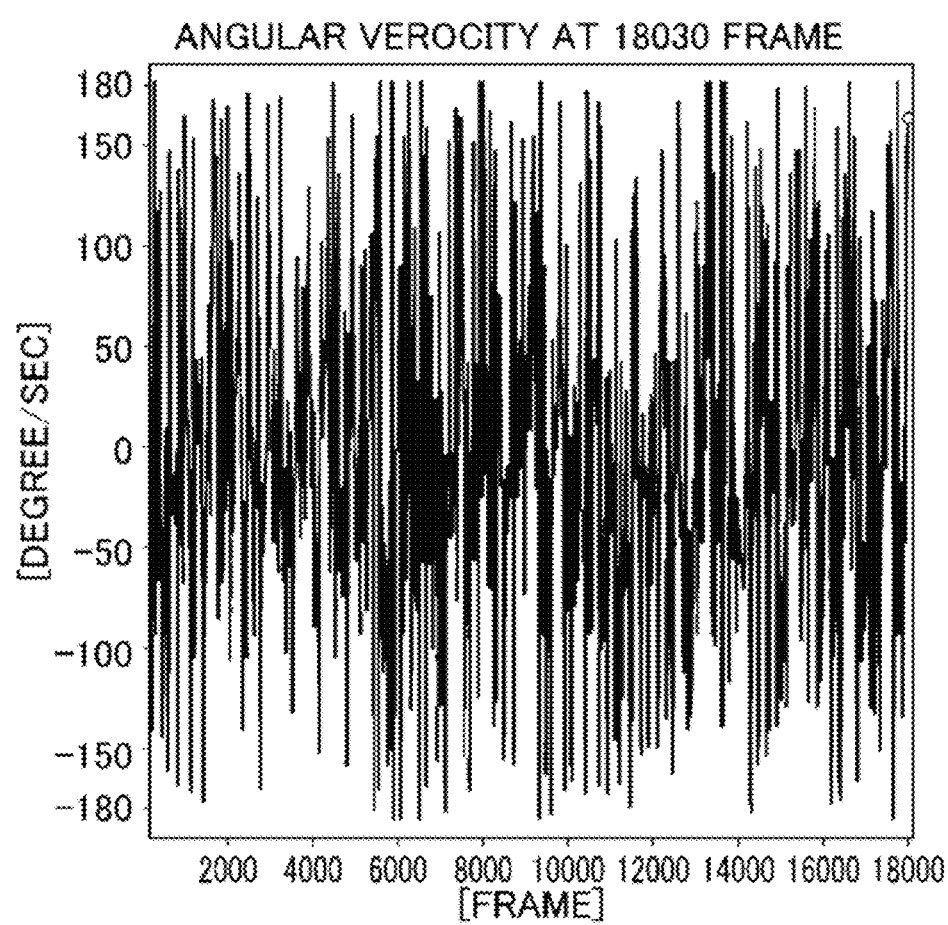
FIG. 50 is a graph obtained by continuously drawing the graph of FIG. 49 from then on until 18030 FRAME (about 10 min).

The vertical axes of FIGS. 49 and 50 represent angle×time (DEGREE×SEC), and the horizontal axes represent the time (FRAME).

While the graphs of FIGS. 45 and 46 represent the relationship between the orientation of the body of the mouse and the distance, the graphs of FIGS. 49 and 50 are graphs calculated by dividing the values of the graphs of FIGS. 45 and 46 by the time.

While the graphs of FIGS. 45 and 46 are obtained by converting angular changes in the body of the mouse into values, the graphs of FIGS. 49 and 50 are obtained by differentiating angular changes with time. While the former represent the relationship between the speed and the movement distance (the amount of movement), the latter represent the relationship between the angle and angular velocity. For this reason, by making comparisons between the graphs of FIGS. 49 and 50 and the graphs of FIGS. 45 and 46, for example, whether the mouse is stopping momentarily can be checked. That is, the movement speed and the amount of movement can be observed simultaneously in the graphs of FIGS. 45 and 46.

For example, if the value jumps up moment to moment, a state in which the mouse is more rapidly rotating and moving as the value becomes higher is recognized. On the other hand, the mouse can be said to be more slowly rotating and moving as the value becomes lower (closer to 0).

Next, referring to FIGS. 51 to 54, operations including the detection of the outlines of the mice from the video and the detection of the orientations of the bodies of the mice from the video will be described.

Figure 51:
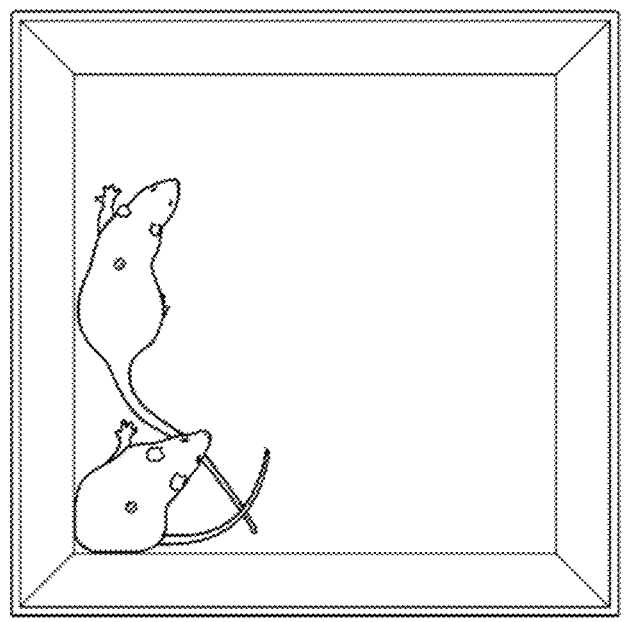
FIG. 51 is a drawing showing a unit image at one timing of a captured video (source video) of the inside of the cage using a camera.
Figure 52:
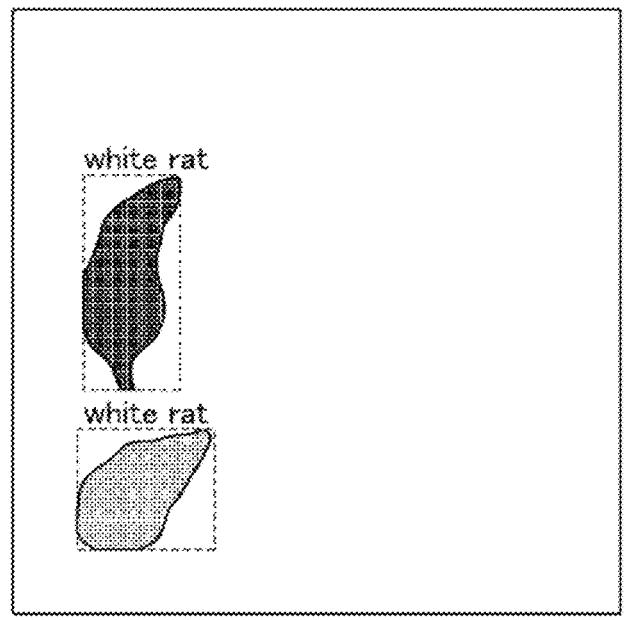
FIG. 52 is a drawing showing the outlines (contours) of multiple (two) mice identified from the unit image.
Figure 53:
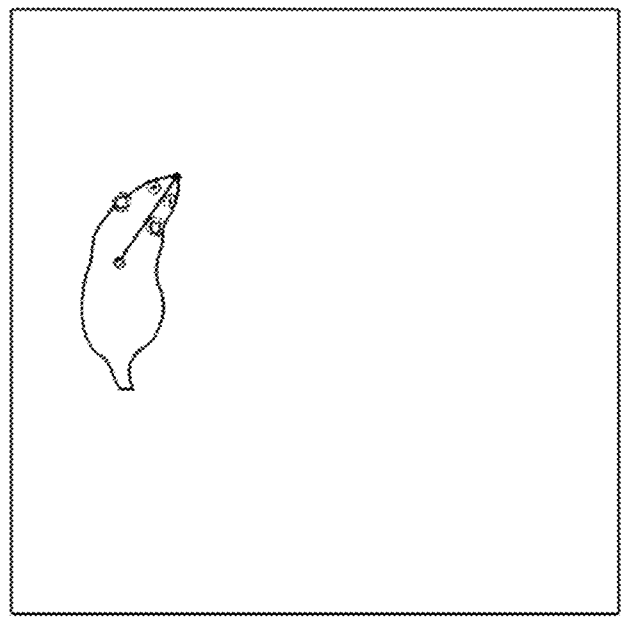
FIG. 53 is a drawing showing the orientation (the direction from the center of the body to the nose tip) of one of the two mice.
Figure 54:
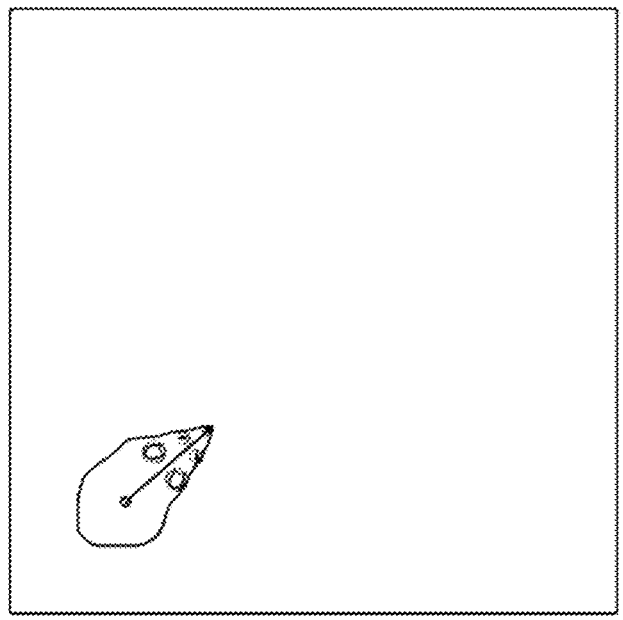
FIG. 54 is a drawing showing the orientation (the direction from the center of the body to the nose tip) of the other of the two mice.

FIG. 51 is a drawing showing a unit image at one timing of the video (source video) of the inside of the cage captured by the camera. FIG. 52 is a drawing showing the outlines (contours) of the multiple (two) mice identified from the unit image. FIG. 53 is a drawing showing the orientation (the direction from the center of the body to the nose tip) of one of the two mice. FIG. 54 is a drawing showing the orientation (the direction from the center of the body to the nose tip) of the other of the two mice.

While, in the first and second embodiments, the examples in which the outline (contour) detection process and the body part extraction process are performed separately have been described, the activity of the mice can be analyzed in more detail by combining these processes.

In this case, the unit image shown in FIG. 51 is extracted at one timing of the source video, the extracted unit image is analyzed, individuals are identified, and then the outlines (contours) of the multiple (two) white mice are outputted in different colors, for example, red and blue, as shown in FIG. 52.

Also, as shown in FIG. 53, the orientation (the direction toward the nose tip) of the face of one (an upper mouse having a red outline in FIG. 52) of the two mice is detected by detecting the center of gravity of the mouse, detecting the orientation of the body from the positional relationships among the ears, eyes, and nose tip, and drawing a line segment in the direction from the center of gravity to the nose tip.

Similarly, as shown in FIG. 54, the orientation (the direction toward the nose tip) of the face of the other (a lower mouse having a blue outline in FIG. 52) of the two mice is detected by detecting the center of gravity of the mouse, detecting the orientation of the body from the positional relationships among the ears, eyes, and nose tip, and drawing a line segment in the direction from the center of gravity to the nose tip.

As seen above, by combining the outline identification process and part extraction process, the orientation (the directions toward the nose tip) of the face of each mouse is detected. Also, the activity such as rotation, forward movement, or backward movement of the mice staying there is analyzed in more detail.

In summary, the information processing device according to the present invention can take various forms having configurations as described below. The present information processing device corresponds to the image processing device 2 having the functional configuration of FIG. 16 described in the second embodiment and the server 200 having the functional configuration of FIG. 24 described in the third embodiment.

That is, a second information processing device according to the present invention (for example, the image processing device 2 of FIG. 16, the server 200 of FIG. 24, or the like):

image acquisition means (the image acquisition unit 51 of FIG. 16) configured to acquire a captured analysis target image (for example, a picture such as a video) of a state in which one or more animals are doing activity in a predetermined activity range, the analysis target image including multiple unit images arranged in a time direction;

outline detection means (for example, the outline detection unit 57 of FIG. 16) configured to detect outlines (body contours or the like) of bodies of the one or more animals from each of the multiple unit images using a skeleton estimation model that when receiving a unit image, estimates and outputs a skeleton of a body of an animal;

individual identification means (for example, the individual identification unit 54 of FIG. 16) configured to identify the one or more animals as individuals in each of the unit images on the basis of an output obtained by inputting time series of the outlines (body contours or the like) of the bodies of the one or more animals detected from each of the unit images by the outline detection means (for example, the outline detection unit 57 of FIG. 16) to an individual identification model that when receiving time series of one or more outlines of a body of an animal, outputs the animals as an individual;

specification means (for example, the specification unit 471 of FIG. 24 or the like) configured to specify an analysis attribute (the species of analysis targets (for example, mouse, rat, or the like), the image capture direction of the analysis target animals (for example, upward, obliquely upward, horizontally, or the like), or the color of the analysis target animals (for example, white, black, or the like) of the analysis target image; and model selection means (for example, the model selection unit 472 of FIG. 24 or the like) configured to select, on the basis of the analysis attribute of the analysis target image specified by the specification means, the skeleton estimation model used by the outline detection means (for example, the outline detection unit 57 of FIG. 16) from multiple skeleton estimation models and to select the individual identification model used by the individual identification means (for example, the individual identification unit 54 of FIG. 16) from multiple individual identification models.

The information processing device thus configured previously prepares the multiple individual skeleton estimation models and individual identification models, when the analysis attribute of the analysis target image is specified, selects, on the basis of the specified analysis attribute of the analysis target image, the skeleton estimation model used by the outline detection means (for example, the outline detection unit 57 of FIG. 16) from the multiple skeleton estimation models and selects the individual identification model used by the individual identification means (for example, the individual identification unit 54 of FIG. 16) from the multiple individual identification models. Upon receipt of an image analysis instruction, the information processing device analyzes the multiple outlines extracted from each of the multiple unit images of the analysis target image in a time-series manner using the selected animal skeleton estimation model and individual identification model and identifies the one or more animals as individuals on the basis of the analysis results. This allows the user to properly identify the mice as individuals from the captured analysis target image of the one or more animals (for example, mice or the like) doing activity in the predetermined activity range.

The second information processing device (for example, the image processing device 2 of FIG. 16, the server 200 of FIG. 24, or the like) further includes:

generation means (for example, the data frame generation unit 53 of FIG. 16) configured to generate a data frame indicating the probability that the outlines that change with the activity of the animals are particular activity; and activity determination means (for example, the activity determination unit 56 of FIG. 16) configured to, when the value of the probability that the outlines are particular activity in the data frame satisfies one of previously set one or more conditions, determine activity corresponding to the satisfied condition.

As described above, when the value of the probability that the outlines that change are particular activity satisfies a condition, the information processing device determines activity corresponding to the condition. This allows the user to know the reason for the activity being done by the animals in the predetermined activity range.

The activity determination means (for example, the activity determination unit 56 of FIG. 16) further includes activity detection means (for example, the activity detection unit 81 of FIG. 16) configured to, when a condition defining positional relationships the outlines of the animals and another part (the outline of another animal or a corner of the cage) is satisfied, detect activity (scratching activity, grooming, or the like) related to the positional relationships.

Thus, when the animals are doing activity such as scratching in the limited activity range, the user is able to understand that stress or the like is the reason for the activity. Also, when one animal is doing grooming activity with respect to another animal, the user is able to understand that the desire to have a relationship with the other animal, or the like is the reason for the activity.

The activity includes at least one of activity related to sociality of the one or more animals, activity related to interaction between animals present in the same activity range, and activity related to a relationship between animals.

Thus, the user is able to understand whether the reason for the activity of the animals is activity related to sociality, activity related to the interaction between animals present in the same activity range, or activity related to the relationship between animals.

The information processing device further includes marker image generation means (for example, the marker image generation unit 55 of FIG. 16) configured to generate marker-provided images in which markers indicating the animals identified as individuals by the individual identification means (for example, the individual identification unit 54 of FIG. 16) are associated with the outlines of the bodies of the animals detected by the outline detection means (for example, the outline detection unit 57 of FIG. 16).

Thus, by displaying the marker-provided images, the user is able to identify the one or more animals present in the images using the markers. Also, after identifying the animals, the user is able to detect the outlines of the individuals, to give significance to changes in the outlines (the movement of the bodies), and to make an evaluation.

A second information processing device (for example, the image processing device 2 of FIG. 16 or the like, the server 200 of FIG. 24, or the like) includes:

image acquisition means (for example, the image acquisition unit 51 of FIG. 16) configured to acquire a captured group of multiple images (video) of a state in which one or more animals are doing activity in a predetermined activity range, the group of images including frame images including multiple unit images (pixel) and arranged in a time direction;

determination means (the individual recognition unit of FIG. 16 or the like) configured to determine to which of regions of the one or more animals the unit images belong;

specification means (for example, the data frame generation unit 53 of FIG. 16) configured to specify, in each of the regions of the animals, positions of the outlines (the body contours or the like) of the animals using coordinates representing the distance from a predetermined reference point in the images; and individual identification means (for example, the individual identification unit 54 of FIG. 3) configured to analyze a state in which the positions or ranges of the outlines specified by the specification means change with lapse of time and to identify (classify) the one or more animals included in the images on the basis of analysis results.

The information processing device further includes activity determination means (for example, the activity determination unit 56 of FIG. 16) configured to determine whether changes in the outlines of the animals identified (classified) by the individual identification means (for example, the individual identification unit 54 of FIG. 16) match a previously set condition and to provide activity labels (scratching activity, sleeping, grooming activity, or the like) of the animals corresponding to the matched condition to time information (time stamp) of the images including the outlines.

This allows the user to understand to which of scratching activity, sleeping, grooming activity, and the like the activity of the animals belongs.

REFERENCE SIGNS LIST

1 . . . camera, 2 . . . image processing device, 11 . . . CPU, 41 . . . image DB, 42 . . . model DB, 43 . . . material DB, 51 . . . image acquisition unit, 52 . . . part extraction unit, 53 . . . data frame generation unit, 54 . . . individual identification unit, 55 . . . marker image generation unit, 56 . . . activity determination unit, 57 . . . outline detection unit, 61 . . . video acquisition unit, 62 . . . unit image generation unit, 81 . . . activity detection unit, 82 . . . activity prediction unit, 71, 91 . . . individual recognition unit, 72 . . . part detection unit, 92 . . . outline identification unit, 450 . . . image analysis unit, 451 . . . Web service unit, 452 . . . process unit, 461 . . . authentication unit, 462 . . . search unit, 463 . . . search result output unit, 464 . . . analysis data addition unit, 465 . . . analysis results display control unit, 471 . . . specification unit, 472 . . . model selection unit, 491 . . . upload data management unit, 492 . . . unprocessed data management unit

The invention claimed is:

1. An information processing device comprising:
   image acquisition means configured to acquire a captured analysis target image of a state in which one or more animals are doing activity in a predetermined activity range, the analysis target image comprising a plurality of unit images arranged in a time direction;
   outline detection means configured to detect outlines of bodies of the one or more animals from each of the unit images using a skeleton estimation model that when receiving a unit image, estimates and outputs a skeleton of a body of an animal;
   individual identification means configured to identify the one or more animals as individuals in each of the unit images on the basis of an output obtained by inputting time series of the outlines of the bodies of the one or more animals detected from each of the unit images by the outline detection means to an individual identification model that when receiving time series of one or more outlines of a body of an animal, outputs the animal as an individual;
   specification means configured to specify an analysis attribute of the analysis target image;
   model selection means configured to select, on the basis of the analysis attribute of the analysis target image specified by the specification means, the skeleton estimation model used by the outline detection means from a plurality of skeleton estimation models and to select the individual identification model used by the individual identification means from a plurality of individual identification models
   generation means configured to generate a data frame indicating transition of positions of the outlines that change with the activity of the one or more animals; and
   activity determination means configured to, when the transition of the positions of the outlines in the data frame satisfies one of previously set one or more conditions, determine activity corresponding to the satisfied condition.

2. The information processing device of claim 1, wherein the activity determination means further comprises activity detection means configured to, when a condition defining positional relationships between the outlines of the one or more animals and another particular part is satisfied, detect activity related to the positional relationships.

3. The information processing device of claim 2, wherein the activity includes at least one of activity related to sociality of the one or more animals, activity related to interaction between animals present in an identical activity range, and activity related to a relationship between animals.

4. An information processing method performed by an information processing device, comprising:
   an image acquisition step of acquiring an analysis target image capturing a state in which one or more animals are doing activity in a predetermined activity range, the analysis target image comprising a plurality of unit images arranged in a time direction;
   an outline detection step of detecting outlines of bodies of the one or more animals from each of the unit images using a skeleton estimation model that when receiving a unit image, estimates and outputs a skeleton of a body of an animal;
   an individual identification step of identifying the one or more animals as individuals in each of the unit images on the basis of an output obtained by inputting time series of the outlines of the bodies of the one or more animals detected from each of the unit images to an individual identification model that when receiving time series of one or more outlines of a body of an animal, outputs the animal as an individual;
   a specification step of specifying an analysis attribute of the analysis target image;
   a model selection step of selecting, on the basis of the specified analysis attribute of the analysis target image, the skeleton estimation model used in the outline detection step from a plurality of skeleton estimation models and selecting the individual identification model used in the individual identification step from a plurality of individual identification models
   generating step of generating a data frame indicating transition of positions of the outlines that change with the activity of the one or more animals; and
   activity determination step of, when the transition of the positions of the outlines in the data frame satisfies one of previously set one or more conditions, determine activity corresponding to the satisfied condition.

5. A non-transitory storage medium for causing a computer configured to control an information processing device to perform a control process comprising:
   an image acquisition step of acquiring a captured analysis target image of a state in which one or more animals are doing activity in a predetermined activity range, the analysis target image comprising a plurality of unit images arranged in a time direction;
   an outline detection step of detecting outlines of bodies of the one or more animals from each of the unit images using a skeleton estimation model that when receiving a unit image, estimates and outputs a skeleton of a body of an animal;
   an individual identification step of identifying the one or more animals as individuals in each of the unit images on the basis of an output obtained by inputting time series of the outlines of the bodies of the one or more animals detected from each of the unit images to an individual identification model that when receiving time series of one or more outlines of a body of an animal, outputs the animal as an individual;
   a specification step of specifying an analysis attribute of the analysis target image; and
   a model selection step of selecting, on the basis of the specified analysis attribute of the analysis target image, the skeleton estimation model used in the outline detection step from a plurality of skeleton estimation models and selecting the individual identification model used in the individual identification step from a plurality of individual identification models
   generating step of generating a data frame indicating transition of positions of the outlines that change with the activity of the one or more animals; and
   activity determination step of, when the transition of the positions of the outlines in the data frame satisfies one of previously set one or more conditions, determine activity corresponding to the satisfied condition.

* * * * *